United States Patent
Wang et al.

(10) Patent No.: US 12,170,390 B2
(45) Date of Patent: Dec. 17, 2024

(54) SYSTEMS AND METHOD OF OPERATING A FUEL CELL ASSEMBLY, A GAS TURBINE ENGINE, OR BOTH

(71) Applicant: General Electric Company, Schenectady, NY (US)

(72) Inventors: Honggang Wang, Clifton Park, NY (US); Radislav A. Potyrailo, Niskayuna, NY (US); Michael Anthony Benjamin, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 251 days.

(21) Appl. No.: 17/676,478

(22) Filed: Feb. 21, 2022

(65) Prior Publication Data

US 2023/0282847 A1    Sep. 7, 2023

(51) Int. Cl.
| | |
|---|---|
| *H01M 8/04111* | (2016.01) |
| *B64D 27/10* | (2006.01) |
| *B64D 27/24* | (2006.01) |
| *B64D 27/355* | (2024.01) |
| *B64D 31/18* | (2024.01) |
| *H01M 8/04746* | (2016.01) |
| *H01M 8/04992* | (2016.01) |
| *B64D 27/02* | (2006.01) |

(52) U.S. Cl.
CPC ......... *H01M 8/04111* (2013.01); *B64D 27/10* (2013.01); *B64D 27/24* (2013.01); *B64D 27/355* (2024.01); *B64D 31/18* (2024.01); *H01M 8/04753* (2013.01); *H01M 8/04992* (2013.01); *B64D 27/026* (2024.01); *H01M 2250/20* (2013.01)

(58) Field of Classification Search
None
See application file for complete search history.

(56) References Cited

U.S. PATENT DOCUMENTS

| | | | |
|---|---|---|---|
| 3,658,279 | A | 4/1972 | Robertson |
| 3,805,517 | A | 4/1974 | Sewell et al. |
| 4,684,081 | A | 8/1987 | Cronin |

(Continued)

FOREIGN PATENT DOCUMENTS

| | | |
|---|---|---|
| CN | 106976405 A | 7/2017 |
| DE | 102005012230 A1 | 10/2005 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Victoria H Lynch
(74) *Attorney, Agent, or Firm* — Dority & Manning, P.A.

(57) ABSTRACT

A method is provided for operating a propulsion system having a gas turbine engine and a fuel cell assembly. The fuel cell assembly includes a fuel cell. The method includes: receiving gas composition data of output products from the fuel cell; and controlling operation of the fuel cell assembly, the gas turbine engine, or both in response to the received gas composition data of the output products from the fuel cell.

19 Claims, 31 Drawing Sheets

(56) References Cited

U.S. PATENT DOCUMENTS

| | | |
|---|---|---|
| 5,227,256 A | 7/1993 | Marianowski et al. |
| 5,498,487 A | 3/1996 | Ruka et al. |
| 5,581,995 A | 12/1996 | Lucenko et al. |
| 5,858,314 A | 1/1999 | Hsu et al. |
| 5,968,680 A | 10/1999 | Wolfe et al. |
| 6,183,703 B1 | 2/2001 | Hsu et al. |
| 6,296,957 B1 | 10/2001 | Graage |
| 6,348,278 B1 | 2/2002 | LaPierre et al. |
| 6,550,717 B2 | 4/2003 | MacCready et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,662,024 B2 | 3/2014 | Leone |
| 8,668,434 B2 | 3/2014 | Karpman et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,247,032 B2 | 4/2019 | Gill et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,815,904 B2 | 10/2020 | Cafaro et al. |
| 10,913,543 B2 | 2/2021 | Bailey et al. |
| 10,919,635 B2 | 2/2021 | Edgar et al. |
| 10,967,984 B2 | 4/2021 | Willford et al. |
| 10,978,723 B2 | 4/2021 | Lo et al. |
| 11,101,677 B2 | 8/2021 | Shih et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2006/0263658 A1* | 11/2006 | Yanagi ............... H01M 8/0662 |
| | | 429/408 |
| 2008/0001038 A1* | 1/2008 | Daggett ............... B64D 27/02 |
| | | 244/53 R |
| 2008/0155984 A1 | 7/2008 | Liu et al. |
| 2010/0133475 A1 | 6/2010 | Kobayashi et al. |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0076120 A1 | 3/2013 | Wagner et al. |
| 2013/0099560 A1 | 4/2013 | Shipley et al. |
| 2013/0112807 A1 | 5/2013 | Cox et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0248619 A1 | 8/2020 | Romero et al. |
| 2020/0250693 A1 | 8/2020 | Kanamori et al. |
| 2020/0313207 A1 | 10/2020 | Milcarek et al. |
| 2020/0340486 A1 | 10/2020 | Reynolds et al. |
| 2020/0350640 A1 | 11/2020 | Combs et al. |
| 2021/0003281 A1 | 1/2021 | Amble et al. |
| 2021/0075034 A1 | 3/2021 | Irie et al. |
| 2021/0115857 A1 | 4/2021 | Collopy |
| 2023/0349852 A1* | 11/2023 | Motayed ............... G01N 27/127 |

FOREIGN PATENT DOCUMENTS

| | | |
|---|---|---|
| EP | 3805107 A1 | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO2018108962 A1 | 6/2018 |
| WO | WO2020/011380 A1 | 1/2020 |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p.

(56) References Cited

OTHER PUBLICATIONS 25 of 50. https://www.ecfr.gov/cgi-bin/text-idx?SID=5ela000b517423bb51a&f713ca211b68&mc=true&node=pt14.1.33&rgn=div5#se14.1.33_175.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, 34 Pages. (Abstract Only). https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.ene s/prod/files/2014/03/19/sofc_for_aircraft _pnnl_2012.pdf.

\* cited by examiner

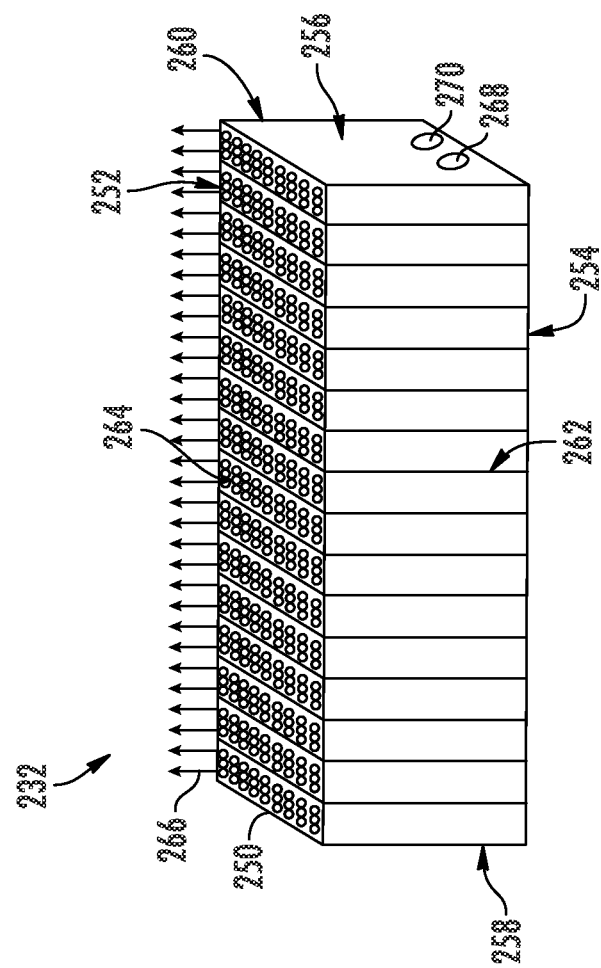
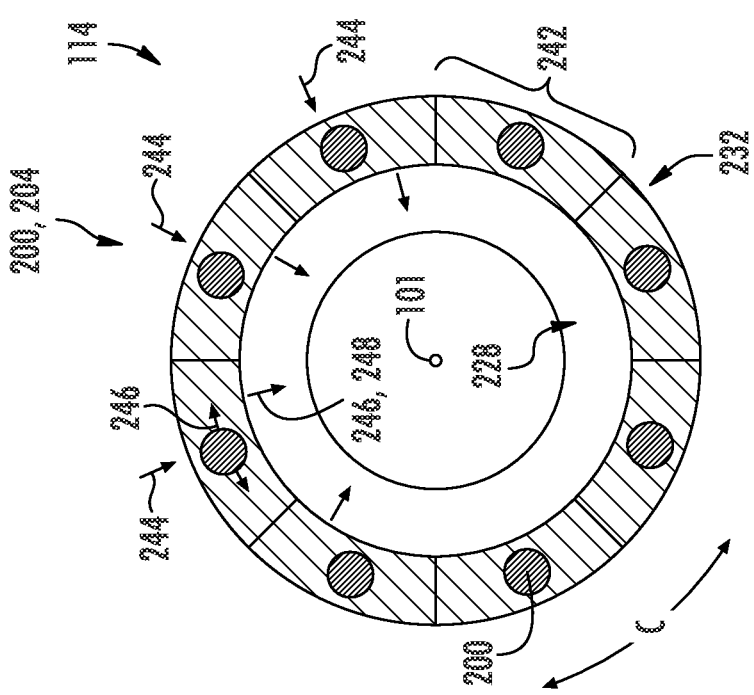

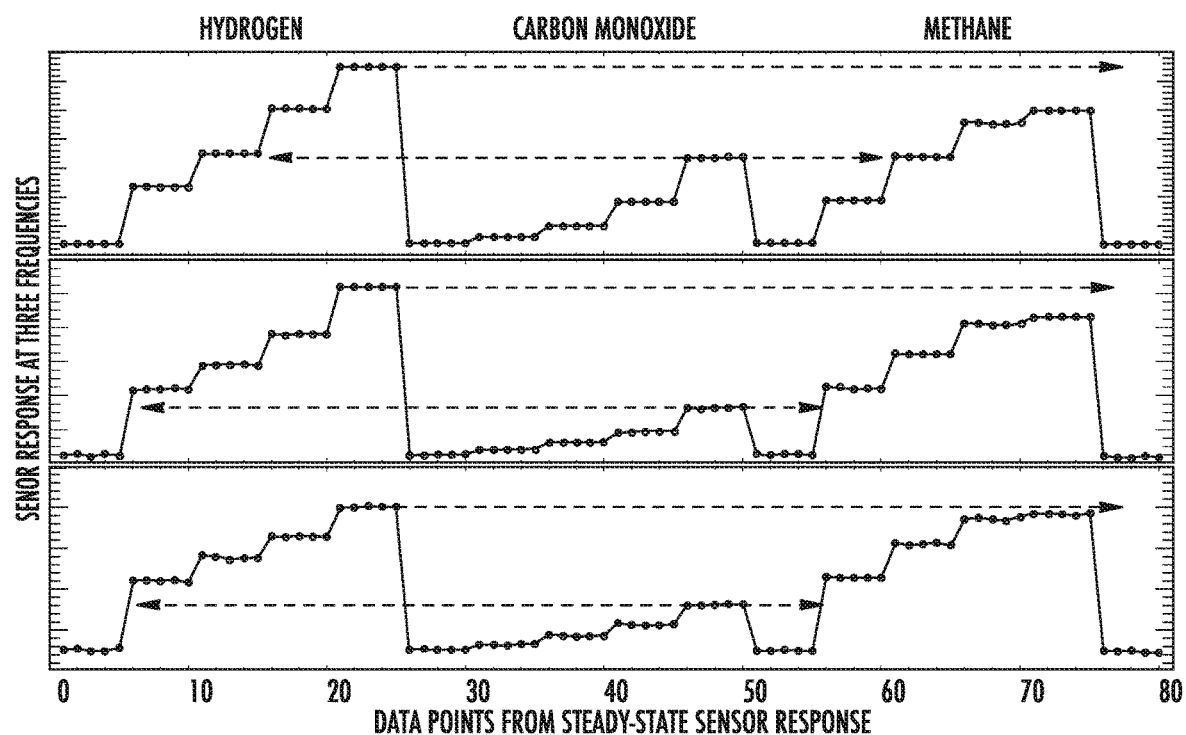
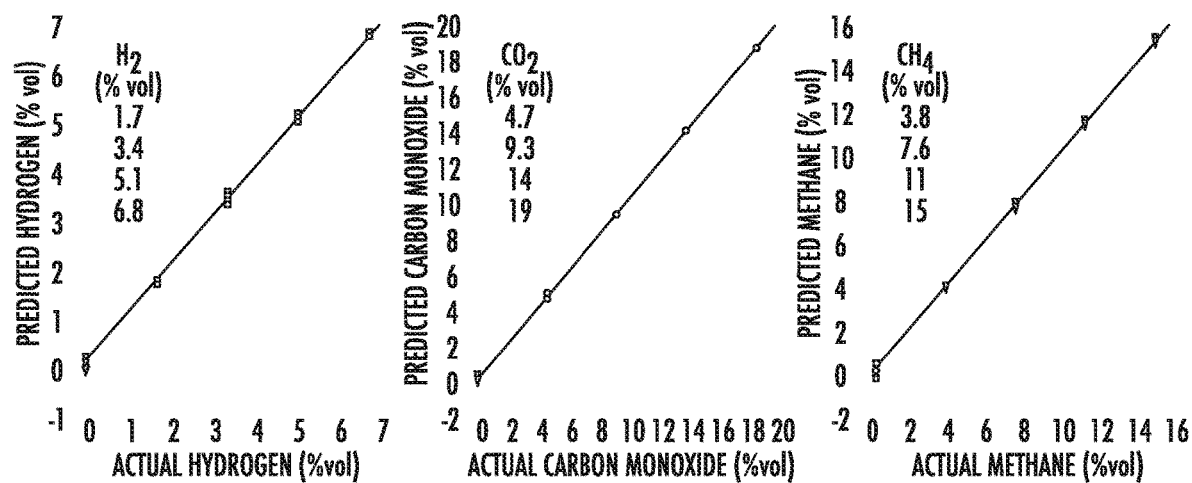
FIG. 34

SYSTEMS AND METHOD OF OPERATING A FUEL CELL ASSEMBLY, A GAS TURBINE ENGINE, OR BOTH

FIELD

The present disclosure relates to a system and method for operating a fuel cell assembly, a gas turbine engine, or both.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

At least certain gas turbine engines include a fuel cell assembly operable therewith.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 3 is a schematic, axial view of the exemplary integrated fuel cell and combustor assembly of FIG. 2.

FIG. 4 is a schematic view of a fuel cell of a fuel cell assembly in accordance with an exemplary aspect of the present disclosure as may be incorporated into the exemplary integrated fuel cell and combustor assembly of FIG. 2.

FIG. 34 illustrates graphical illustrations of quantitation of gas concentrations using dielectric excitation gas detection in accordance with one embodiment.

DETAILED DESCRIPTION

Figure 1:
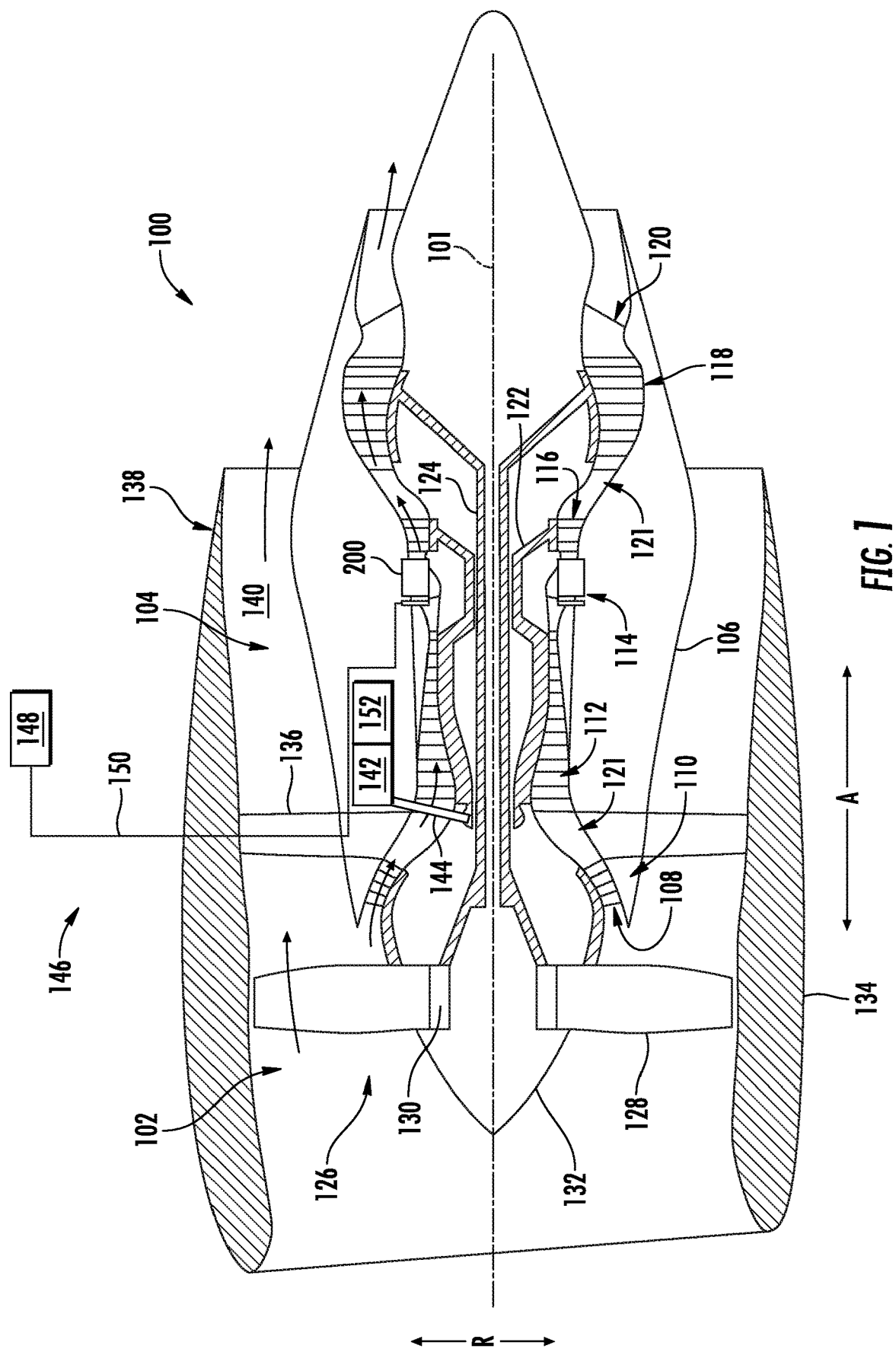
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "vertical", "horizontal", "top", "bottom", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. To improve system efficiency and fuel utilization and reduce external water usage, the fuel cell system may include an anode recirculation loop. As a single fuel cell can only generate about IV voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes. Each of these fuel cells may have specific benefits in the form of a preferred operating temperature range, power generation capability, efficiency, etc.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. The fuel delivery system 146 may be an aircraft fuel supply, such as an aircraft fuel supply for a propulsion system for an aircraft. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations, and may further provide power back to the turbofan engine 100 during other operations. For example, the accessory gearbox 142 is, for the embodiment depicted, coupled to a starter motor/generator 152. The starter motor/generator may be configured to extract power from the accessory gearbox 142 and turbofan engine 100 during certain operation to generate electrical power, and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
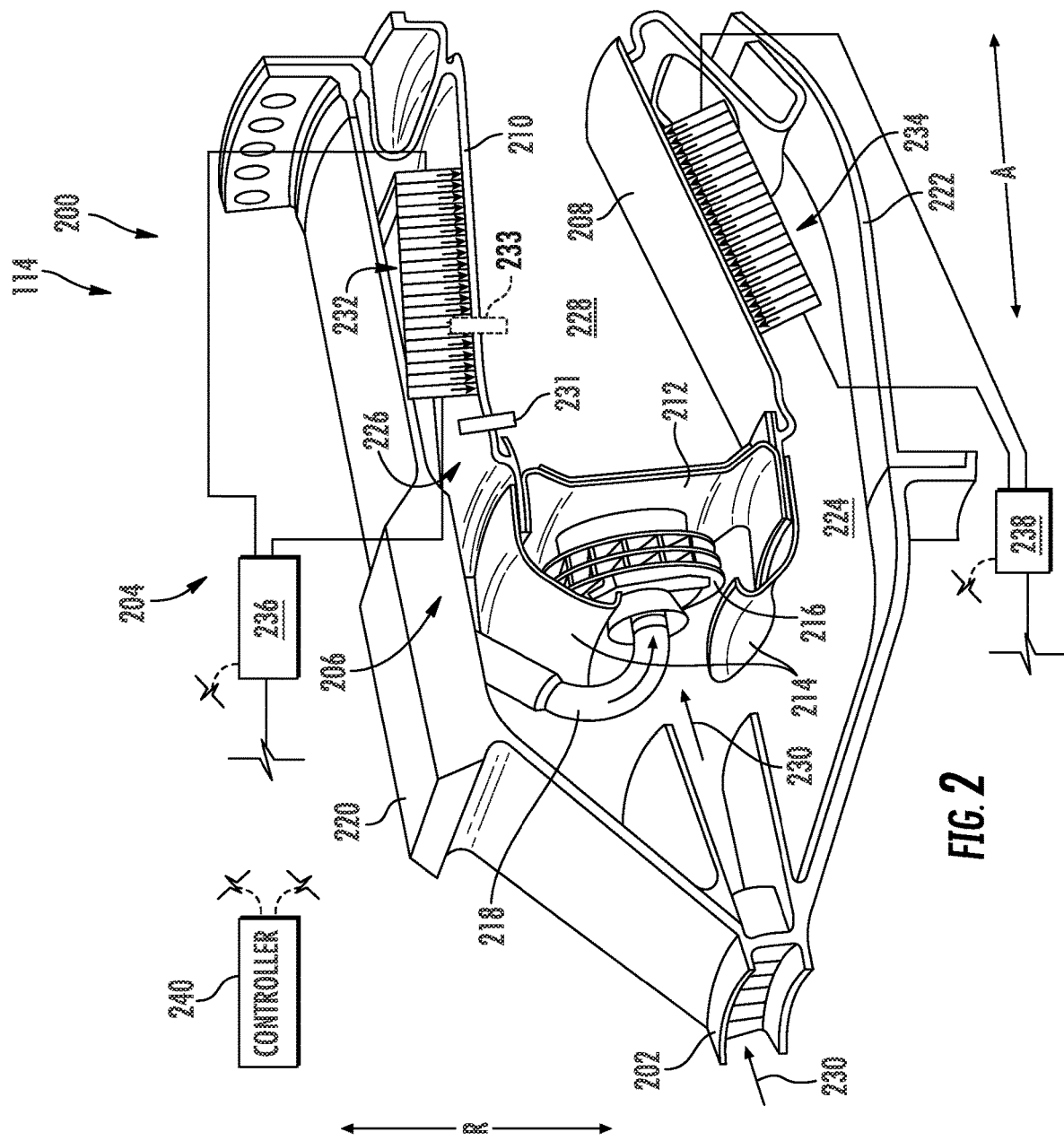
FIG. 2 is a perspective view of an integrated fuel cell and combustor assembly in accordance with the present disclosure.

Referring now to FIG. 2, illustrated schematically is a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gases. The combustion gases are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). In particular, for the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the fuel cell controller 240 described below with reference to FIG. 5.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gases that are directed downstream into the turbine section to drive or assist with driving the one or more turbines therein.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258, and the side 254 are not visible in the perspective view of FIG. 4.

As will be appreciated, the first fuel cell stack 232 may include a plurality of fuel cells that are "stacked," e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gases used to generate thrust for the gas turbine engine 100 (and vehicle/aircraft incorporating the gas turbine engine 100).

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The one or more inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2, may be configured in a similar manner as the first fuel cell stack 232, or alternatively may be configured in any other suitable manner.

Figure 5:
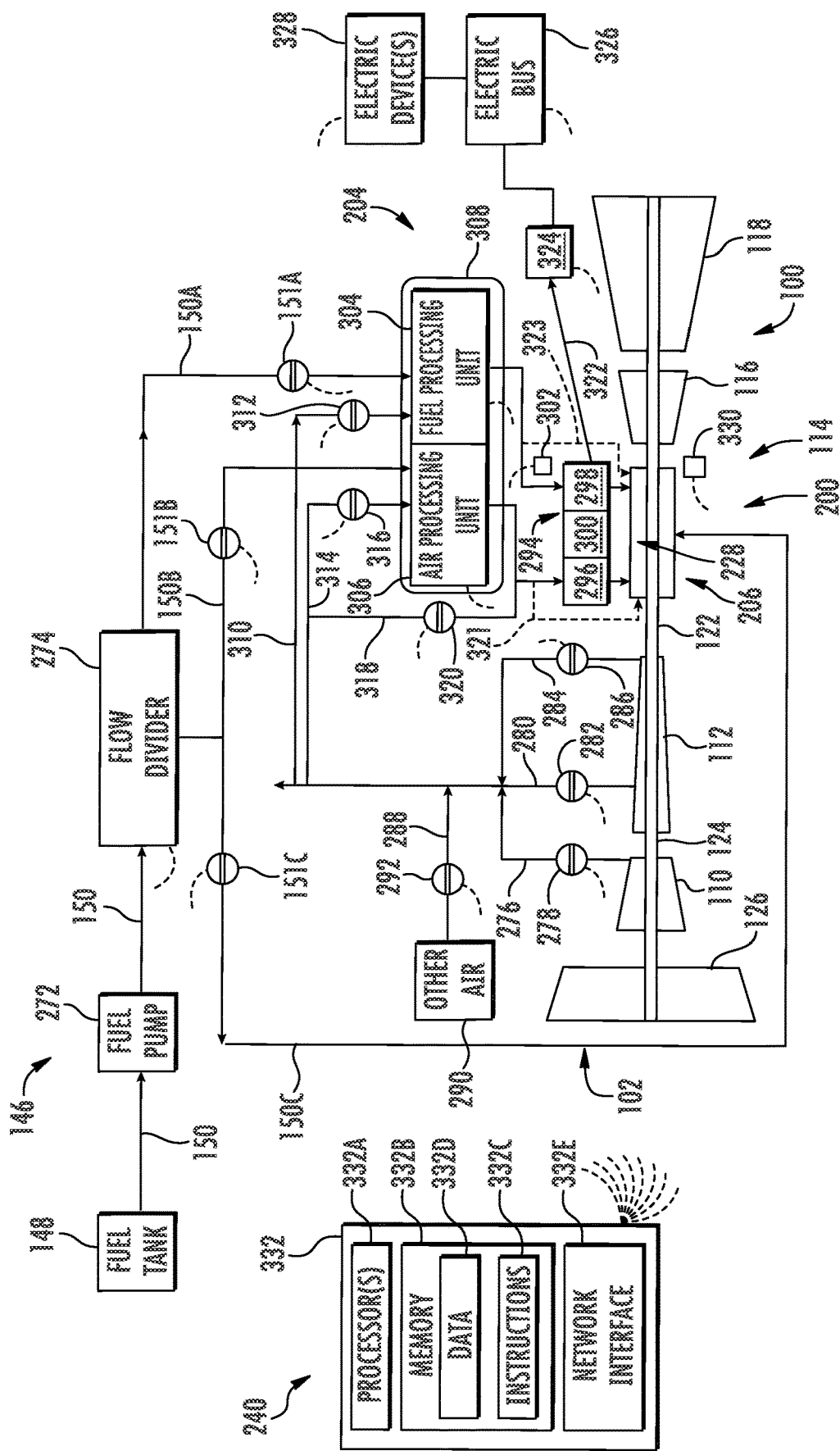
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), an ambient location (e.g., a freestream air), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296 (also referred to herein as "cathode 296"), an anode side 298 (also referred to herein as "anode 298"), and an electrolyte 300 (also referred to as an electrolyte layer) positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell), and/or a composition (e.g., a chemical composition) of the output products from the fuel cell assembly 204. In such a manner, it will be appreciated that in certain exemplary embodiments, the fuel cell sensor 302 may be a gas sensor, such as a multi-gas sensor.

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the anode side 298 of fuel cell stack 294) may be composed of a nickel/yttria-stabilized zirconia (Ni/YSZ) cermet. Nickel in the anode side serves as a catalyst for fuel oxidation and current conductor. During normal operation of the fuel cell stack 294, the operating temperature may be greater than or equal to about 700° C., and the nickel (Ni) in the anode remains in its reduced form due to the continuous supply of primarily hydrogen fuel gas. Alternatively, the anode side may include a small amount of nickel, or may be completely or substantially free of nickel.

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of the combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor (CPOx) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, including but not limited to a catalytic partial oxidizer, an autothermal reformer, or a steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode 296 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell to allow a portion or all of an airflow conditioned by the air processing unit 306 (and combined with any bypass air through duct 318) to bypass the cathode side 296 of the fuel cell and go directly to the combustion chamber 228. The airflow bypass duct 321 may be in thermal communication with the fuel cell. The fuel cell assembly further includes a fuel bypass duct 323 extending around the fuel cell to allow a portion or all of a reformed fuel from the fuel processing unit 304 to bypass the anode side 298 of the fuel cell and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 5, the gas turbine engine 100 further includes a sensor 330. In the embodiment shown, the sensor 330 may be configured to sense data indicative of a flame within the combustion section 114 of the gas turbine engine 100, or some other parameter indicating an operating condition of the gas turbine engine. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as a sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., methods 700, 800, 900, 1000, 1100, 1300), as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery assembly 146 is configured to provide hydrogen fuel to the integrated fuel cell and combustor assembly 200, and in particular to the fuel cell assembly 204.

Figure 6:
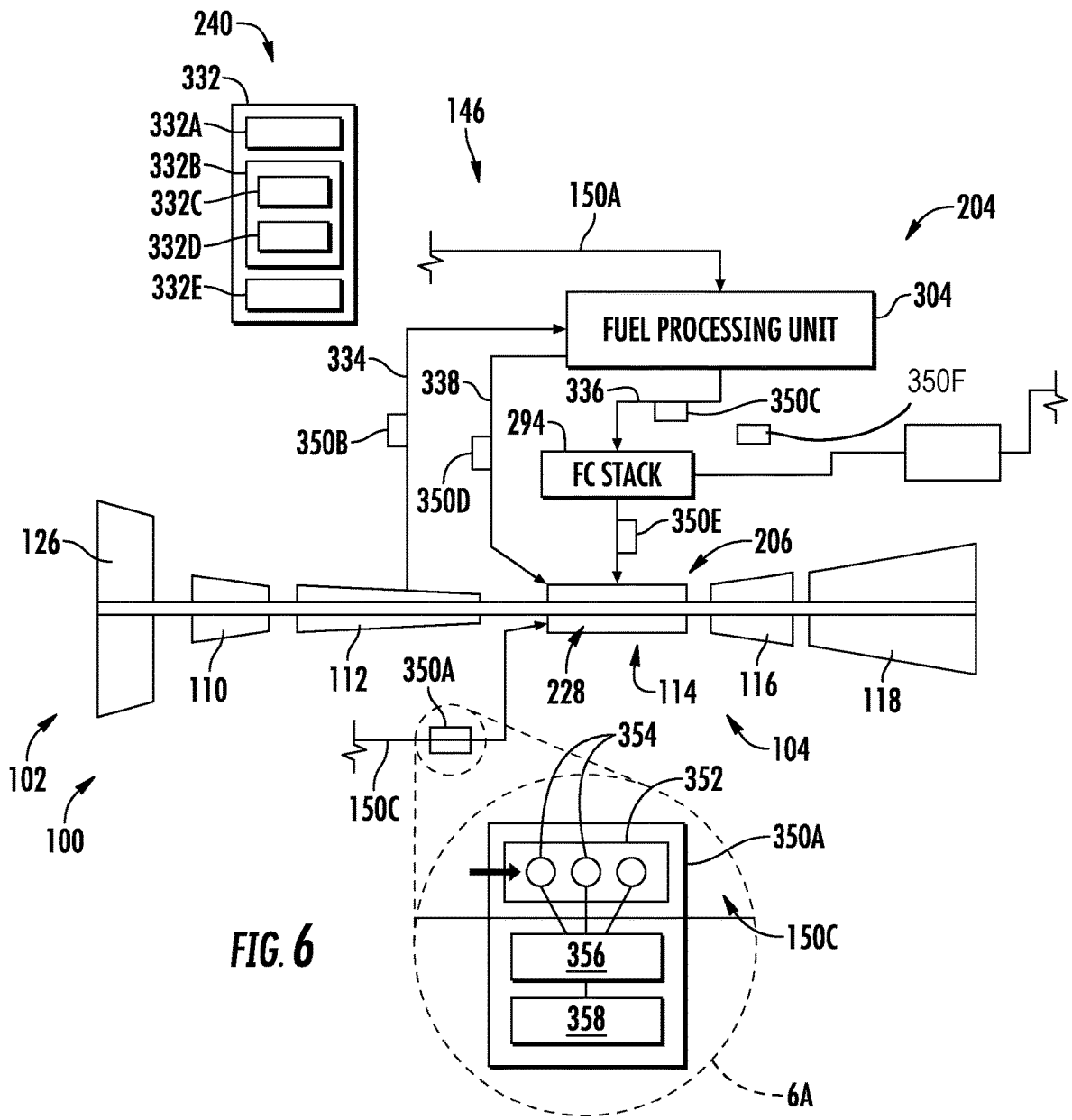
FIG. 6 is a schematic view of a propulsion system in accordance with another exemplary embodiment of the present disclosure.

Referring now to FIG. 6, a schematic view of a propulsion system in accordance with another exemplary embodiment of the present disclosure is provided. The exemplary propulsion system generally includes a propulsor, a turbomachine 104 operable to drive the propulsor to generate thrust during operation, and a fuel cell assembly 204 configured to add power to the propulsor, the turbomachine 104, or both.

In particular, for the embodiment of FIG. 6, the propulsion system is configured in a similar manner as the exemplary propulsion system of FIG. 5. In such a manner, it will be appreciated that the propulsor and turbomachine 104 together form a gas turbine engine 100, with the propulsor configured as a fan section 102 having a fan 126 driven by the turbomachine 104 to generate thrust. Similarly, for the embodiment shown, the fuel cell assembly 204 is integrated into the gas turbine engine 100. More particularly, for the embodiment shown, the turbomachine 104 includes a combustion section 114 having a combustor 206, and the fuel cell assembly 204 includes a fuel cell stack 294 having a fuel cell, with the fuel cell defining an outlet position to remove output products from the fuel cell and provide the output products to the combustor 206.

A fuel delivery system 146 of the propulsion system is configured to provide a fuel flow to the combustor 206 through a combustor fuel delivery line 150C (described as third fuel line 150C, above), and is further configured to provide a fuel flow to the fuel cell assembly 204 through a fuel cell assembly 204 ("FCA") fuel delivery line 150A (described as first fuel line 150A, above).

For the embodiment of FIG. 6, the fuel cell assembly 204 further includes an airflow delivery system and a fuel processing unit 304, which, as will be appreciated from the discussion above, may be configured as a fuel reformer. The fuel processing unit 304 is configured to receive an airflow from an airflow duct 334 of the airflow delivery system and a fuel flow from the FCA fuel delivery line 150A. The fuel processing unit 304 is further configured to provide a fuel flow to the fuel cell of the fuel cell stack 294 through a first fuel cell fuel delivery line 336 of the fuel cell assembly 204, and may further bypass the fuel cell of the fuel cell stack 294 by providing a fuel flow directly to the combustor 206 through a second fuel cell fuel delivery line 338 of the fuel cell assembly 204.

Notably, in order to enable a desired level of health monitoring, maintenance guidance, control, and/or fault detection, of the gas turbine engine 100, the fuel cell assembly 204, or both, the propulsion system further includes a gas sensor 350 (generally "350", individually labeled in FIG. 6 as 350A-F) operable with the turbomachine 104, the fuel cell assembly 204, or both for sensing gas composition data of a fluid flow in or to the turbomachine 104, the fuel cell assembly 204, or both. As used herein, the term "gas composition data" generally refers to data relating to the identification of one or more gases within a fluid flow and a percentage of the one or more gases within the fluid flow (e.g., a percentage of a fluid flow that is Gas A (where "Gas A" refers to one of the gases disclosed herein)). Unless stated otherwise, the gas composition percentages provided herein refer to a percent by volume.

More specifically, for the exemplary embodiment depicted, the gas sensor 350 is configured as a multi-gas sensor, such that the gas composition data includes data indicative of at least two gas compositions. The at least two gas compositions may be two gas compositions within the same fluid flow, or within multiple fluid flows.

More specifically still, for the embodiment depicted, the propulsion system includes a plurality of multi-gas sensors.

Particularly for the embodiment depicted, the propulsion system includes a fuel gas sensor 350A configured to sense gas composition data of the fuel flow provided to the combustor 206 through combustor fuel delivery line 150C. In particular, for the embodiment shown, the fuel gas sensor 350A is positioned in line with the combustor fuel delivery line 150C of the fuel delivery system 146.

As depicted schematically in Circle 6A, the fuel gas sensor 350A is a multi-gas sensor having a sensing circuit 352 with one or more sensing elements 354; a management circuit 356; and one or more processors 358. The management circuit 356 is configured to excite the one or more sensing elements 354 with an alternating current at one or more frequencies, and further is configured to measure one or more electrical responses of the one or more sensing elements 354 responsive to exciting the sensing element with the alternating current at the one or more frequencies. The management circuit 356 is configured to determine one or more characteristics of the sensing circuit 352. The one or more processors 358 are configured to receive the one or more electrical responses of the one or more sensing elements 354 and the one or more characteristics of the sensing circuit 352. The one or more processors 358 are further configured to determine the gas composition data based on the one or more electrical responses of the one or more sensing elements 354 and the one or more characteristics of the sensing circuit 352. A more detailed description of such a configuration is provided below with reference to FIGS. 23 to 32.

It will be appreciated, however, that in other exemplary embodiments, any other suitable gas sensor technology, or multi-gas sensor technology, may be utilized, as discussed in more detail below.

Referring still to the close-up in Circle 6A, as noted above, the fuel gas sensor 350A is positioned in line with the combustor fuel delivery line 150C of the fuel delivery system 146. In such a manner, it will be appreciated that the one or more sensing elements 354 of the sensing circuit 352 of the fuel gas sensor 350A may be directly exposed to the fuel flow through the combustor fuel delivery line 150C during operation of the propulsion system.

It will be appreciated that by sensing gas composition data of the fuel flow provided to the combustor 206, variations in the fuel flow provided to the combustor 206 may be determined and accounted for through control of the gas turbine engine 100, the fuel cell assembly 204, or both. For example, in certain exemplary aspects, the gas turbine engine 100 may be configured to receive an aviation fuel, a sustainable fuel, or combination thereof during operation. Regardless, by sensing the gas composition data, variations in the fuel compositions or other characteristics of the fuel (which may result simply from receiving fuel from different fuel tanks of the fuel delivery system 146) may be determined and operation of the gas turbine engine 100, the fuel cell assembly 204, or both may be adjusted to account for such variations. The variations may account for different heat values of the fuel/enthalpy of the fuel.

Referring still to get FIG. 6, the propulsion system further includes an airflow gas sensor 350B operable with the airflow delivery assembly for sensing gas composition data of the airflow through the airflow delivery assembly (and more particularly through airflow duct 334) to the fuel processing unit 304. In such a manner, the airflow gas sensor 350B may be configured to sense gas composition data of the airflow, including a percentage of oxygen within the airflow, a percentage of nitrogen within the airflow, a percentage of air impurities within the airflow (e.g., carbon dioxide, sulfur, and the like), etc. Such gas composition data may be utilized to control, e.g., the fuel cell assembly 204 by allowing for a specific volume of oxygen to be provided to the fuel processing unit 304, the fuel cell stack 294, or both. Further, such gas composition data may be utilized to inform a baseline for determining fuel cell leakage and fuel cell diagnosis information, as described below.

Additionally, the propulsion system includes a first fuel cell gas sensor 350C operable with the flow of fuel through the first fuel cell fuel delivery line 336 and a second fuel cell gas sensor 350D operable with the flow of fuel through the second fuel cell fuel delivery line 338. In such a manner, the first fuel cell gas sensor 350C may be configured to sense gas composition data of the fuel flow at a location downstream of the fuel processing unit 304 and upstream of the fuel cell and the second fuel cell gas sensor 350D may be configured to sense gas composition data of the fuel flow bypassing the fuel cell and fuel cell stack 294 at a location downstream of the fuel processing unit 304 and upstream of the combustor 206. The gas composition data sensed by the first fuel cell gas sensor 350C, the second fuel cell gas sensor 350D, or both may include a percentage of hydrogen within the fuel flow to determine, e.g., heat value of the fuel/an amount of enthalpy of the fuel. Other gas composition data of the first fuel cell gas sensor 350C, the second fuel cell gas sensor 350D, or both includes carbon monoxide (CO), carbon dioxide ($CO_2$), methane ($CH_4$), light hydrocarbons such as $C_2$-$C_4$; nitrogen ($N_2$), steam, ammonia ($NH_3$), non-volatile Particulate Matter (PM) and volatile PM, other major components in the fuel, other minor components within the fuel, other components within the fuel, etc.

Further, the propulsion system includes an output products gas sensor 350E and an oxygen gas sensor 350F. The output products gas sensor 350E is configured to sense gas composition data of the flow of output products from the fuel cell of the fuel cell stack 294 at a location downstream of the fuel cell and upstream of the combustor 206. The oxygen gas sensor 350F may be configured to sense gas composition data of a fluid surrounding the fuel cell stack 294, such as an oxygen content of the fluid surrounding the fuel cell stack 294 (e.g., for leakage detection and diagnosis), a combustible gas (such as hydrogen) content of the fluid surrounding the fuel cell stack 294 (e.g., as a safety sensor), etc.

As with the first fuel cell gas sensor 350C and the second fuel cell gas sensor 350D, the output products gas sensor 350E may be configured to sense gas composition data including a percentage of hydrogen within the output products. Such may again allow for a determination of a heat value of the output products/how much enthalpy is provided to the combustor 206 from the fuel cell, e.g., for use in controlling the fuel cell assembly 204, a gas turbine engine 100, or both.

Additionally, or alternatively, the output products gas sensor 350E may be configured to sense gas composition data indicative of a percentage of $H_2O$ within the output products, a percentage of carbon dioxide within the output products, a percentage of nitrogen within the output products, etc. Such gas composition data may be utilized to control the fuel cell assembly 204, the gas turbine engine 100, or both for, e.g., emissions purposes, and/or for determining health information of the fuel cell assembly 204 (e.g., for diagnosing leakage information within the fuel cell assembly 204, etc.).

Figure 7:
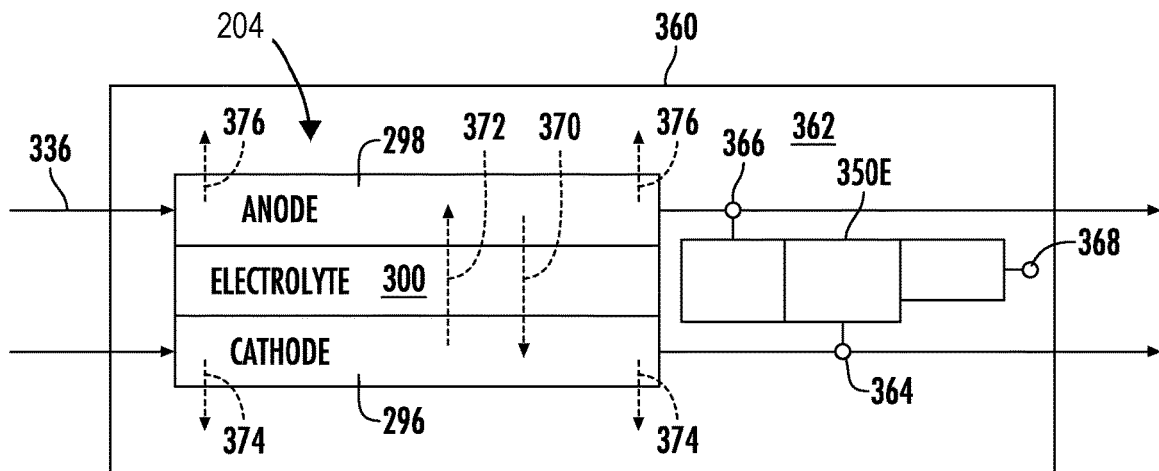
FIG. 7 is a schematic view of a fuel cell assembly in accordance with an exemplary embodiment of the present disclosure.

Referring now to FIG. 7, a close-up, schematic view of the fuel cell of the fuel cell stack 294 in the exemplary fuel cell assembly 204 of FIG. 6 is depicted with the output products gas sensor 350E. Notably, for the embodiment depicted, the fuel cell assembly 204 further includes an enclosure 360 at least partially surrounding the fuel cell, and although not depicted, the fuel cell stack 294 including the fuel cell. The enclosure 360 may be formed of one or more walls positioned around the fuel cell (and fuel cell stack 294). For example, when the exemplary fuel cell of FIG. 7 is incorporated into the fuel cell assembly 204 depicted in FIG. 2 and described above, the enclosure 360 may be positioned between the outer liner 210 and the outer casing 220 to protect the fuel cell stack 294 from an airflow through the outer passageway 226 (see FIG. 2). The enclosure 360 may further assist with maintaining a temperature of the fuel cell (and fuel cell stack 294) at a desired operating temperature.

Further, for the embodiment of FIG. 7, the gas sensor 350E is configured to sense gas composition data of a flow of output products from the fuel cell, and more specifically, a flow of output products from the cathode 296 and a flow of output products from the anode 298, as well as a gas composition data of a fluid 362 (e.g., gas) surrounding the fuel cell, and more specifically, of the fluid 362 surrounding the fuel cell within the enclosure 360. As used herein, this fluid 362 is considered a fluid flow.

In particular, the gas sensor 350E includes a node 364 exposed to the flow of output products from the cathode 296, a node 366 exposed to the flow of output products from the anode 298, and a node 368 exposed to the fluid 362 surrounding the fuel cell. The gas composition data sensed from the output products gas sensor 350E may be used to determine health information of the fuel cell assembly 204, and further may be used to diagnose a fault or an anomaly within the fuel cell assembly 204, such as a leakage within the fuel cell assembly 204.

For example, as will be explained in more detail below, the presence of carbon dioxide, $H_2O$, or both in the output products from the cathode 296 may indicate a crossover leak 370 from the anode 298 to the cathode 296 (depicted in phantom in FIG. 7) as the airflow provided to the cathode 296 likely will not include any carbon dioxide or $H_2O$ and these are components that are present in the anode 298 during operation. Similarly, an increase in the flow rate of the output products from the cathode 296, absent an increase in the flow rate of the airflow provided to the cathode 296, may indicate the crossover leak 370 from the anode 298 to the cathode 296.

For example, when the percentage of carbon dioxide in the output products from the cathode 296 is greater than 0, such as greater than 0 and up to about 1%, such may indicate the crossover leak 370 from the anode 298 to the cathode 296. Similarly, when the percentage of $H_2O$ in the output products from the cathode 296 is greater than 0, such as greater than 0 and up to about 5%, such as up to about 3%, such may also indicate the crossover leak 370 from the anode 298 to the cathode 296. An alternative way for the diagnosis of a crossover leak 370 from the anode 298 to the cathode 296 may be based on a trending of these detected gas compositions rather than their absolute values. For example, if any of a percentage of $CO_2$, a percentage of $H_2O$, or a flowrate of the output products from the cathode 296 increases, the controller (e.g., controller 240 of FIG. 6) may determine the crossover leak 370 from the anode 298 to the cathode 296, and, e.g., provide an alert indicating the same.

Similarly, for example, the presence of nitrogen within the output products from the anode 298 may indicate a crossover leak 372 from the cathode 296 to the anode 298 (depicted in phantom in FIG. 7; the term "crossover leakage" is synonymous with "crossover leak") as the fuel flow provided to the anode 298 likely will not include any nitrogen. Similarly, an increase in the flow rate of the output products from the anode 298, absent a corresponding increase in fuel flow to the anode 298, may also indicate the crossover leak 372 from the cathode 296 to the anode 298.

For example, when a percentage of the nitrogen in the output products from the anode 298 is greater than 0, such as greater than 0 and up to about 1%, such may indicate the crossover leak 372 from the cathode 296 to the anode 298. An alternative way for the diagnosis of a crossover leak 372 may be based on a trending of these detected gas compositions rather than their absolute values. If either the nitrogen gas concentration or an anode 298 exhaust flowrate increases, the controller may determine the crossover leak 372 from the cathode 296 to the anode 298, and, e.g., provide an alert indicating the same.

Further, for example, the gas composition data sensed by the gas sensor 350E may further include a percentage of oxygen ($O_2$) in the fluid 362 surrounding the fuel cell. The sensed data relating to the percentage of oxygen in the fluid 362 surrounding the fuel cell may also be provided to the controller, and the controller may be configured to determine the fuel cell leakage diagnostic information further in response to such sensed data. For example, if the percentage of oxygen in the fluid 362 surrounding the fuel cell is decreasing, and further if the percentage of oxygen in the fluid 362 surrounding the fuel cell is greater than a percentage of oxygen in the output products from the cathode 296, then such may indicate an overboard leak 374 from the cathode 296. Further for example, if the percentage of oxygen in the fluid 362 surrounding the fuel cell is decreasing, and further if the percentage of oxygen in the fluid 362 surrounding the fuel cell is less than a percentage of oxygen in the output products from the cathode 296, then such may indicate an overboard leak 376 from the anode 298.

Figure 8:
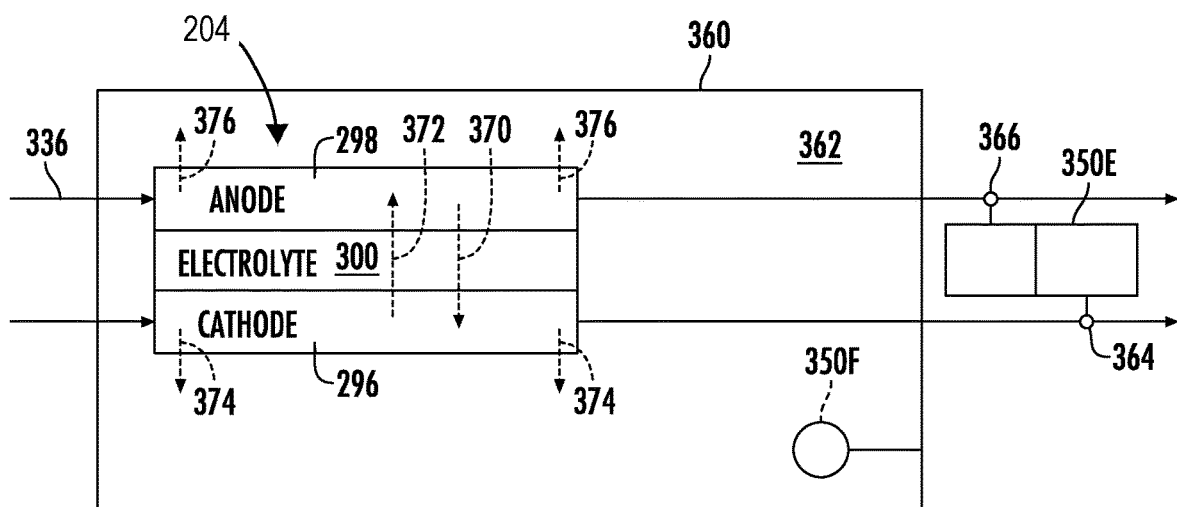
FIG. 8 is a schematic view of a fuel cell assembly in accordance with another exemplary embodiment of the present disclosure.

It will be appreciated, however, that although for the embodiment of FIG. 7, the output products gas sensor 350E is positioned within the enclosure 360, in other exemplary embodiments, the output products gas sensor 350E may alternatively be positioned outside of the enclosure 360. Such configuration is depicted in the exemplary embodiment of FIG. 8. The same or similar numbers may refer to the same or similar part. It will be appreciated that with such a configuration, a separate gas sensor 350F may be provided within the enclosure 360 for detecting a percentage of oxygen within the fluid 362 surrounding the fuel cell.

Referring back to FIG. 6, it will be appreciated that with one or more of the configurations described above, one or more of the gas sensors 350 included may be exposed to a relatively harsh environment during operating conditions of the propulsion system. For example, as will be appreciated from the description hereinabove, the propulsion system is generally configured as an aeronautical propulsion system. In order for the gas sensors 350 described herein to operate in a desired manner, the gas sensors 350 need to be configured to sense (and capable of sensing) the gas composition data of the fluid flow in or to the turbomachine 104, the fuel cell assembly 204, or both during a flight operation of the propulsion system (e.g., takeoff, climb, cruise, descent, landing). Moreover, it will be appreciated that the gas sensors 350 described herein will be positioned within an outer casing of the turbomachine 104 (or "under-cowl"; see, e.g., location of integrated fuel cell and combustor 206 assembly 200 of FIG. 1, located within casing 106 of the turbomachine 104). The under-cowl environment may be relatively harsh during the flight operation of the propulsion system.

As such, it will be appreciated that during a normal operating condition of the propulsion system (e.g., takeoff, climb, cruise, descent, landing), the gas sensor 350 may be positioned within an environment within the turbomachine 104, within the fuel cell assembly 204, or both having a temperature of at least 200° C. For example, in certain exemplary embodiments, the gas sensor 350 may be positioned within an environment within the turbomachine 104, within the fuel cell assembly 204, or both having a temperature of at least 400° C. and up to 1000° C. during the normal operating condition of the propulsion system. Such operating temperature ranges may include one or more the locations depicted in FIGS. 6 through 8. For example, the various locations within the fuel cell assembly 204 (e.g., between the fuel processing unit 304 and fuel cell stack 294, between the fuel cell stack 294 and combustor 206, within or around the enclosure 360, etc.) may be at temperatures between 450° C. and 1000° C., such as between 600° C. and 900° C. during the normal operating condition. Similarly, various locations along the combustor fuel delivery line 150C may be at temperatures of at least 200° C. and up to 650° C., such as between 300° C. and 500° C., and at a pressure between 100 bar and 300 bar during the normal operating condition. The gas sensors 350 described herein are configured to be able to withstand these environments.

Further, it will be appreciated that one or more of the exemplary gas sensors 350 described herein may be configured to sense gas composition data, the gas composition data including one or more of the following: $H_2$%, CO %, $CO_2$%, $CH_4$%, $H_2O$ %, $N_2$%, $NH_3$%, non-volatile particulate matter percentage, and volatile particulate matter percentage. In particular, with the least certain of the exemplary gas sensors 350 described herein, the gas sensors 350 may be configured as multi-gas sensors, configured to sense gas composition data including two or more of the following: $H_2$%, CO %, $CO_2$%, $CH_4$%, $H_2O$ %, $N_2$%, $NH_3$%, non-volatile particulate matter percentage, and volatile particulate matter percentage.

Further, still, it will be appreciated that at least gas sensor 350 may be configured to both withstand the above mentioned environments during normal operating conditions of the propulsion system and sense the desired gas composition data, while being relatively small and lightweight. In particular, one or more of the exemplary gas sensors 350, and in particular the sensing element(s) (see, e.g., sensing elements 354 in FIG. 6) disclosed herein may have a size less than about 20 millimeters ("mm") in length by less than about 20 mm in width by less than about 20 mm in thickness (i.e., less than about 20 mm×20 mm×20 mm). For example, in certain exemplary aspects, the sensing element(s) of the gas sensor 350 may have a size less than about 10 mm×10 mm×10 mm, such as less than about 5 mm×5 mm×5 mm, such as less than about 4 mm×4 mm×2 mm. Further, the sensing element(s) of the gas sensor 350 may have a weight less than 50 grams. For example, in certain exemplary aspects, the sensing element(s) of the gas sensor 350 may have a weight less than 25 grams, such as less than 10 grams, such as less than 5 grams, such as less than 1 gram, such as less than 0.1 grams. Further details of an exemplary gas sensor 350 technology capable of operating within the disclosed environments, sensing the disclose gas composition data, and having the disclosed size and/or weight is provided below with reference to FIGS. 23 through 32.

Further, it will be appreciated that inclusion of a gas sensor 350 in accordance with one or more these exemplary aspects may allow for the gas sensor 350 to be positioned in or proximate to the fluid flow from which the gas composition data is sensed. In particular, inclusion of a gas sensor 350 in accordance with one or more these exemplary aspects may allow for the gas sensor 350 to be separated from a fluid line having the fluid flow in or to the turbomachine 104, the fuel cell assembly 204, or both no more than about 100 millimeters. For example, in certain exemplary embodiments, the gas sensor 350 may be separated from the fluid line by no more than about 50 millimeters, such as by no more than about 20 millimeters. More specifically, in at least certain exemplary aspects, inclusion of a gas sensor 350 in accordance with one or more these exemplary aspects may allow for the gas sensor 350 to be positioned in line with the fluid line (such as the fluid delivery line 150C) providing for the fluid flow in or to the turbomachine 104, the fuel cell assembly 204, or both (see, e.g., gas sensor 350C of FIG. 6), such that the gas sensor 350 is not separated from the fluid line.

Figure 9:
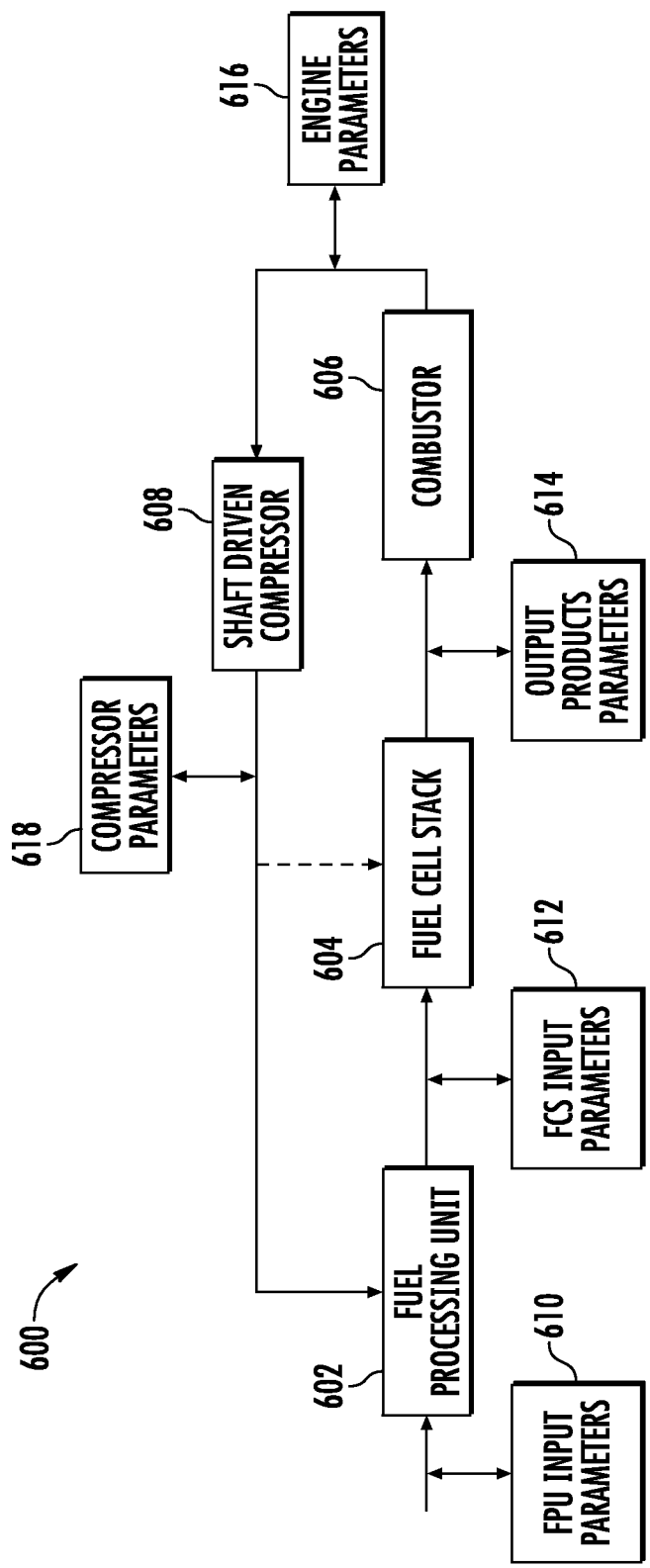
FIG. 9 is a flow chart graphically depicting an interrelatedness of various aspects of a fuel cell assembly integrated into a gas turbine engine.

Referring now to FIG. 9, a flowchart 600 is provided. The flowchart 600 generally depicts graphically the interrelatedness of various aspects of a fuel cell assembly integrated into a gas turbine engine. The aspects described with respect to the flowchart 600 of FIG. 9 may generally apply to one or more of the exemplary gas turbine engines 100 and fuel cell assemblies 204 described herein, e.g., with reference to FIGS. 1 through 8.

The flowchart 600 more specifically relates to the interrelatedness of a fuel cell assembly having a fuel processing unit 602 and a fuel cell stack 604. The fuel processing unit 602 may include a fuel reformer or a catalytic partial oxidation convertor (CPOx) for developing a hydrogen rich fuel stream for the fuel cell stack 604. Further, the gas turbine engine may include a combustor 606 and a shaft driven compressor 608. The shaft driven compressor 608 may be, e.g., a high pressure compressor. As will be appreciated, the shaft driven compressor 608 may be driven by a turbine, which extracts power from combustion gases generated by the combustor 606 during operation.

As will be appreciated, the fuel cell assembly defines a plurality of fuel processing unit (abbreviated "FPU" in FIG. 9) input parameters 610, which may affect operation of the fuel processing unit 602. In certain exemplary aspects, the fuel processing unit input parameters 610 may include an inlet temperature of a fuel provided to the fuel processing unit 602, an inlet pressure of the fuel provided to the fuel processing unit 602, a flow rate of the fuel provided to the fuel processing unit 602, a percentage of various constituents (e.g., sulfur) within the fuel provided to the fuel processing unit 602, an oxygen to carbon ratio (determined, e.g., based on a percentage of oxygen within the fuel), a steam to carbon ratio (determined, e.g., based on a percentage of $H_2O$ within the fuel), etc.

Further, a flow provided to the fuel cell stack 604 from the fuel processing unit 602 defines a plurality of fuel cell stack (abbreviated "FCS" in FIG. 9) input parameters 612, which may affect operation of the fuel cell stack 604. The fuel cell stack input parameters 612 generally include a gas composition of the flow provided from the fuel processing unit 602 to the fuel cell stack 604; a temperature, pressure, and/or flow rate of the flow provided from the fuel processing unit 602 to the fuel cell stack 604; etc.

Moreover, a flow of output products from the fuel cell stack 604 provided to the combustor 606 further defines a plurality of output products parameters 614, which may affect operation of the combustor 606. The output products parameters 614 may include a gas composition of the flow provided from the fuel cell stack 604 to the combustor 606 (e.g., percent $H_2$, indicative of an enthalpy of the output products); a temperature, pressure, and/or flow rate of the flow provided from the fuel cell stack 604 to the combustor 606; etc.

Further, still, the combustor 606 and combustion gases from the combustor 606 define a plurality of engine parameters 616, which may affect the amount of power provided to the shaft driven compressor 608. The engine parameters 616 the general include a temperature within the combustor 606, a turbine inlet temperature, a high-pressure shaft speed, a low pressure shaft speed, etc.

Finally, the shaft driven compressor 608 and an airflow through the shaft driven compressor 608 define a plurality of compressor parameters 618, which may affect one or more flows provided to the fuel processing unit 602 and optionally to the fuel cell stack 604. The compressor parameters 618 may generally include a pressure of the airflow through the shaft driven compressor 608, a temperature of the airflow through the shaft driven compressor 608, a flow rate of the airflow through the shaft driven compressor 608, etc.

In such a manner, will be appreciated that while the various parameters 610, 612, 614, 616, 618 may be specific to one aspect of the fuel cell assembly and gas turbine engine, the parameters 610, 612, 614, 616, 618 may affect other components of the fuel cell assembly and gas turbine engine. Accordingly, by sensing gas composition data of a fluid flow in or to the turbo machine, the fuel cell assembly, or both, one or more of these parameters 610, 612, 614, 616, 618 may be sensed, allowing for a higher level of health monitoring, fuel cell assembly/gas turbine engine control, anomaly detection, and/or fault detection and diagnosis.

In particular, it will be appreciated that various of these parameters 610, 612, 614, 616, 618 may further indicate certain failure modes within the fuel cell assembly, gas turbine engine, or both. For example, various of these parameters 610, 612, 614, 616, 618 may indicate certain failure modes of the particular component, or of a downstream or upstream component.

For example, the fuel processing unit 602 may be susceptible to failure modes including carbon deposition, catalyst poisoning, and catalyst oxidation. Carbon deposition may generally be driven by a temperature of the fuel provided to the fuel processing unit 602 and an oxygen to carbon ratio of the fuel provided to the fuel processing unit 602. Carbon deposition may result in one or more of a deactivation of the catalyst within the fuel processing unit, a blockage within the fuel processing unit, a higher pressure loss across the fuel processing unit, and a lower hydrogen yield from the fuel processing unit (e.g., a reduction in a percentage of hydrogen in the flow provided from the fuel processing unit 602 to the fuel cell stack 604). Catalyst poisoning may generally be driven by a percentage of sulfur within the fuel provided to the fuel processing unit 602 and may have a similar impact as carbon deposition. Further, catalyst oxidation may be driven by providing too much air in the flows provided to the fuel processing unit 602, and further may result in a similar impact as carbon deposition.

Further, the fuel cell stack 604 may be susceptible to failure modes including cross leakage between an anode and a cathode of a fuel cell of the fuel cell stack 604, overboard leakage from the anode or the cathode of the fuel cell of the fuel cell stack 604, anode oxidation, and carbon deposition. Cross leakage between the anode and the cathode may generally result from a crack in the electrode layer positioned therebetween. The result of a cross leakage or overboard leakage is described above with reference to FIGS. 7 and 8. When anode oxidation occurs, such may result in a lower output voltage from the fuel cell stack 604 and a cracking of the anode. Carbon deposition of the fuel cell stack 604 may result from a low steam to carbon ratio in the flow provided to the fuel cell stack 604, and can result in one or more of a deactivation of the catalyst, a blockage within the catalyst (potentially leading to a hotspot), an increased pressure loss across the catalyst, and a reduction in power output from the fuel cell stack 604.

As should be appreciated, carbon deposition within the fuel cell stack 604 may occur relatively quickly (e.g., within 30 minutes or less), and may further result in a deposition of carbon within the combustor 606, which may potentially flow into a turbine section of the gas turbine engine, potentially damaging turbine rotor blades (e.g., causing spallation of a thermal barrier coating of one or more turbine rotor blades). Inclusion of one or more gas sensors operating on a relatively quick time resolution, as discussed below, to sense gas composition data, including the fuel cell stack input parameters 612, the output products parameters 614, or both, may provide advance notice of a potential carbon deposition within the fuel cell stack 604 (referred to hereinbelow as an "incipient anomaly"), allowing for operation of the gas turbine engine, fuel cell assembly, or both to be modified to minimize any damage.

Further, still, the combustor 606 may be susceptible to failure modes including flameout, combustor dynamics, and carbon deposition/damage. Flameout within the combustor 606 may generally be a result of a fuel to air ratio provided to the combustor 606, a temperature of the fuel provided to the combustor 606, a pressure of the fuel provided to the combustor, or a combination thereof. The output products parameters 614, the engine parameters 616, or both may provide data indicative of one or more of these combustor failure modes.

Figure 10:
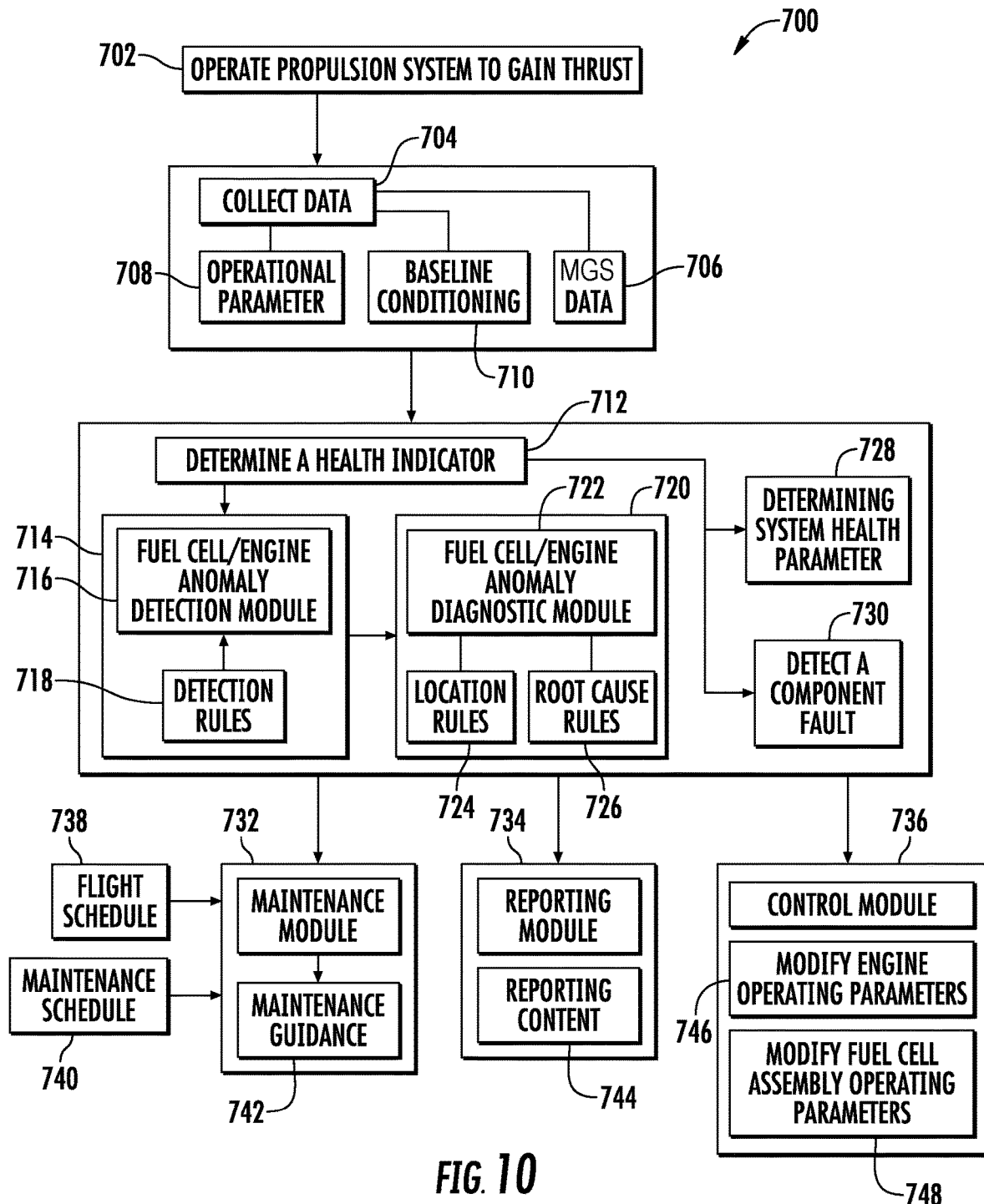
FIG. 10 is a flow diagram of a method for operating a propulsion system in accordance with an exemplary aspect of the present disclosure.

Referring now to FIG. 10, a flow diagram of a method 700 for operating a propulsion system in accordance with an exemplary aspect of the present disclosure is provided. In particular, the method 700 relates to a method for determining a health indicator for a gas turbine engine, a fuel cell assembly, or both, and further for providing a maintenance response, a reporting response, a control response, or a combination thereof in response to the determined health indicator. The method 700 may be utilized with one or more of the exemplary propulsion systems described above, such as with one or the exemplary fuel cell assemblies and gas turbine engines described herein.

The method 700 generally includes at (702) operating the propulsion system to generate thrust for a vehicle. The vehicle may be an aeronautical vehicle, such as an aircraft. The propulsion system may generally include the gas turbine engine and the fuel cell assembly. The fuel cell assembly may be integrated into the gas turbine engine, for example, in one or more of the manners described herein (see, e.g., FIG. 2). In at least certain exemplary aspects, operating the propulsion system to generate thrust for the vehicle at (702) may include operating the propulsion system in a flight condition, such as a takeoff flight condition, a climb flight condition, a cruise flight condition, a descent flight condition, etc.

The method 700 further includes (704) collecting data. In particular, collecting data at (704) includes at (706) receiving from a multi-gas sensor gas composition data of one or more fluid flows in or to the gas turbine engine, the fuel cell assembly, or both while operating the propulsion system at (702). The gas composition data received at (706) may include one or more of the parameters 610, 612, 614, 616, 618 described above with reference to the flowchart 600 of FIG. 9. Additionally, or alternatively, the gas composition data may be any other suitable gas composition data.

Notably, for the exemplary aspect depicted, collecting the data at (704) further includes at (708) receiving data indicative of an operational parameter for the propulsion system. The operational parameter for the propulsion system may include one or more of the flight condition of the propulsion system, ambient conditions (e.g., an ambient temperature, pressure, flight speed, etc.), temperature data (e.g., a temperature of the fuel cell assembly, a compressor exit temperature, a turbine inlet temperature, etc.), pressure data (e.g., a compressor pressure, a fuel cell stack pressure drop), etc.

The method 700 further includes at (710) determining baseline data for the gas turbine engine, the fuel cell assembly, or both in response to the collected data at (704), and more specifically, in response to the operational parameter(s) received at (708). The baseline data for the gas turbine engine, the fuel cell assembly, or both determined at (710) may include baseline information for the gas turbine engine, the fuel cell assembly, or both for a given flight condition and/or for a given operating condition of the gas turbine engine, the fuel cell assembly, or both.

Referring still to FIG. 10, the method 700 further includes at (712) determining a health indicator for the gas turbine engine, the fuel cell assembly, or both in response to the received gas composition data at (706). More specifically, for the exemplary aspect depicted, determining the health indicator at (712) includes at least one of detecting an anomaly at (714), determining a system health parameter at (728), or detecting a component fault at (730).

As used herein, the term "anomaly" refers to a condition whereby the affected component is thought to be operating outside of a nominal degradation state, but may still be operable to provide a beneficial result for the propulsion system. The term "system health parameter" refers to degradation information (e.g., accumulated degradation information, percent degraded from new, or the like). The system health parameter for a component may indicate that the component is operating with less than nominal degradation, may indicate that the component has experienced an anomaly condition, or may indicate that the component has experienced a fault. The term "fault" refers to a condition where the component is no longer capable of providing a beneficial result for the propulsion system.

Detecting the anomaly at (714) more specifically includes at (716) detecting the anomaly with a fuel cell/engine anomaly detection module, and detecting the anomaly with the fuel cell/engine anomaly detection module at (716) includes at (718) utilizing one or more anomaly detection rules. For example, in the exemplary aspect depicted, detecting the anomaly at (714) may include comparing the gas composition data received at (706) to the baseline data determined data determined using the operational parameter received at (708). For example, detecting the anomaly at (714) may include detecting an abnormal level of a gas constituent of a fluid flow as compared to an expected level of the gas constituent in the particular fluid flow for the operating condition of the propulsion system. The abnormal level may refer to a level above or below a predetermined threshold for the gas constituent in the fluid flow for the given operating condition.

Referring still to the exemplary method 700 of FIG. 10, for the exemplary aspect depicted, determining the health indicator at (712) further includes at (720) determining an anomaly type, determining an affected part, or both. More specifically, for the exemplary aspect depicted, determining the anomaly type, determining the affected part, or both at (720) includes at (722) operating a fuel cell/engine anomaly diagnostic module. Operating the fuel cell/engine anomaly diagnostic module at (722) may include (724) utilizing fuel cell/engine anomaly location rules to determine the affected part, and at (726) utilizing fuel cell/engine anomaly root cause analysis rules to determine the anomaly type.

In certain exemplary aspects, examples of the anomaly type and anomaly location may be one or more of the exemplary failure modes identified above with reference to FIG. 9. Exemplary methods including more detail on the determination of the anomaly type, determining the affected part, or both at (720) are described in more detail below with reference to FIGS. 11 through 14.

Referring still to the exemplary method 700 of FIG. 10, as briefly mentioned above, determining the health indicator at (712) may further include at (728) determining a system health parameter. The system health parameter may indicate the degree of degradation of one or more components of the gas turbine engine, the fuel cell assembly, or both. For example, the method 700 may determine the system health indicator at (728) based on the comparison of the gas composition data received at (706) to the baseline gas composition data (determined, e.g., using the operation parameter received at (708)).

Notably, the system health parameter determined at (728) may provide data relating to a degradation of a system component prior to the system component degrading to the point that the method 700 would detect an anomaly during operation of the component. For example, the system health parameter determined at (728) may provide data relating to a degree of degradation of the component while the component is operating within a normal operational range. More specifically, the system health parameter determined at (728) may provide data of an incipient anomaly.

Moreover, as also mentioned briefly above, referring still to the exemplary method 700 of FIG. 10, determining the health indicator at (712) may further include at (730) detecting the component fault. The component fault may indicate the component is no longer capable of operating in a beneficial manner for the gas turbine engine, the fuel cell assembly, or both. The method 700 may detect the component fault at (730) by comparison of the gas composition data received at (706) to the baseline gas composition data (determined, e.g., using the operation parameter received at (708)), and determining the gas composition data is outside a predetermined fault threshold from the baseline gas composition data. The fault threshold may therefore be for a particular operational parameter of the gas turbine engine.

Although not depicted, the method 700 may perform one or more diagnostic steps in response to detecting the component fault at (730) to determine the affected component, a root cause of the component fault, or both.

Referring still to the exemplary method 700 of FIG. 10, it will be appreciated that the method 700 further includes performing a maintenance response, a reporting response, a control response, or a combination thereof in response to the determined health indicator at (712).

In particular, the method 700 includes at (732) operating a maintenance module to provide the maintenance response in response to the determined health indicator at (712), at (734) operating a reporting module to provide the reporting response in response to the determined health indicator at (712), at (736) operating a control module to provide a control response in response to the determined health indicator at (712), or a combination thereof.

Referring first to the operation of the maintenance module at (732), operating the maintenance module at (732) may include at (738) receiving flight schedule data for a current flight of the vehicle including the propulsion system, and at (740) receiving maintenance schedule data for one or more components of the fuel cell assembly, the gas turbine engine, or both.

Further, operation of the maintenance module at (732) includes at (742) providing maintenance guidance in response to the health indicator determined at (712). For example, in certain exemplary aspects, providing maintenance guidance at (742) may include providing maintenance guidance in response to detecting the anomaly at (714), in response to determining the system health parameter at (728), or both. In such a manner, providing the maintenance guidance at (742) may include providing the maintenance guidance for a component while the component is still capable of providing a beneficial operation for the gas turbine engine, the fuel cell assembly, or both.

The maintenance guidance provided at (742) may include providing an indicator to an operator or a controller to perform a maintenance action on a component of the fuel cell assembly, the gas turbine engine, or both, e.g., at the next scheduled maintenance operation. Additionally, or alternatively, the maintenance guidance provided at (742) may include flight plan modifications, maintenance schedule modifications, or service guides (e.g., guidance on which components need maintenance, which type of maintenance is needed, etc.). For example, in certain exemplary aspects, in response to the health indicator determined at (712), the maintenance guidance may indicate a change to the flight schedule is needed, e.g., based on the type of anomaly or fault detected, the component affected by the anomaly or fault detected, or both.

Further, operation of the reporting module at (734) generally includes at (744) providing reporting content in response to the health indicator determined at (712). In certain exemplary aspects, the reporting content provided at (744) may be a diagnostic tree indicating a root cause of the anomaly detected at (714). Further, in other example aspects, the reporting content provided at (744) may include anticipated part degradation information, inventory planning, replacement duration, inventory needs, or the like. Providing the reporting content at (744) may include providing the reporting content to a controller of the propulsion system, the vehicle, or both, may include providing the reporting content to a visual indicator that may be seen by an operator of the propulsion system, etc.

Further, still, operation of the control module at (736) may generally include at (746) modifying an engine operating parameter in response to the health indicator determined at (712), at (748) modifying a fuel cell assembly operating parameter in response to the health indicator determined at (712), or both.

In certain exemplary aspects, the operating parameter of the gas turbine engine modified at (746) may include: a combustor fuel flowrate, a combustor fuel air ratio, a fuel flowrate ratio between combustor fuel flow and fuel cell fuel flow, a variable bleed valve, a variable guide vane, a low pressure shaft speed, a high pressure shaft speed, a variable fan nozzle, an engine-driven generator output, or a combination thereof. Further, in certain exemplary aspects, the operating parameter modified at (748) may include: a fuel flowrate to the fuel cell assembly, a fuel pressure, an equivalence ratio for a fuel processing unit of the fuel cell assembly, a steam carbon ratio for the fuel processing unit of the fuel cell assembly, an air pressure, an air flowrate, an anode to cathode pressure differential, an anode inlet temperature, a cathode inlet temperature, a fuel cell stack temperature, a fuel cell current, a fuel cell utilization, a fuel cell air utilization, or a combination thereof.

Figure 11:
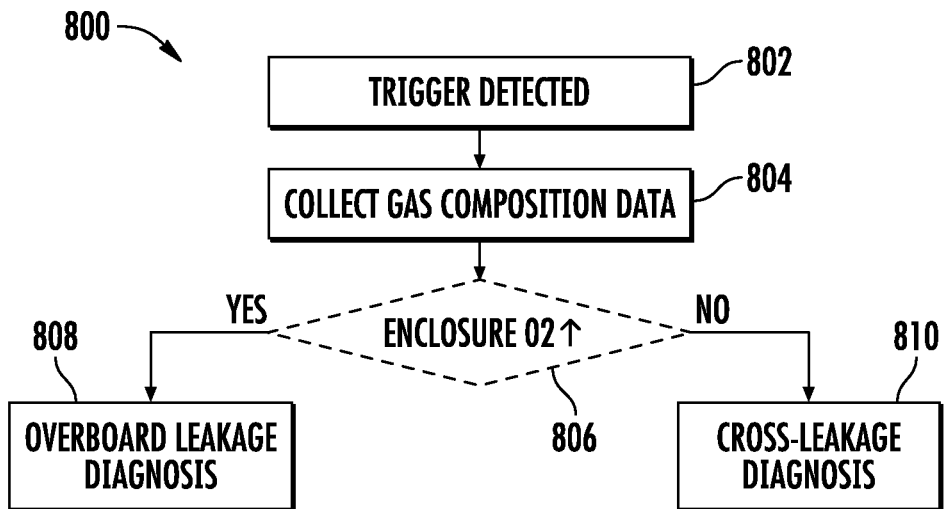
FIG. 11 is a flow diagram of a method for determining fuel cell leakage diagnostic information in accordance with an exemplary aspect of the present disclosure.
Figure 12:
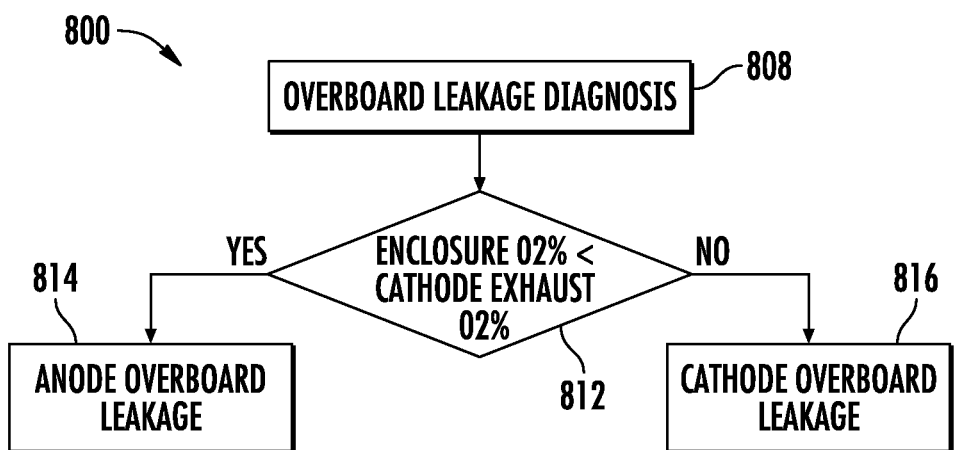
FIG. 12 is a flow diagram of an exemplary aspect of the method of FIG. 11 for determining fuel cell leakage diagnostic information relating to overboard leakage.
Figure 13:
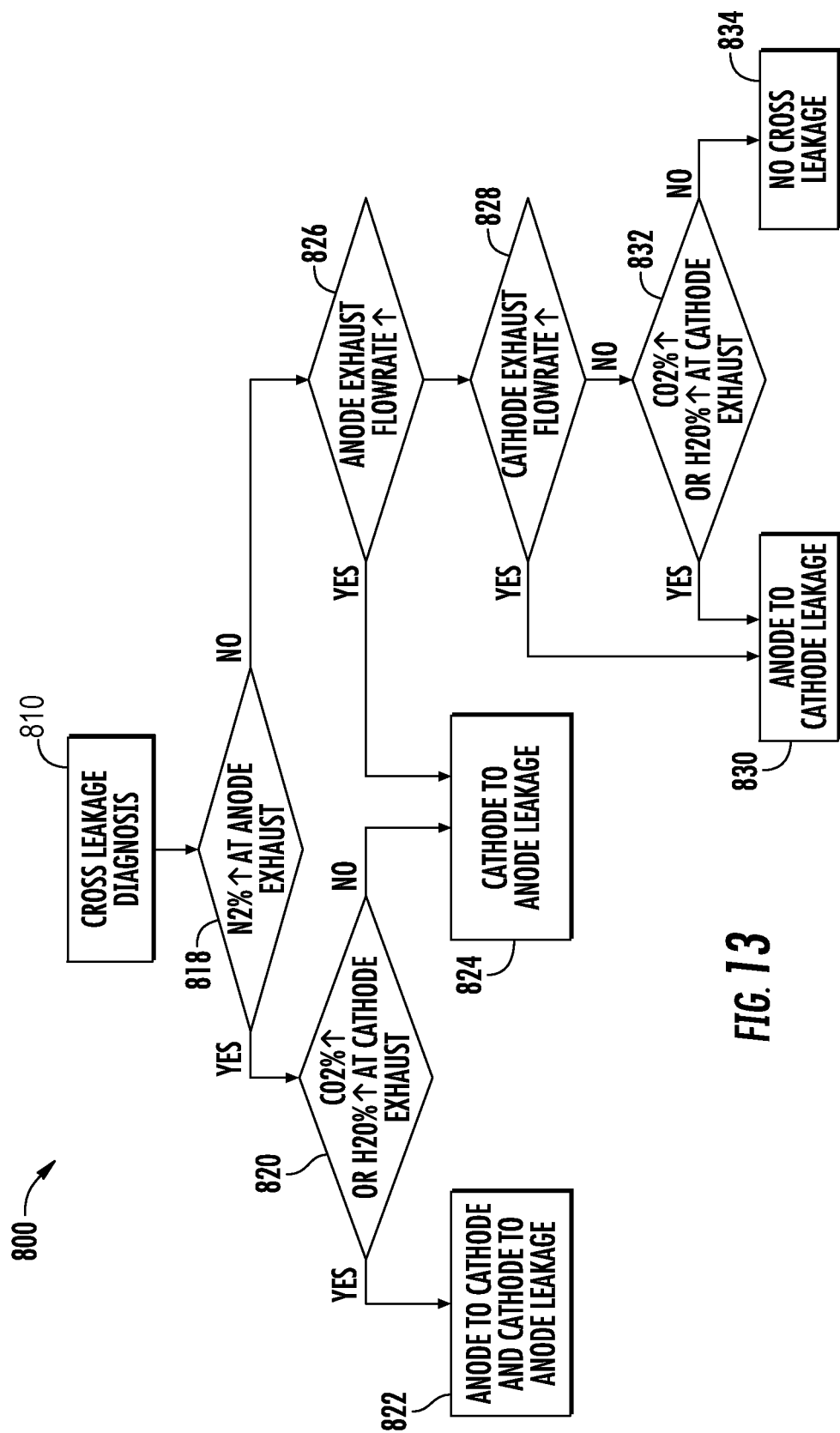
FIG. 13 is a flow diagram of an exemplary aspect of the method of FIG. 11 for determining fuel cell leakage diagnostic information relating to cross-leakage.

Referring now generally to FIGS. 11 through 13, a flowchart of a method 800 for determining a health indicator for a gas turbine engine, a fuel cell assembly, or both, and further for providing a maintenance response, a reporting response, or both in response to the health indicator in accordance with an example aspect of the present disclosure is provided.

Referring now to FIG. 11, a flow diagram of a method 800 for determining fuel cell leakage diagnostic information in accordance with an exemplary aspect of the present disclosure is provided. The method 800 may be utilized with one or more of the exemplary fuel cells and fuel cell assemblies described above with reference to FIGS. 1 through 8. Accordingly, the method 800 may be utilized with a fuel cell assembly having a control system with a gas sensor configured to sense gas composition data of a flow of output products from a cathode of a fuel cell (of a fuel cell stack), gas composition data of a flow of output products from an anode of the fuel cell, gas composition data of a fluid surrounding the fuel cell, or a combination thereof.

The method 800 generally requires receiving from a gas sensor gas composition data of a flow of output products from the cathode, gas composition data of a flow of output products from the anode, gas composition data of a fluid surrounding the fuel cell, or a combination thereof; and determining fuel cell leakage diagnostic information in response to the received gas composition data.

More particularly, for the exemplary aspect of the method 800 depicted, the method 800 includes at (802) detecting a trigger. Detecting the trigger at (802) may include detecting an anomaly with the fuel cell assembly, such as detecting and an un-commanded change in voltage from the fuel cell and/or fuel cell stack, electrical resistance from the fuel cell and/or fuel cell stack, temperature of the fuel cell and/or fuel cell stack, pressure of one or more flow to or from the fuel cell and/or fuel cell stack or within the fuel cell and/or fuel cell stack, etc.

The method 800 further includes at (804) collecting gas composition data. In particular, for the aspect depicted, collecting gas composition data at (804) may be in response to the detected trigger at (802). Collecting the gas composition data at (804) may include collecting the gas composition data utilizing one or more sensors, such as a gas sensor (such as a multi-gas sensor), a dedicated oxygen sensor, etc.

The method 800 additionally includes at (808) initiating an overboard leakage diagnosis, and at (810) initiating a cross-leakage diagnosis. Aspects of the overboard leakage diagnosis initiated at (808) will be described in more detail below with reference to FIG. 12, and aspects of the cross-leakage diagnosis initiated at (810) will be described in more detail below with reference FIG. 13.

Notably, as is depicted in phantom, the method 800 may include at (806) determining from the collected gas composition data if a percentage of oxygen within an enclosure surrounding at least in part the fuel cell and fuel cell stack is increasing. If the percentage of oxygen within the enclosure is increasing as determined at (806), the method 800 may proceed with the initiating the overboard leakage diagnosis at (808), and if not, the method 800 may rule out an overboard leakage and proceed to the cross-leakage diagnosis at (810). Notably, even if the percentage of oxygen within the enclosure is increasing as determined at (806), the method may proceed to the cross-leakage diagnosis at (810).

Referring to FIG. 12, in response to initiating the overboard leakage diagnosis at (808), the method 800 further includes at (812) determining from the collected gas composition data if a percentage of oxygen within the enclosure is greater than a percentage of oxygen within a flow of output products from the cathode. If the percentage of oxygen within the enclosure is less than the percentage of oxygen within the flow of output products from the cathode, as determined at (812), then the method 800 determines at (814) that the fuel cell is experiencing an anode overboard leakage. By contrast, if the percentage of oxygen within the enclosure is greater than the percentage of oxygen within the flow of output products from the cathode, as determined at (812), then the method 800 determines at (816) that the fuel cell is experiencing a cathode overboard leakage.

Referring now to FIG. 13, in response to initiating the cross-leakage diagnosis at (810), the method includes at (818) determining if a percentage of nitrogen within a flow of output products from the anode of the fuel cell is increasing or exceeds a threshold. If the percentage of nitrogen within the flow of output products from the anode is increasing or exceeds a threshold, as determined at (818), the method 800 further includes (820) determining if a percentage of carbon dioxide within the flow of output products from the cathode is increasing or exceeds a threshold, if a percentage of $H_2O$ within the flow of output product from the cathode is increasing or exceeds a threshold, or both. If it is determined that one or both of the percentages of carbon dioxide or $H_2O$ within the flow of output products from the cathode is increasing or exceeds a threshold at (820), then the method 800 includes at (822) determining that the fuel cell is experiencing an anode to cathode cross-leakage, as well as a cathode to anode cross-leakage.

In particular, an increasing percentage of nitrogen within the flow of output products from the anode, or a presence of nitrogen within the flow of output products from the anode in excess of a certain threshold, may indicate a cathode to anode cross-leakage, as nitrogen will not be part of the fuel provided to the anode of the fuel cell during operation of the fuel cell assembly. Similarly, an increasing percentage of carbon dioxide or $H_2O$ within the flow of output products from the cathode, or a presence of carbon dioxide or $H_2O$ within the flow of output products from the cathode in excess of a certain threshold, may indicate an anode to cathode cross-leakage, as neither carbon dioxide nor $H_2O$ will be part of the airflow provided to the cathode of the fuel cell during operation of the fuel cell assembly.

Referring still to the exemplary aspect of the method 800 depicted in FIG. 13, it will be appreciated that in the event it is determined that neither the percentage of carbon dioxide nor the percentage of $H_2O$ within the flow of output products from the cathode is increasing or exceeds a respective threshold, as determined at (820), then the method 800 may determine at (824) that the fuel cell is only experiencing a cathode to anode cross-leakage (due to the percentage of nitrogen within the flow of output products from the anode, as determined at (818)).

Further, in the event that it is determined that the percentage of nitrogen within the flow of output products from the anode is not increasing or does not exceed a threshold at (818) the method 800 may still check for a cathode to anode leakage at (826) by determining if a flow rate of the output products from the anode is increasing. If the flow rate of the output products from the anode is increasing, as determined (826), the method 800 may again determine that the fuel cell is experiencing a cathode to anode cross-leakage at (824).

After the determination at (826), regardless of whether the determination is "yes" or "no", the method includes at (828) determining if a flow rate of the output products from the cathode is increasing. If the flow rate of the output products from the cathode is determined to be increasing at (828), then the method includes at (830) determining that the fuel cell is experiencing an anode to cathode cross-leakage.

In the event that it is determined that the flow rate of the output products from the cathode is not increasing at (828), then the method 800 includes at (832) determining if a percentage of $H_2O$, carbon dioxide, or both within the flow of output products from the cathode is increasing (similar to the determination at (820)). If the percentage of $H_2O$, carbon dioxide, or both is increasing, as determined at (832), then the method again includes at (830) determining that the fuel cell is experiencing an anode to cathode cross-leakage.

However, if it is determined that the percentage of percentage of $H_2O$, carbon dioxide, or both within the flow of output products from the cathode is not increasing at (832), then the method determines at (834) that the fuel cell is not experiencing a cross-leakage.

It will be appreciated that the exemplary method 800 described above with reference to FIGS. 11 through 13 is provided by way of example only. In other exemplary aspects of the present disclosure, the method 800 may not include each of the steps outlined above, and further may include the inquiries outlined above in any other suitable order. For example, in other example aspects where the method 800 is operable with a fuel cell assembly without the capability of sensing gas composition data of the flow of output products from the cathode, the method 800 may not include one or more of (820), (828), (832), etc. Similarly, in other exemplary aspects where the method 800 is operable with a fuel cell assembly without the capability of sensing gas composition data of the flow of output products from the anode, the method 800 may not include one or more of (818), (826). Further, in other exemplary aspects, where the method 800 is operable with a fuel cell assembly without the capability of sensing gas composition data of the fluid surrounding the fuel cell, the method may not include (808) or other aspects of the method 800 depicted in FIG. 13.

Similarly, as noted above, in other exemplary aspects, the method 800 may include the inquiries outlined above in any other suitable order. For example, in other exemplary aspects, one or more of (818), (820) and (832), (826), and (828) may be performed in parallel.

Moreover, as will further be appreciated from the description below, the method 800 may occur in real time. For example, in certain exemplary aspects, receiving the gas composition data (or collecting the gas composition data at (804)) may include receiving data at a resolution of 1 minute or less. For example, in certain exemplary aspects, receiving the gas composition data (or collecting the gas composition data at (804)) may more specifically include receiving data at a resolution of 30 seconds or less, such as 15 second or less, or 5 seconds or less.

In such a manner, the method may be able to make control decisions based on data collected 1 minute beforehand or quicker.

Figure 14:
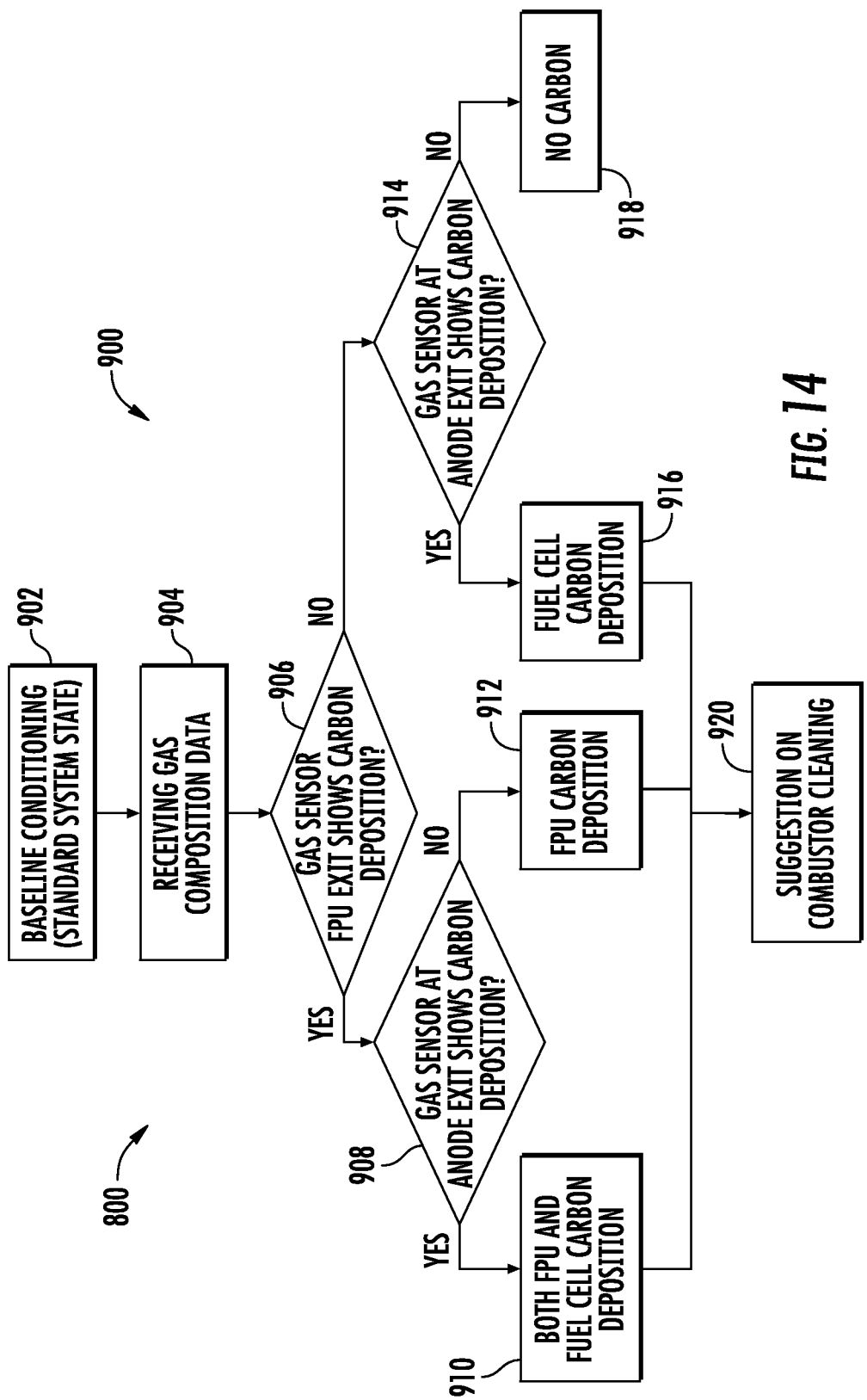
FIG. 14 is a flow diagram of a method for determining carbon deposition diagnostic information in accordance with an exemplary aspect of the present disclosure.

Referring now to FIG. 14, a flowchart of a method 900 for determining a health indicator for a gas turbine engine, a fuel cell assembly, or both, and further for providing a maintenance response, a reporting response, or both in response to the health indicator in accordance with another example aspect of the present disclosure is provided. In particular, for the exemplary aspect of the method 900 of FIG. 14, the health indicator relates to a carbon deposition within a fuel processing unit of a fuel cell assembly, within an anode of a fuel cell of a fuel cell stack of the fuel cell assembly, or both.

The method 900 includes at (902) determining a baseline condition for the fuel cell assembly. Determining the baseline condition may include determining the baseline condition in response to one or more operating conditions or operating parameters of the fuel cell assembly, the gas turbine engine, or both.

The method 900 further includes at (904) receiving gas composition data from one or more gas sensors at various locations within the fuel cell assembly. In particular, the gas composition data includes gas composition data from a first gas sensor located downstream of the fuel processing unit and upstream of the fuel cell stack, and from a second gas sensor located downstream of the fuel cell stack and upstream of a combustor of the gas turbine engine.

At (906) the method 900 determines whether or not the gas composition data from the first gas sensor located downstream of the fuel processing unit (abbreviated as "FPU" in FIG. 14) and upstream of the fuel cell stack indicates a carbon deposition within the fuel processing unit. If said gas composition data indicates carbon deposition within the fuel processing unit, as determined at (906), then the method 900 further determines at (908) whether or not the gas composition data from the second gas sensor located downstream of the fuel cell stack and upstream of the combustor indicates carbon deposition within the anode of the fuel cell of the fuel cell stack. If said gas composition data indicates carbon deposition within the anode of the fuel cell of the fuel cell stack, as determined at (908), then the method 900 further determines at (910) that both the fuel processing unit and the fuel cell include carbon deposition. By contrast, if said gas composition data indicates no carbon deposition within the anode of the fuel cell stack, as determined at (908), then the method 900 determines at (912) that the fuel processing unit includes carbon deposition.

Referring back to the inquiry at (906), if the method 900 determines at (906), based on the gas composition data from the first gas sensor located downstream of the fuel processing unit and upstream of the fuel cell stack, that there is no indication of carbon deposition within the fuel processing unit, then the method proceeds to an inquiry at (914) to determine whether or not the gas composition data from the second gas sensor located downstream of the fuel cell stack and upstream of the combustor indicates carbon deposition within the anode of the fuel cell of the fuel cell stack. If said gas composition data indicates carbon deposition within the anode of the fuel cell of the fuel cell stack, as determined at (914), then the method 900 further determines at (916) that the fuel cell includes a carbon deposition. By contrast, if said gas composition data does not indicate carbon deposition within the anode of the fuel cell stack, as determined at (914), then the method 900 determines at (918) that neither the fuel cell nor the fuel processing unit includes carbon deposition.

If it is determined that the fuel cell, the fuel processing unit, or both includes carbon deposition at (910), (912), or (916), then the method 900 may further include at (920) recommending a maintenance response related to cleaning or inspecting the combustor, the turbine section, or both to ensure any carbon from the fuel processing unit, the fuel cell, or both has not traveled to the combustor or turbine section and potentially damaged aspects of the turbine section (e.g., spallation of a thermal barrier coating of a turbine nozzle or turbine rotor blade).

Figure 15A:
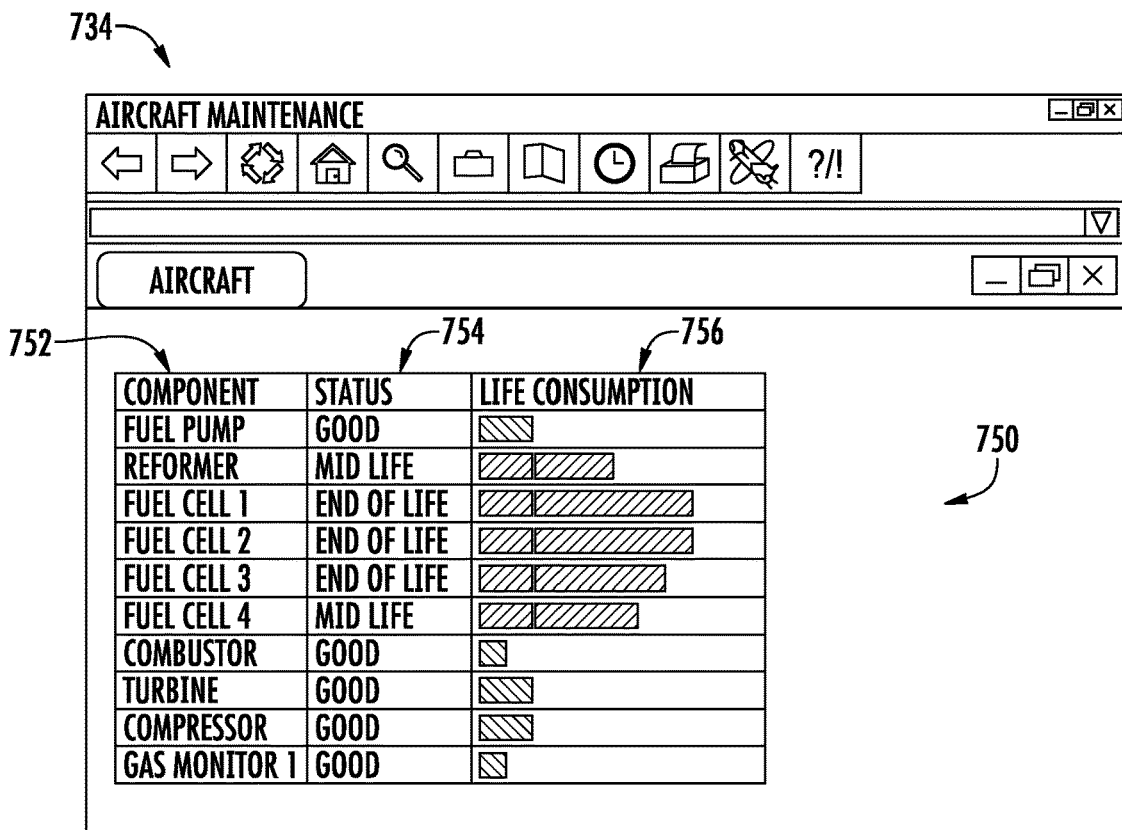
FIG. 15A is a reporting module in accordance with an exemplary aspect of the present disclosure.

Referring now to FIG. 15A, one example of a reporting module 734 is provided in accordance with an exemplary aspect of the present disclosure. In particular, the reporting module 734 may be configured in substantially the same manner as the reporting module 734 described above with reference to FIG. 10.

FIG. 15A more specifically depicts reporting content, and more specifically still depicts a report 750 that may be part of the reporting content. The report 750 provides system health parameter information for various components of a fuel cell assembly and gas turbine engine, as determined, e.g., at (712) in the method 700 of FIG. 10. The report 750 includes a first column 752 providing a name of a component in the fuel cell assembly or gas turbine engine; a second column 754 representing a health status for the corresponding component (e.g., a system health parameter for the component); and a third column 756 representing more specific details of the health status of the corresponding component (e.g., accumulated degradation information of the system health parameter, such as percentage of full life span where a shorter bar means early stage of life and a longer bar means close to end of life).

Figure 15B:
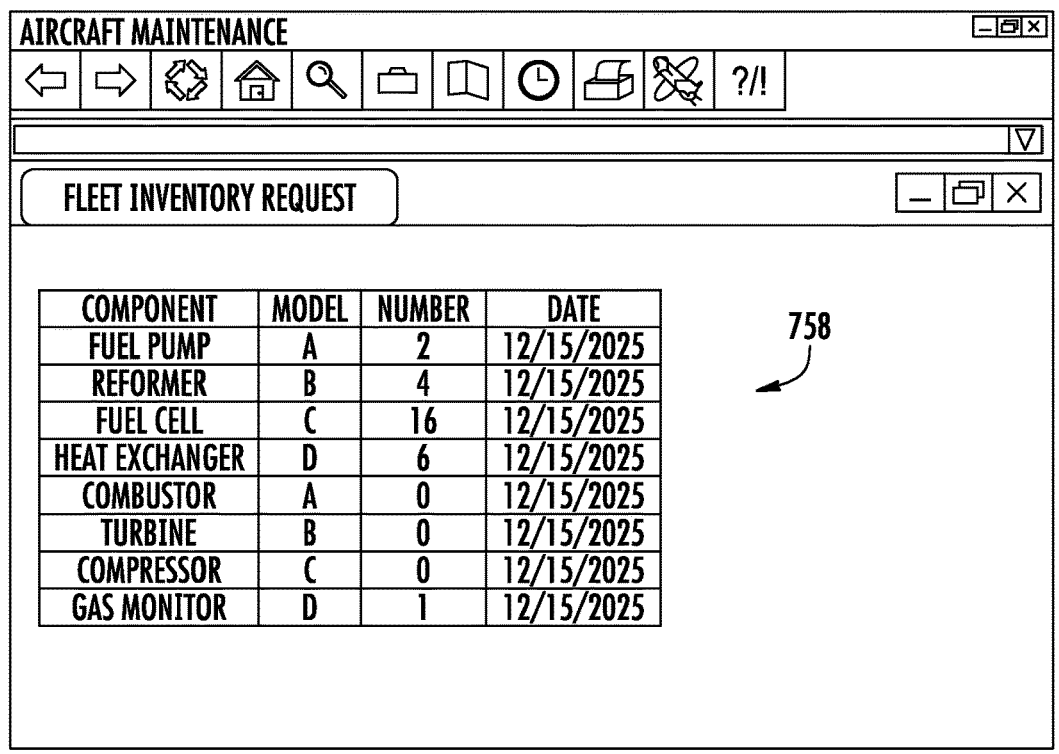
FIG. 15B is an inventory and maintenance table in accordance with an exemplary aspect of the present disclosure.

As described above with reference to FIG. 10, the gas composition data from the gas sensor, together with a component life degradation model may generate the life consumption data, based on an aging indicator, such as the carbon deposition thickness, catalyst deactivation status for a fuel processing unit and/or fuel cell, etc. This information may be transmitted to a flight database, so that a corresponding inventory preparation and maintenance can be scheduled by the fleet management team. FIG. 15B represents an inventory management and maintenance schedule 758 that may be generated based on the information reported in accordance with FIG. 15A.

Figure 16:
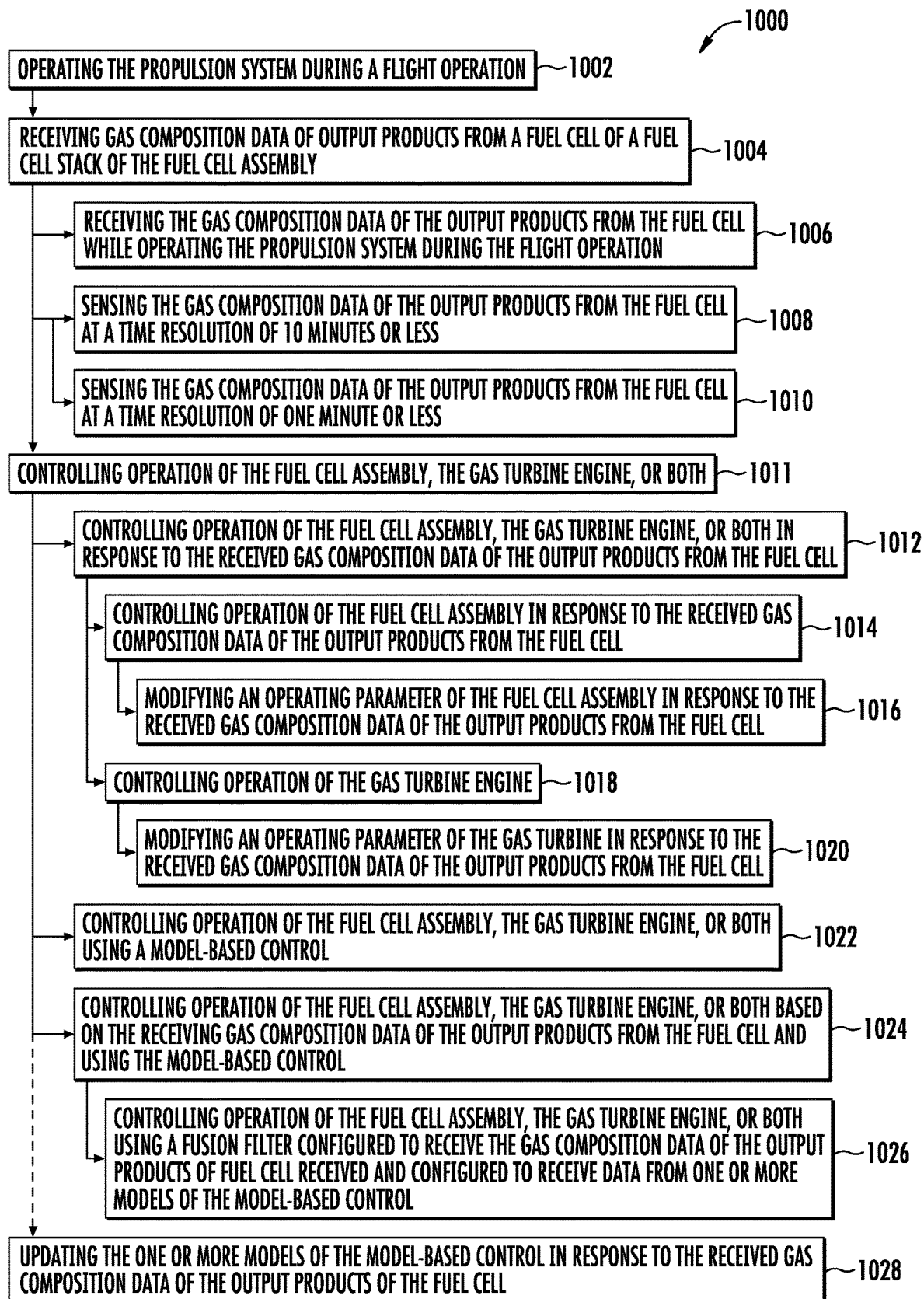
FIG. 16 is a flow diagram of a method for operating a propulsion system in accordance with another exemplary aspect of the present disclosure.

Referring now to FIG. 16, a flow diagram of a method 1000 for operating a propulsion system in accordance with another exemplary aspect of the present disclosure is provided. In particular, the method 1000 relates to a method of operating a propulsion system having a gas turbine engine and fuel cell assembly. The method 1000 may be utilized with one or more of the exemplary propulsion systems described herein, such as with one or more of the exemplary fuel cell assemblies and gas turbine engines described herein.

The method 1000 includes at (1002) operating the propulsion system during a flight operation. Operating the propulsion system during the flight operation at (1002) may include operating propulsion system during a normal flight operation, such as during a take-off operating condition, a climb operating condition, a cruise operating condition, a descent operating condition, etc.

Further, the exemplary method 1000 of FIG. 16 includes at (1004) receiving gas composition data of output products from a fuel cell of a fuel cell stack of the fuel cell assembly. Receiving the gas composition data at (1004) may include receiving the gas composition data from a gas sensor positioned downstream of the fuel cell and upstream of a combustor of the gas turbine engine. The gas sensor may be positioned in line with the flow of output products, or alternatively, may be separated from the flow of output products by a gap of less than 100 millimeters (e.g., less than about 50 mm, such as less than about 20 mm, such as less than about 5 mm). In such a manner, the gas sensor may be configured to sense the gas composition data directly from the flow of output products, or may be configured to sample the flow of output products.

Further, for the exemplary aspect of the method 1000 depicted in FIG. 16, receiving the gas composition data of the output products from the fuel cell at (1004) further includes at (1006) receiving the gas composition data of the output products from the fuel cell while operating the propulsion system during the flight operation at (1002).

As will be appreciated from the description herein, the gas sensor used to determine the gas composition data may be capable of sensing the gas composition data at a relatively quick time resolution. In such a manner, it will be appreciated that in the exemplary aspect of FIG. 16, receiving the gas composition data at (1004) may further include at (1008) sensing the gas composition data of the output products from the fuel cell at a time resolution of 10 minutes or less, or at (1010) sensing the gas composition data of the output products from the fuel cell at a time resolution of one minute or less. As used herein, the term "time resolution" in the context of sensing gas composition data refers to a time between when an initial measurement is taken and when the gas composition data is available to be provided to, e.g., a controller configured to make control decisions in response to the gas composition data. In certain example aspects, the time resolution at which the gas sensor senses the gas composition data of the output products from the fuel cell may be less than about 30 seconds, such as less than about 15 seconds, such as less than about five seconds, such as less than about two seconds. In such a manner, the gas sensor may be configured to sense gas composition data in real time.

Referring still to the exemplary aspect of the method 1000 depicted in FIG. 16, the method 1000 further includes at (1011) controlling operation of the fuel cell assembly, the gas turbine engine, or both. More specifically, controlling operation of the fuel cell assembly, the gas turbine engine, or both at (1011) includes at (1012) controlling operation of the fuel cell assembly, the gas turbine engine, or both in response to the received gas composition data of the output products from the fuel cell at (1004).

More specifically, in one exemplary aspect of the method 1000 depicted in FIG. 16, controlling operation of the fuel cell assembly, the gas turbine engine, or both at (1012) includes at (1014) controlling operation of the fuel cell assembly in response to the received gas composition data of the output products from the fuel cell. Controlling operation of the fuel cell assembly at (1014) may include at (1016) modifying an operating parameter of the fuel cell assembly in response to the received gas composition data of the output products from the fuel cell. In certain exemplary aspects, the operating parameter modified at (1016) may include: a fuel flowrate to the fuel cell assembly, a fuel pressure, an equivalence ratio for a fuel processing unit of the fuel cell assembly, a steam carbon ratio for the fuel processing unit of the fuel cell assembly, an air pressure, an air flowrate, an anode to cathode pressure differential, an anode inlet temperature, a cathode inlet temperature, a fuel cell stack temperature, a fuel cell current, a fuel cell utilization, a fuel cell air utilization, or a combination thereof.

Further, in another exemplary aspect of the method 1000 depicted in FIG. 16, controlling operation of the fuel cell assembly, the gas turbine engine, or both at (1012) includes at (1018) controlling operation of the gas turbine engine. Controlling operation of the gas turbine engine may include at (1020) modifying an operating parameter of the gas turbine engine in response to the received gas composition data of the output products from the fuel cell. In certain exemplary aspect, the operating parameter of the gas turbine engine may include: a combustor fuel flowrate, a combustor fuel air ratio, a fuel flowrate ratio between combustor fuel flow and fuel cell fuel flow, a variable bleed valve, a variable guide vane, a low pressure shaft speed, a high pressure shaft speed, a variable fan nozzle, an engine-driven generator output, or a combination thereof.

As will be appreciated, the gas composition data of the output products from the fuel cell received at (1004) may include data indicative of a percentage of hydrogen within the output products. The percentage of hydrogen within the output products may allow for a determination to be made on the heat value of the output products provided to the combustor of the combustion section of the gas turbine engine. Such information may affect the amount of energy being provided to the turbine section of the gas turbine engine, as well as other operational aspects of the gas turbine engine such as combustor dynamics, emissions, etc.

In such a manner, it will be appreciated that the method 1000 may directly control the gas turbine engine in response to the gas composition data received at (1004) to, e.g., provide a desired amount of energy to the turbine section, modify combustor dynamics and/or emissions, etc. Additionally, or alternatively, the method 1000 may modify an operation of the fuel cell assembly in response to the gas composition data received (1004) to, e.g., change the amount of hydrogen being provided to the combustor to, in turn, change the amount of energy provided to the turbine section, modify combustor dynamics and/or emissions, etc.

By way of example, it will be appreciated that in at least certain exemplary aspects, controlling operation of the fuel cell assembly, the gas turbine engine, or both at (1011) includes at (1022) controlling operation of the fuel cell assembly, the gas turbine engine, or both using a model-based control. With such exemplary aspect, it will be appreciated that controlling operation of the fuel cell assembly, the gas turbine engine, or both at (1011) more specifically includes at (1024) controlling operation of the fuel cell assembly, the gas turbine engine, or both based on the received gas composition data of the output products from the fuel cell at (1004) and using the model-based control. Controlling operation of the fuel cell assembly, the gas turbine engine, or both at (1024) includes at (1026) controlling operation of the fuel cell assembly, the gas turbine engine, or both using a fusion filter configured to receive the gas composition data of the output products of fuel cell received at (1004) and configured to receive data from one or more models of the model-based control.

Notably, with such exemplary aspect, the method 1000 further includes at (1028) updating the one or more models of the model-based control in response to the received gas composition data of the output products of the fuel cell. For example, the received gas composition data of the output products of the fuel cell may be utilized to calibrate the one or more models of the model-based control.

It will be appreciated that controlling operation of the fuel cell assembly, the gas turbine engine, or both in accordance with one or more these exemplary aspects may allow for a redundancy in the control schemes by utilizing gas composition data sensed in a relatively quick time resolution to update and/or calibrate the one or more models of the model-based control, and further by utilizing a data output from the one or more models of the model-based control to determine if the one or more gas sensors utilized to since the gas composition data has failed. Notably, the method 900 may determine that one or more of the gas sensors utilized to since the gas composition data has failed in response to determining the gas composition data provided is outside a predetermined range from the data output of the one or more models of the model-based control.

It will be appreciated that for the exemplary aspect of the method 1000 of FIG. 16, the method 100 uses gas composition data of the output products of a fuel cell/fuel cell stack as a basis for the control of the gas turbine engine, the fuel cell assembly, or both. Such may allow for control based on the amount of energy being provided to the combustor from the fuel cell assembly, which provides numerous benefits as described herein.

However, in other exemplary embodiments, the method 1000 may additionally or alternatively base the control of the gas turbine engine, the fuel cell assembly, or both (e.g., at (1011), (1012), (1014), (1016), (1018), (1020), (1022), (1024), (1026), (1028)) based on gas composition data of one or more other flows in, to, or through the gas turbine engine, the fuel cell assembly, or both received from a multi-gas sensor. In such a manner, the method 1000 may be executed by the control module at (736) in the method 700 of FIG. 10.

Figure 17:
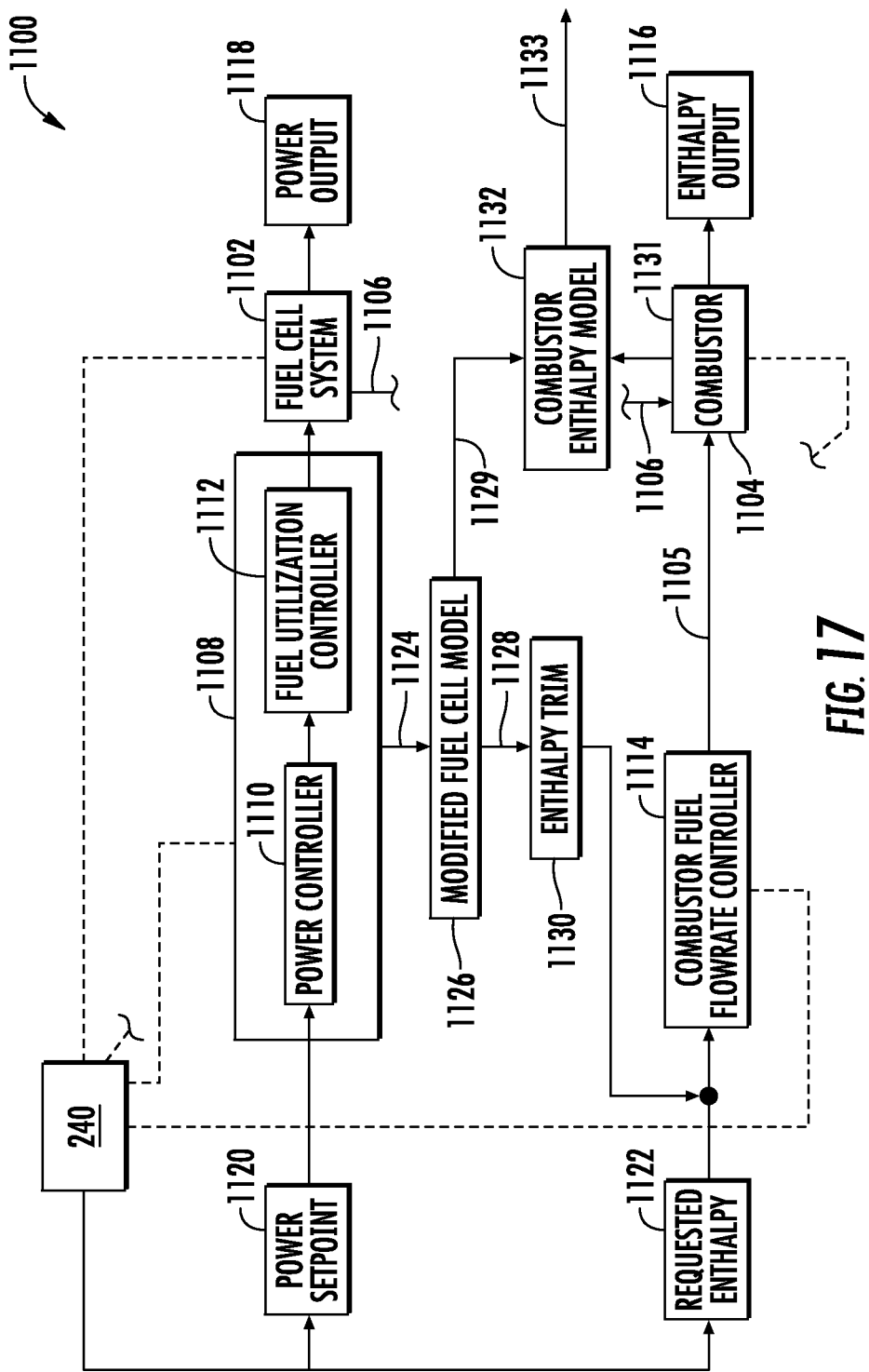
FIG. 17 is a flow diagram of a model-based control method in accordance with an exemplary aspect of the present disclosure.

Referring now to FIG. 17, a flow diagram of an exemplary model-based control system and method for a fuel cell assembly and gas turbine engine in accordance with an exemplary aspect of the present disclosure is provided. The exemplary model-based control system and method of FIG. 17 may be utilized with one or more of the exemplary gas turbine engines and fuel cell assemblies described herein. Further, the exemplary model-based control system and method of FIG. 17 may be incorporated into one or more of the other methods described herein, such as the model-based control method introduced in the method 1000 of FIG. 16.

Referring to FIG. 17, the exemplary model-based control system and method is more specifically depicted as a coordinated control system 1100 for a propulsion system. As shown, the coordinated control system 1100 includes a fuel cell system 1102 and a combustor 1104. The combustor 1104 may be configured in a similar manner as the combustor 206 discussed above with reference to, e.g., FIG. 2, such that the combustor 1104 may include a swirler assembly 216 configured to deliver a flow of aviation fuel 1105 to the combustor 1104. The fuel cell system 1102 may be configured in a similar manner as any one of the fuel cell assemblies 204 discussed herein, e.g., with reference to FIGS. 2 through 5. That is, the fuel cell system 1102 may be fluidly coupled to the combustor 1104 and configured to deliver output products 1106 to the combustor 1104. In addition to the output products 1106, the fuel cell system 1102 may generate a power output 1118 (such as an electrical power output) which may be utilized, e.g., in one or more electric machines of the propulsion system.

As shown, the coordinated control system 1100 may include a controller 240, which may be the controller 240 discussed above with reference to FIG. 5 or a different controller. The controller 240 may be configured to receive data from one or more sub-controllers of the coordinated control system 1100 or sensors in communication with the fuel cell system 1102 and/or the combustor 1104. Additionally, the controller 240 may be configured to send data, control commands, or other operations to the sub-controllers, the fuel cell system 1102, and/or the combustor 1104.

In many embodiments, the coordinated control system 1100 may include a fuel cell controller 1108 in operable communication with the controller 240. The fuel cell controller 1108 may be configured in a similar manner as the controller 240 shown in FIG. 5 (e.g., having one or more processors and memory), or alternatively, the fuel cell controller 1108 may be configured as part of the controller 240. The fuel cell controller 1108 may be operable to modify one or more operating parameters of the fuel cell system 1102, such as a fuel flowrate or amount of fuel supplied to the fuel cell system 1102, an equivalence ratio (such as an air/fuel ratio supplied to the fuel cell system 1102), a fuel utilization (e.g., the amount of fuel that is converted to electrical energy), an electrical current generated by the fuel cell system 1102, and/or a temperature (e.g., fuel and/or air inlet temperature). In particular, the fuel cell controller 1108 may be configured to modify the amount of output products 1106 introduced to the combustor 1104 and a composition of the output products 1106 introduced to the combustor 1104 (e.g., a $H_2\%$ within the output products 1106). In exemplary embodiments of the fuel cell controller 1108, the fuel cell controller 1108 may include a power controller 1110 and a fuel utilization controller 1112, which may both be configured as part of the fuel cell controller 1108 or may be standalone controllers.

In various embodiments, the coordinated control system 1100 may include a combustor fuel flowrate controller 1114 in operable communication with the controller 240. The combustor fuel flowrate controller 1114 may be configured in a similar manner as the controller 240 shown in FIG. 5 (e.g., having one or more processors and memory), or alternatively, the combustor fuel flowrate controller 1114 may be configured as part of the controller 240. The combustor fuel flowrate controller 1114 may be operable to modify and/or monitor one or more operating parameters of the combustor 1104. Additionally, the combustor fuel flowrate controller 1114 may be operable to communicate data indicative of a flow (or flowrate) of aviation fuel 1105 supplied to the combustor 1104. In particular, the combustor fuel flowrate controller 1114 may be configured to modify (e.g., increase or decrease) the flow of aviation fuel 1105 supplied to the combustor 1104.

As shown in FIG. 17, the combustor 1104 may receive combustible products from at least two separate sources (e.g., the flows of aviation fuel 1105 and the output products 1106), each of which will produce an amount of heat energy or enthalpy within the combustor 1104. The flows of aviation fuel 1105 and the output products 1106 will collectively burn within the combustor 1104 to produce an enthalpy output 1116 at an outlet of the combustor 1104. As will be appreciated, regulating the enthalpy output 1116 from the combustor 1104 is important for meeting thrust demand and minimizing thrust disturbances during operation of the propulsion system.

As shown in FIG. 17, the controller 240 may provide a power setpoint 1120 to the power controller 1110, also known as the power offtake demand from the aircraft computer or pilot. In response to receiving the power setpoint 1120, the power controller 1110 may modify an operating condition of the fuel cell system 1102, such that the power output 1118 of the fuel cell system 1102 will equal the power setpoint 1120. Similarly, the controller 240 may provide a requested enthalpy 1122 (e.g., at least partially based on a desired thrust of the propulsion system) to the combustor fuel flowrate controller 1114. This requested enthalpy 1122 may be derived from the thrust demand from the aircraft computer or pilot. In response to receiving the requested enthalpy 1122, the combustor fuel flowrate controller 1114 may modify the flow of aviation fuel 1105 to the combustor 1104, such that the enthalpy output 1116 is equal to the requested enthalpy 1122.

The power offtake demand, or the power setpoint 1120 reflects the electric power load needs in the aircraft, while the requested enthalpy 1122 reflects the aircraft thrust demand which may be independent from the power setpoint 1120. The coordinated control system 1100 needs to address both the power setpoint 1120 and the requested enthalpy 1122 in a systematic way. However, it has been found that, the fuel cell operation may cause a significant coupling effect for the combustor due to the fuel cell exhaust gas composition/enthalpy variation; on the other hand, the variation of the combustor and engine operating condition may in turn affect the fuel cell operation. Therefore, a coordinated fuel cell and combustor control system to mitigate the inherent coupling effect is proposed.

In exemplary embodiments, the coordinated control system 1100 may be configured to determine data indicative of at least one of an enthalpy or a composition of the output products 1106 from the fuel cell system 1102 at least partially based on a modified fuel cell model 1126. The modified fuel cell model 1126 may utilize one or more models stored within the memory of any one of the controllers (such as the memory 332B of the controller 240 shown in FIG. 5) and may be executable by the processor (such as the processor 332A shown in FIG. 5). In general, the modified fuel cell model 1126 may be provided with one or more inputs 1124, and at least partially based on the one or more inputs 1124, the modified fuel cell model 1126 may generate one or more fuel cell model outputs 1128. For example, the fuel cell controller 1108 may provide a fuel cell assembly operating parameter as the input 1124 to the modified fuel cell model 1126, and at least partially based on the fuel cell assembly operating parameter, the modified fuel cell model 1126 may generate data indicative of at least one of an enthalpy or a composition (e.g., gas composition data) of the output products 1106 as the fuel cell model output 1128. Operation of the modified fuel cell model 1126 is described in more detail, below, with reference to FIG. 18.

As shown in FIG. 17, at least partially based on the fuel cell model output 1128, the controller 240 may generate or determine an enthalpy trim 1130. The enthalpy trim 1130 may be a value used for adjusting and/or modifying the requested enthalpy 1122 communicated to the combustor fuel flowrate controller 1114. For example, the enthalpy trim 1130 may adjust the requested enthalpy 1122 based on the amount of enthalpy added to the combustor 1104 via the output products 1106.

The enthalpy trim 1130 may be based on a transfer function which accounts for the steady state and dynamic relationship between the fuel cell model output 1128 and combustor enthalpy. The enthalpy trim 1130 may comprise an "inverse model" to calculate the expected combustor enthalpy change which could offset the potential change in the SOFC exhaust gas composition or enthalpy. For example, if the fuel cell model output 1128 indicates there will be an increase of the fuel cell exhaust enthalpy entering the combustor, then the enthalpy trim 1130 may calculate the amount of combustor enthalpy that should be trimmed to mitigate the potential disturbance caused by fuel cell exhaust enthalpy entering the combustor. As non-limiting examples, the enthalpy trim 1130 may be a first order transfer function, second order transfer function or high order transfer function which captures the transient time from the time of the fuel cell operation change to time the fuel cell exhaust gas affects the combustor enthalpy.

In this way, the controller 240 may account for the added enthalpy to the combustor 1104 via the output products 1106 by making adjustments to the flow of aviation fuel 1105 at least partially based on the enthalpy trim 1130. This feature advantageously allows the fuel cell system 1102 to be operated independently from the combustor 1104 without causing any thrust disturbances.

In some implementations, the coordinated control system 1100 may determine data indicative of a combustor outlet enthalpy based at least partially on a combustor operating parameter and the data indicative of at least one of the enthalpy or the composition of the output products. In various embodiments, the combustor operating parameter may include at least one of a fuel/air ratio to the combustor 1104, a combustor pressure, or a combustor temperature. The combustor operating parameter may be received via one or more sensors disposed in operable communication with the combustor 1104. At other times, the combustor operating parameter may be received via calculation from one or more sensors not disposed in operable communication with the combustor 1104. For example, the coordinated control system 1100 may include a combustor enthalpy model 1132. The combustor enthalpy model 1132 may be stored within the memory of any one of the controllers (such as the memory 332B of the controller 240 shown in FIG. 5) and may be executable by the processor (such as the processor 332A shown in FIG. 5). Particularly, the combustor enthalpy model 1132 may be a first principle based model, a data driven model such as a neural network, fuzzy logic, a lookup table, or any combination thereof. In general, the combustor enthalpy model 1132 may be provided with one or more inputs 1129, 1131, and at least partially based on the one or more inputs 1129, 1131, the combustor enthalpy model 1132 may generate one or more outputs 1133. For example, the combustor enthalpy model 1132 may receive the enthalpy of the output products 1106 as a first input 1129 from the modified fuel cell model 1126 and may receive a combustor operating parameter as a second input 1131. At least partially based on the first input 1129 and the second input 1131, the controller 240 may utilize the combustor enthalpy model 1132 to generate data indicative of the combustor outlet enthalpy and temperature as an output 1133.

The estimated output 1133 from the combustor enthalpy model 1132 may be used (e.g., by the controller 240) to calculate the compressor exhaust air flowrate for both the fuel cell and combustor control, as well as performance evaluation of combustor and thrust calculation. In the aircraft engine operation, the combustor outlet work affects the turbine work, which in turn affects the compressor exit air conditions via a shaft. This compressor exit air feeds to both the fuel cell and the combustor. Therefore, the compressor exit air conditions have direct impact on the fuel cell and combustor operation. In some applications, the air flowrate at the exit of the compressor 112 may be calculated based on the flight and engine conditions. The combustor enthalpy model 1132 described herein may consider not only the main aviation fuel effect but also the fuel cell exhaust gas effect, may significantly improve the accuracy of compressor exhaust air flowrate calculation, which in turn improve the quality of the equivalence ratio control for fuel cell fuel reformer, and the air fuel ratio for the combustor.

Figure 18:
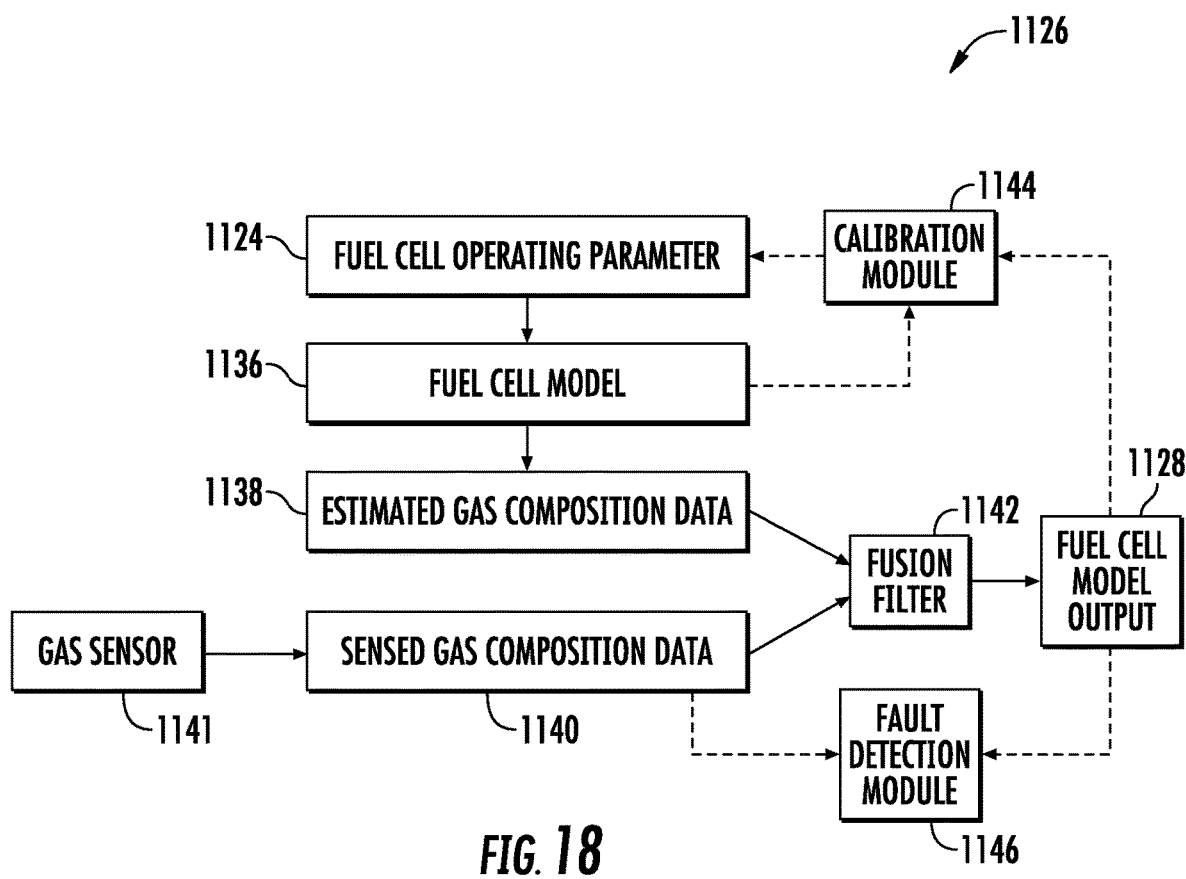
FIG. 18 is a flow diagram of a modified fuel cell model in accordance with an exemplary aspect of the present disclosure.

Referring now to FIG. 18, operation of the modified fuel cell model 1126 of FIG. 17 will be described in more detail. As noted above, the modified fuel cell model 1126 receives the fuel cell operating parameter as an input 1124. In many implementations, the fuel cell assembly operating parameter input 1124 may be at least one of a fuel and/or air flowrate provided to the fuel cell system 1102, an equivalence ratio (e.g., air/fuel ratio provided to the fuel cell system 1102), a fuel utilization (such as the percentage of fuel utilized by the fuel cell system 1102), an electrical current (such as the power output 1118 generated by the fuel cell system 1102), a pressure, or a temperature.

The modified fuel cell model 1126 further includes a fuel cell model 1136 configured to receive the fuel cell operating parameter input 1124. The fuel cell model 1136 may be a first principle based model, a data driven model such as a neural network, fuzzy logic, a lookup table, or any combination thereof. The fuel cell model 1136 may generally be configured to determine estimated gas composition data 1138 in response to the fuel cell operating parameter input 1124.

However, for the embodiment shown, the modified fuel cell model 1126 is further configured to receive sensed gas composition data 1140 from a gas sensor 1141. The sensed gas composition data 1140 may include the same gas composition data as the estimated gas composition data 1138.

The modified fuel cell model 1126 further includes a fusion filter 1142 configured to receive the estimated gas composition data 1138 and further configured to receive the sensed gas composition data 1140. Through one or more control algorithms, rules, etc., the fusion filter 1142 may determine actual gas composition data to be provided as the fuel cell model output 1128. For example, the fuel cell model output 1128 may include a fuel cell exhaust gas composition including volume percentages of one or more of $H_2$, CO, $CO_2$, $H_2$, $N_2$, $O_2$, etc. An alternative for the fuel cell model output 1128 may be the exhaust gas enthalpy (or low heating value of the fuel cell exhaust gas).

Further, for the exemplary aspect of the modified fuel cell model 1126 depicted in FIG. 18, the modified fuel cell model 1126 further includes a calibration module 1144 configured to calibrate the fuel cell model 1136 based at least in part on the sensed gas composition data 1140. More specifically, the calibration module 1144 is configured to receive the actual gas composition data provided as the fuel cell model output 1128 and the estimated gas composition data 1138 generated by the fuel cell model 1136. Calibrating the fuel cell model 1136 may include updating one or more multipliers of the fuel cell model 1136, assumptions of the fuel cell model 1136, etc.

Further, the exemplary modified fuel cell model 1126 further includes a fault detection module 1146. The fault detection module 1146 is configured to receive the actual gas composition data provided as the fuel cell model output 1128 and the sensed gas composition data 1140. The fault detection module 1146 may include one or more algorithms, rules, etc. for comparing the actual gas composition data to the sensed gas composition data 1140 to determine a potential fault in the gas sensor 1141.

It will be appreciated, however, that in other example embodiments, the fault detection module 1146 may be configured to receive the estimated gas composition data 1138 directly from the fuel cell model 1136.

Further, although the fault detection module 1146 and calibration module 1144 are depicted separately from, e.g., the fusion filter 1142, in other embodiments one or more of fault detection module 1146, calibration module 1144, and fusion filter 1142 may be integrated.

Referring back briefly to FIG. 17, it will be appreciated that the exemplary combustor enthalpy model 1132 may be a modified combustor enthalpy model configured in a similar manner as the exemplary modified fuel cell model 1126 described above with reference to FIG. 18. For example, the combustor enthalpy model 1132 may receive the first input 1129 from the modified fuel cell model 1126 (which may include enthalpy data of the output products from the fuel cell) and further may receive sensed gas composition data from a gas sensor indicative of the enthalpy of the output products of the fuel cell. The combustor enthalpy model 1132 may further include a fusion filter for receiving the first input 1129 and the sensed gas composition data and determine actual enthalpy data of the output products from the fuel cell. Similar calibration and fault detection modules may be included as well.

Figure 19:
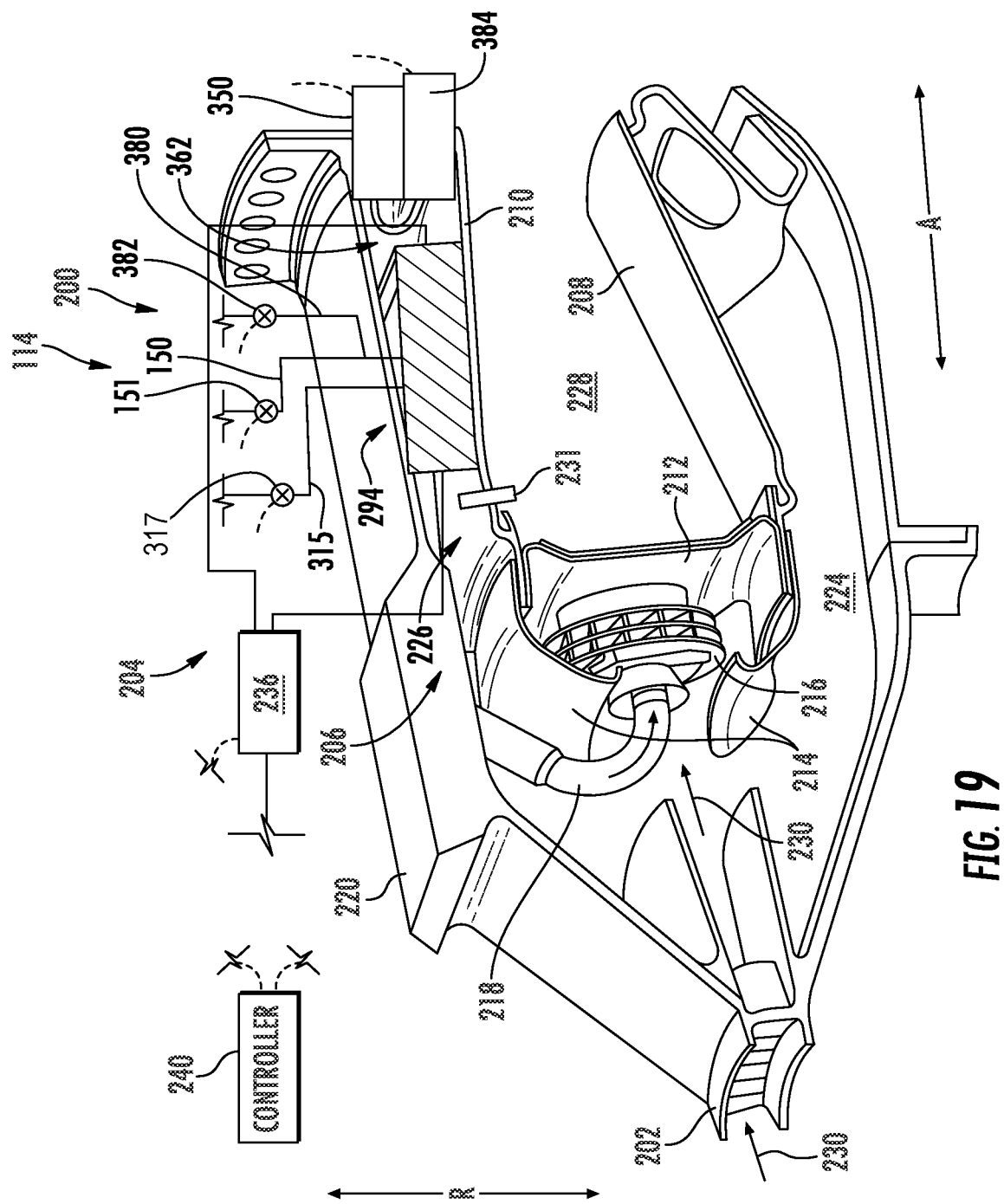
FIG. 19 is a perspective view of an integrated fuel cell and combustor assembly in accordance with the present disclosure.

Referring now to FIG. 19, a gas turbine engine 100 and fuel cell assembly 204 in accordance with another exemplary aspect of the present disclosure is provided, as may be operated in accordance with the exemplary method 1000 discussed above with reference to FIG. 16.

For the exemplary aspect depicted, the gas turbine engine 100 and fuel cell assembly 204 may be configured in substantially the same manner as exemplary gas turbine engine 100 and fuel cell assembly 204 described above with reference to FIG. 2. Accordingly, the same or similar numbers may refer to the same or similar parts. As such, it will be appreciated that the fuel cell assembly 204 generally includes a fuel cell stack 294 having one or fuel cells, and further includes a fuel inlet line 150 and an air inlet line 315. Moreover, the fuel cell assembly 204 includes a fuel valve 151 for controlling operation of the fuel flow through the fuel inlet line 150 to the fuel cell stack 294, and an air valve 317 for controlling airflow through the air inlet line 315. Although the fuel valve 151 and the air valve 317 are depicted in line with the fuel inlet line 150 and the air inlet line 315 at a location just upstream of the fuel cell stack 294, in other embodiments, the fuel valve 151, the air valve 317, or both may be located further upstream, e.g., upstream of a fuel processing unit 304, an air processing unit 306, or both respectively (see FIG. 5). Each of the fuel valve 151 and the air valve 317 is operably connected to a controller 240.

Moreover, it will be appreciated for the exemplary embodiment depicted in FIG. 19, a control system of the propulsion system (including the controller 240) may include a safety management control system for the fuel cell assembly 204 and gas turbine engine 100. In particular, the fuel cell assembly 204 further includes a fuel cell safety gas line 380 and a fuel cell safety gas valve 382. The fuel cell safety gas line 380 is in fluid communication with the fuel inlet line 150, and more specifically, is in fluid communication to the fuel inlet line 150 at a location downstream of the fuel valve 151.

The fuel cell assembly 204, gas turbine engine 100, or both further includes a gas sensor 350. The gas sensor 350 may be positioned to sense gas composition data of a fluid 362 surrounding the fuel cell stack 294. For example, the gas sensor 350 may be configured to sense gas composition data including a percentage of oxygen within the fluid 362 surrounding fuel cell stack 294, a percentage of hydrogen within the fluid 362 surrounding fuel cell stack 294, a percentage of combustible gas within the fluid 362 surrounding fuel cell stack 294, etc. In such a manner, the gas sensor 350 may be configured as a lower explosive level (LEL) sensor.

The gas sensor 350 is operably connected to the controller 240 for providing the controller 240 with the gas composition data. Notably, when configured as an LEL sensor, the gas composition data from the gas sensor 350 may be a Boolean response indicating whether or not, e.g., the percentage of combustible gas within the fluid 362 surrounding fuel cell stack 294 exceeds a lower explosive level threshold.

In response to receiving data from the gas sensor 350 indicative of the percentage of combustible gas within the fluid 362 surrounding the fuel cell stack 294 exceeding the lower explosive level threshold, the controller 240 may be configured to actuate the fuel valve 151 to shut off a fuel flow to the fuel cell stack 294, and further to actuate the fuel cell safety gas valve 382 to provide a safety gas flow to the fuel cell stack 294. More specifically, actuating the fuel cell safety gas valve 382 may provide the safety gas flow through the fuel cell safety gas line 380 to the fuel inlet line 150, and through the fuel inlet line 150 to the fuel cell stack 294. The safety gas may be, e.g., carbon dioxide (such as a supercritical carbon dioxide), nitrogen, a gas having less than about 10% of a combustible gas by volume, such as less than about 5% of a combustible gas by volume, air, etc.

Briefly, it will also be appreciated that for the exemplary aspect depicted, the gas turbine engine 100 includes a fire detection sensor 384 which may be operably connected to the controller 240 to provide data indicative of a fire being present in the area surrounding the fuel cell stack 294. The controller 240 may similarly be configured to provide the safety gas through the fuel cell safety gas line 380 to the fuel inlet line 150 and to the fuel cell stack 294 in response to receiving data from the fire detection sensor 384 indicative of a fire being present in the area surrounding fuel cell stack 294.

Figure 20:
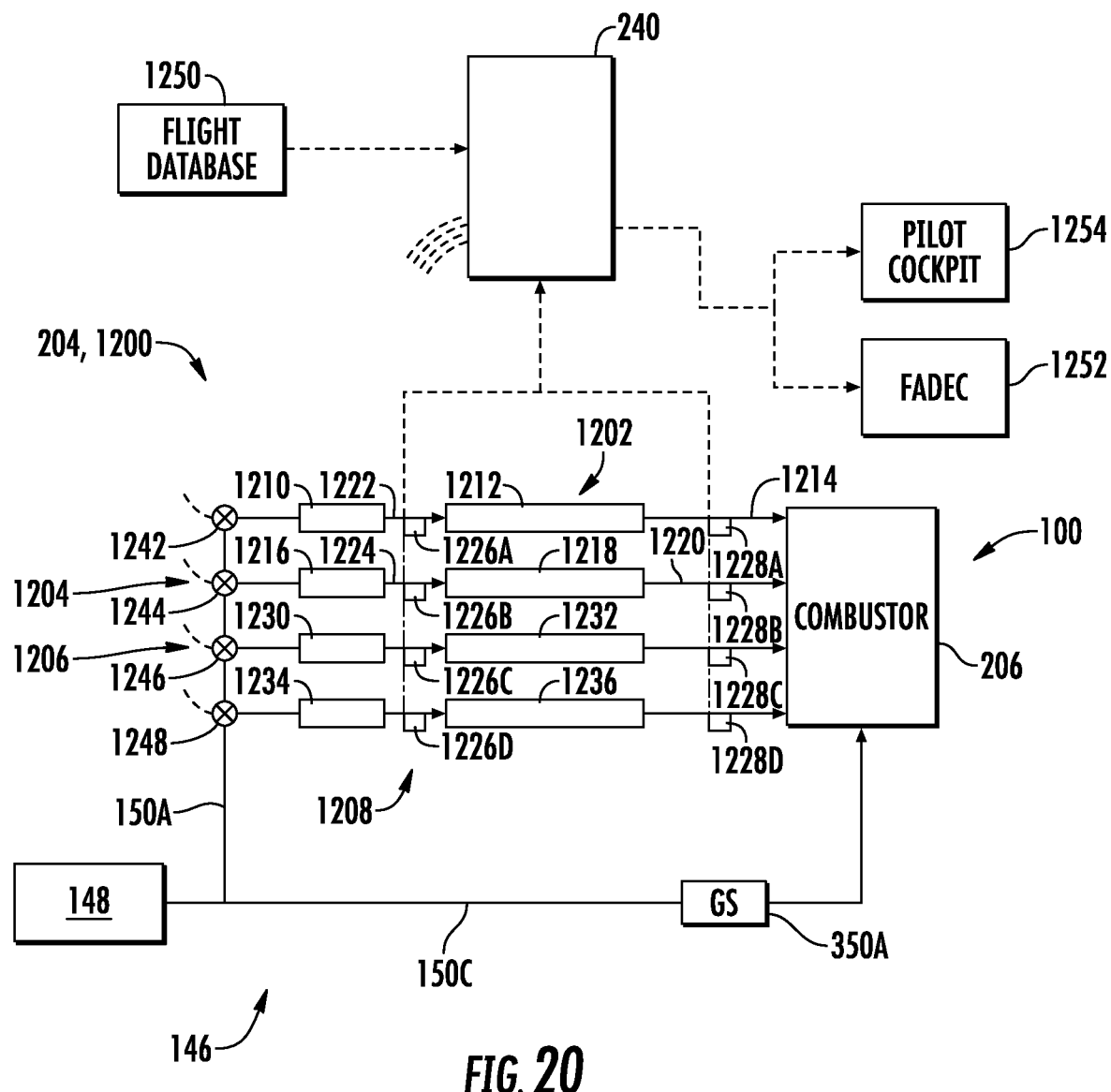
FIG. 20 is a schematic view of a propulsion system in accordance with another exemplary embodiment of the present disclosure.

Referring now to FIG. 20, a propulsion system in accordance with another exemplary aspect of the present disclosure is depicted which may be utilized with one or the exemplary control systems and methods described herein. In particular, the propulsion system includes a gas turbine engine 100 and a fuel cell assembly 204. The gas turbine engine 100 may be configured in a similar manner as one or more of the exemplary gas turbine engines 100 described above, although only a combustor 206 of the gas turbine engine 100 is depicted for illustration purposes. Similarly, the fuel cell assembly 204 may be configured in a similar manner as one or the exemplary fuel cell assemblies 204 described above.

For example, with respect to the gas turbine engine 100, the gas turbine engine 100 in general includes a combustion section 114 including the combustor 206. Further, for the embodiment depicted, the fuel cell assembly 204 generally includes a fuel processing unit in a fuel cell stack 294. Fuel cell stack 294 may include a fuel cell defining an outlet configured to provide output products to the combustor 206.

However, for the embodiment depicted, the fuel cell assembly 204 is more specifically configured as a modular fuel cell assembly 1200. In particular, the modular fuel cell assembly 1200 of FIG. 20 generally includes a first fuel cell string 1202, a second fuel cell string 1204, and for the embodiment shown, a third fuel cell string 1206 and a fourth fuel cell string 1208.

The first fuel cell string 1202 includes a first processing unit 1210 and a first fuel cell stack 1212, with the first fuel cell stack 1212 including a first fuel cell defining an outlet configured to provide output products 1214 from the first fuel cell to the combustor 206. The second fuel cell string 1204 similarly includes a second processing unit 1216 and a second fuel cell stack 1218. The second fuel cell stack 1218 includes a second fuel cell defining an outlet configured to provide output products 1220 from the second fuel cell to the combustor 206.

In such a manner, it will be appreciated that the first fuel cell string 1202 and the second fuel cell string 1204 include dedicated processing units 1210, 1216. More particularly, for the embodiment depicted, the first processing unit 1210 may be configured as a first fuel processing unit and the second processing unit 1216 may be configured as a second fuel processing unit. The first fuel processing unit is dedicated to the first fuel cell string 1202 for providing a first fuel flow 1222 to the first fuel cell stack 1212. The second fuel processing unit is dedicated to the second fuel cell string 1204 for providing a second fuel flow 1224 to the second fuel cell stack 1218. The first and second fuel processing units may be configured in a similar manner as the exemplary fuel processing units 304 described above, e.g., with reference to FIG. 5.

Although not depicted, each of the first fuel cell string 1202 and the second fuel cell string 1204 may further include an air processing unit (similar to air processing unit 306 of FIG. 5), which may be dedicated to the respective fuel cell string 1202, 1204.

Moreover, for the exemplary aspect depicted, the propulsion system further includes a control system having one or more sensors configured to sense gas composition data of a first flow through the first fuel cell string 1202 and of a second flow through the second fuel cell strength. The first flow may include, e.g., the first fuel flow 1222 from the first fuel processing unit to the first fuel cell stack 1212, the flow of output products 1214 from the first fuel cell stack 1212 to the combustor 206, and a first flow of air from a first air processing unit to the first fuel cell stack 1212 (not shown). Similarly, the second flow may include, e.g., a second fuel flow 1224 from the second fuel processing unit to the second fuel cell stack 1218, the flow of output products 1220 from the second fuel cell stack 1218 to the combustor 206, and a second flow of air from a second air processing unit to the second fuel cell stack 1218 (not shown).

More particularly, for the embodiment shown, the one or more sensors include gas sensors, and more specifically still, include multi-gas sensors. The gas sensors may be configured in a similar manner as the exemplary gas sensors 350 described above. More particularly still, for the embodiment shown, the one or more sensors includes a first fuel flow gas sensor 1226A configured to sense gas composition data of the first fluid flow through the first fuel cell string 1202 at a location downstream of the first processing unit 1210 and upstream of the first fuel cell stack 1212 (e.g., the first fuel flow 1222), as well as a first output products gas sensor 1228A configured to sense gas composition data of the first fluid flow through the first fuel cell string 1202 at a location downstream of the first fuel cell stack 1212 (e.g., of the output products 1214). Similarly, for the embodiment shown, the one or more sensors includes a second fuel flow gas sensor 1226B configured to sense gas composition data of the second fluid flow through the second fuel cell string 1204 at a location downstream of the second processing unit 1216 and upstream of the second fuel cell stack 1218 (e.g., the second fuel flow 1224), as well as a second output products gas sensor 1228B configured to sense gas composition data of the second fluid flow through the first fuel cell string 1202 at a location downstream of the second fuel cell stack 1218 (e.g., of the output products 1220).

Notably, for the embodiment depicted, the third fuel cell string 1206 and the fourth fuel cell string 1208 are configured in a similar manner as the first fuel cell string 1202 and the second fuel cell string 1204 (e.g., having a third processing unit 1230 and third fuel cell stack 1232, and a fourth processing unit 1234 and fourth fuel cell stack 1236, respectively). Similarly, the control system further includes a third fuel flow gas sensor 1226C, a third output products gas sensor 1228C, a fourth fuel flow gas sensor 1226D, and a fourth output products gas sensor 1228D.

It will be appreciated that although the modular fuel cell assembly 1200 depicted includes four fuel cell strings, in other exemplary embodiments any other suitable number of fuel cell strings may be provided (e.g., 2, 3, 5, between 2 and 20, etc.). It will also be appreciated that although for the embodiment depicted in FIG. 20 the control system includes two gas sensors for each fuel cell string, in other exemplary embodiments, the control system may only include fuel flow gas sensors, such as fuel flow gas sensors 1226A-1226D, or alternatively, may only include output products gas sensors, such as output products gas sensors 1228A-D.

It will also be appreciated that in at least certain exemplary embodiments, the first fuel cell string 1202 and the second fuel cell string 1204 are independently connected within the gas turbine engine 100. In such a manner, the first or second fuel cell strings 1202, 1204 may be individually disconnected and connected from the gas turbine engine 100 in the event of a failure, repair, or maintenance of the respective fuel cell string. Such may allow for removal and replacement of one of the fuel cell strings without removing the remaining fuel cell strings.

Moreover, it will be appreciated that for the exemplary embodiment depicted, the one or more sensors includes a first sensor (e.g., 1226A, 1228A) positioned in line with the first fuel cell string 1202 and a second sensor (e.g., 1226B, 1228B) positioned in line with the second fuel cell string 1204. More specifically, for the embodiment depicted, each of the first fuel flow gas sensor 1226A and first output products gas sensor 1228A are positioned in line with the first fuel cell string 1202, and each of the second fuel flow gas sensor 1226B and second output products gas sensor 1228B are positioned in line with the second fuel cell string 1204.

It will be appreciated, however, that in other exemplary embodiments, the control system may have any other suitable configuration of one or more sensors to sense the desired gas composition data of the first fluid flow through the first fuel cell string 1202 and of the second flow through the second fuel cell string 1204. For example, reference will now be made to FIG. 21, providing a schematic view of a modular fuel cell assembly 1200 in accordance with another example aspect of the present disclosure. The exemplary modular fuel cell assembly 1200 of FIG. 21 may be configured in substantially the same manner as exemplary modular fuel cell assembly 1200 of FIG. 20.

Figure 21:
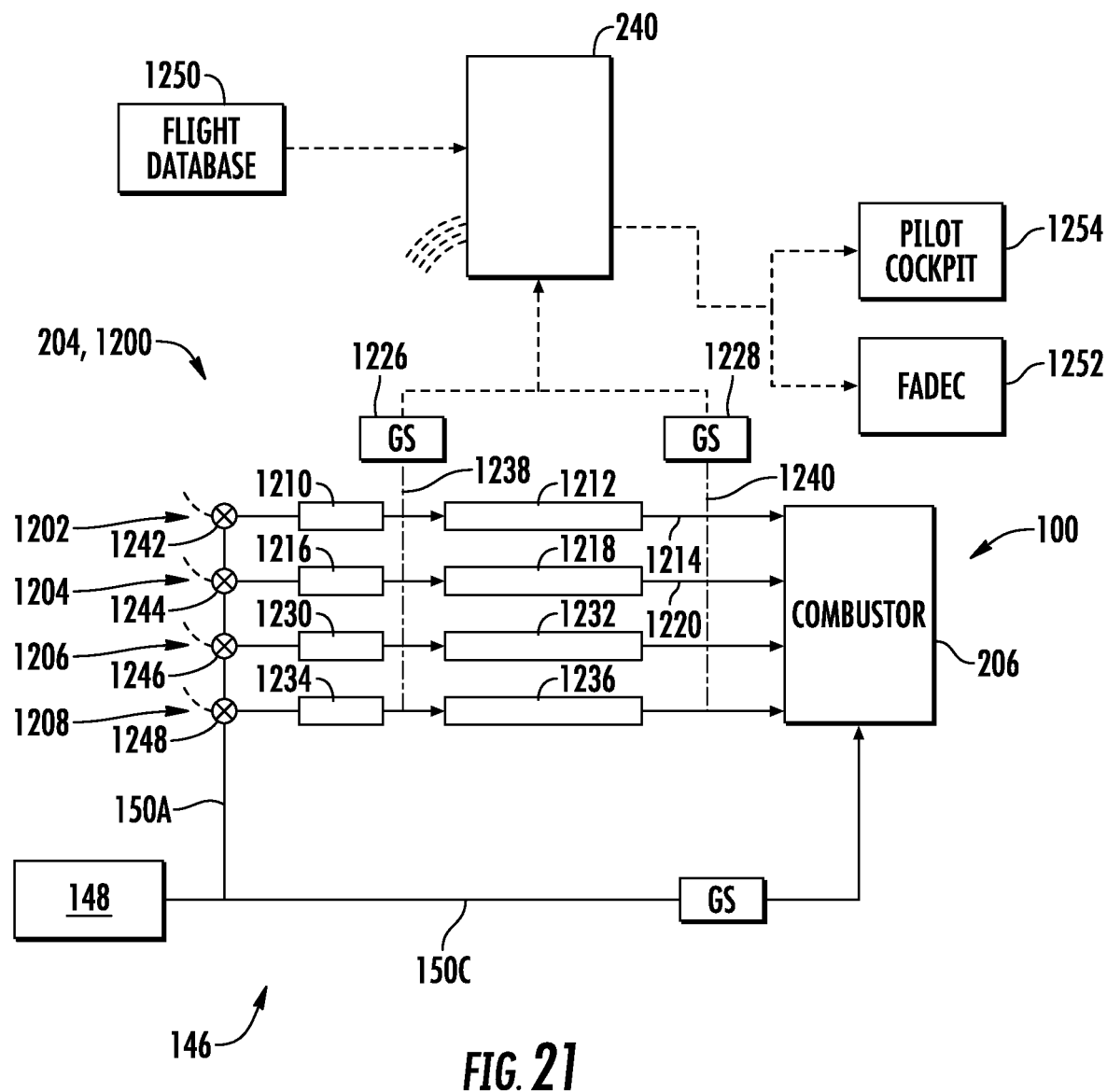
FIG. 21 is a schematic view of a propulsion system in accordance with still another exemplary embodiment of the present disclosure

However, in the exemplary aspect of FIG. 21, the control system includes one or more gas sensors, and more specifically includes one or more multi-gas sensors, configured to sample the first fluid flow through the first fuel cell string 1202 and the second fluid flow through the second fuel cell string 1204. In particular, for the exemplary embodiment of FIG. 21, the one or more multi-gas sensors are spaced from the first fluid flow and from the second fluid flow and configured to sense the gas composition data from such spaced locations. In particular, for the embodiment depicted, the control system includes a fuel flow gas sensor 1226 and a fuel flow sampling duct 1238. The fuel flow sampling duct 1238 is configured to provide a sample flow from the fuel cell strings 1202, 1204, 1206, 1208 to the fuel flow gas sensor 1226 (e.g., from a location downstream of the respective processing units and upstream of the respective fuel cell stacks). Similarly, for the embodiment depicted, the control system includes an output products gas sensor 1228 and an output products sampling duct 1240. The output products sampling duct 1240 is configured to provide a sample flow from the fuel cell strings 1202, 1203, 1206, 1208 to the output products gas sensor 1228 (e.g., from a location downstream of the respective fuel cell stacks). In such a manner, it will be appreciated that the first multi-gas sensor (fuel flow gas sensor 1226) and the second multi-gas sensor (output products gas sensor 1228) of the control system may be configured to sample a first fluid flow through a first fuel cell string 1202, a second fluid flow through a second fuel cell string 1204, a third fluid flow through a third fuel cell string 1206, and a fourth fluid flow through a fourth fuel cell string 1208.

Referring now back to the exemplary embodiment of FIG. 20, it will be appreciated that the exemplary control system further includes a controller 240. The controller 240 may be configured in a similar manner as one or more of the exemplary controllers 240 described above, e.g., with reference to FIG. 5. The controller 240 is operably connected to the one or more sensors (1226A-D, 1228A-D), and further for the exemplary embodiment the controller 240, is operably connected to each of the fuel cell strings 1202, 1204, 1206, 1208 for independently controlling each of the fuel cell strings. For example, in the embodiment depicted, the first fuel cell string 1202 is independently controllable relative to the second fuel cell string 1204 (and the third fuel cell string 1206 and the fourth fuel cell string 1208). More specifically, for the exemplary embodiment depicted, the first fluid flow through the first fuel cell string 1202 is independently controllable relative to the second fluid flow through the second fuel cell string 1204. In particular, for the embodiment depicted, the modular fuel cell assembly includes a first fuel flow valve 1242 operable to control one or more aspects of the first fluid flow through the first fuel cell string 1202, a second fuel flow valve 1244 operable to control one or more aspects of the second fluid flow through the second fuel cell string 1204, a third fuel flow valve 1246 operable to control one or more aspects of the third fluid flow through the third fuel cell string 1206, and a fourth fuel flow valve 1248 operable to control one or more aspects of the fourth fluid flow through the fourth fuel cell string 1208.

The first fuel flow valve 1242 of the first fuel cell string 1202, the second fuel flow valve 1244 of the second fuel cell string 1204, the third fuel flow valve 1246 of the third fuel cell string 1206, and the fourth fuel flow valve 1248 of the fourth fuel cell string 1208 are each operably connected to the controller 240 and independently controllable by the controller 240.

In such a manner, it will be appreciated that the controller 240 of the control system may be configured to receive gas composition data of the first fluid flow through the first fuel cell string 1202 and of the second fluid flow through the second fuel flow 1224 string, and further may be configured to modify an operating parameter of the first fuel cell string 1202, of the second fuel cell string 1204, or both in response to the received gas composition data.

Notably, for the embodiment depicted, the controller 240 is further configured to receive from a flight database 1250 operational data of, e.g., the modular fuel cell assembly 1200, the gas turbine engine 100, an aircraft including the modular fuel cell assembly 1200 and the gas turbine engine 100, or a combination thereof. The controller 240 may further be configured to make control decisions in response to the operational data received and the sense gas composition data of one or more of the fuel cell strings 1202, 1204, 1206, 1208. Further, the controller 240 may be configured to provide data to an engine controller 1252 for the gas turbine engine 100 (such as a Full Authority Digital Engine Control controller ("FADEC")) to assist with control of the gas turbine engine 100, and may further provide one or more notifications to an operator, such as a pilot cockpit, at 1254.

Figure 22:
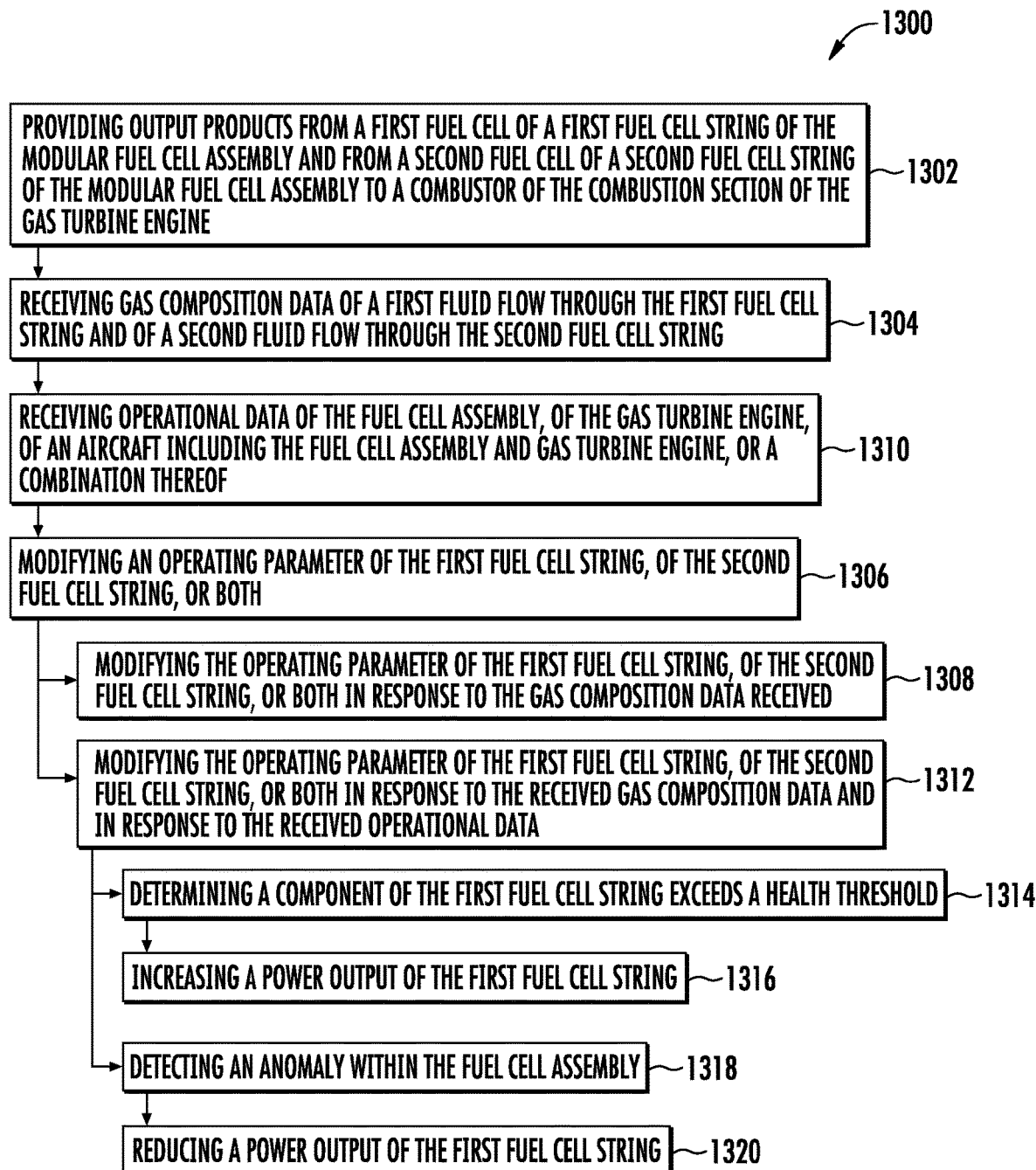
FIG. 22 is a method of operating a propulsion system including a modular fuel cell assembly.

Referring now to FIG. 22, a flow diagram of a method 1300 of operating a propulsion system in accordance with an exemplary aspect of the present disclosure is provided. The exemplary method 1300 may be utilized to control a propulsion system including a modular fuel cell assembly and a gas turbine engine configured in a similar manner as the exemplary modular fuel cell assemblies 1200 and gas turbine engines 100 of FIGS. 20 and 21.

The method 1300 includes at (1302) providing output products from a first fuel cell of a first fuel cell string of the modular fuel cell assembly and from a second fuel cell of a second fuel cell string of the modular fuel cell assembly to a combustor of the combustion section of the gas turbine engine. Providing the output products at (1302) may occur while operating the propulsion system during a flight operation.

The method 1300 further includes (1304) receiving gas composition data of a first fluid flow through the first fuel cell string and of a second fluid flow through the second fuel cell string. Receiving the gas composition data at (1304) may include receiving the gas composition data from one or more sensors, such as from one or more gas sensors, such as from one or more multi-gas sensors.

Further, for the exemplary aspect depicted, the method 1300 includes at (1306) modifying an operating parameter of the first fuel cell string, of the second fuel cell string, or both. More specifically, modifying the operating parameter at (1306) includes at (1308) modifying the operating parameter of the first fuel cell string, of the second fuel cell string, or both in response to the gas composition data received at (1304).

More specifically, for the exemplary aspect depicted, the method 1300 is configured to further utilize operational data to control the modular fuel cell assembly. For example, the method 1300 further includes at (1310) receiving operational data of the fuel cell assembly, of the gas turbine engine, of an aircraft including the fuel cell assembly and gas turbine engine, or a combination thereof. The operational data received at (1310) may be a health indicator of the fuel cell assembly, the gas turbine engine, or both. For example, the operational data received at (1310) may include a system health indicator, such as accumulated health data or a degree of degradation of one or more aspects of the modular fuel cell assembly. For example, the operational data received at (1310) may include a percent to end-of-life for one or more of the fuel processing units, the fuel cell stacks (and fuel cells), etc. of the modular fuel cell assembly. Similar data may be received for various components of the gas turbine engine. The operational data received at (1310) relating to the aircraft may include a flight schedule of the aircraft, a maintenance schedule of the aircraft, etc.

Referring still to the exemplary aspect of the method 1300 of FIG. 22, modifying the operating parameter of the first fuel cell string, of the second fuel cell string, or both (1306) further includes at (1312) modifying the operating parameter of the first fuel cell string, of the second fuel cell string, or both in response to the received gas composition data at (1304) and in response to the received operational data at (1310).

For example, modifying the operating parameter at (1312) includes at (1314) determining a component of the first fuel cell string exceeds a health threshold. The health threshold may be a percent to end-of-life threshold or other accumulated health data threshold. Determining the component of the first fuel cell string exceeds the health threshold at (1314) may include determining the component of the first fuel cell string is unlikely to perform in a desired manner (e.g., fail) past a next scheduled maintenance for the aircraft. In response to determining the component of the first fuel cell string exceeds the health threshold at (1314), modifying the operating parameter at (1312) further includes at (1316) increasing a power output of the first fuel cell string. Increasing the power output of the first fuel cell string at (1316) may include increasing a fuel flow to the first fuel cell stack relative to a fuel flow to the second fuel cell stack.

In such a manner, the method 1300 may accelerate a life usage of the first fuel cell string such that it may be replaced during the next scheduled maintenance for the aircraft rather than failing during a subsequent flight mission.

In an alternative exemplary aspect of the method 1300, modifying the operating parameter at (1312) includes at (1318) detecting an anomaly within the fuel cell assembly. Detecting the anomaly within the fuel cell assembly may include detecting the anomaly within the first fuel cell string. The anomaly may indicate that an affected component may continue to provide a desired output, but that the component has degraded past a nominal level. In response to detecting the anomaly at (1318), modifying the operating parameter at (1312) further includes at (1320) reducing a power output of the first fuel cell string. Reducing the power output of the first fuel cell string at (1320) may include reducing a fuel flow to the first fuel cell stack relative to a fuel flow to the second fuel cell stack. In certain exemplary aspects, reducing the power output of the first fuel cell string at (1320) may further include increasing a fuel flow to the second fuel cell stack, or alternatively may include increasing a power extraction from a separate power source of the gas turbine engine, the fuel cell assembly, or the aircraft (e.g., an electric machine driven by the gas turbine engine).

In such a manner, the method 1300 may save the component of the first fuel cell string from failure until the first fuel cell string may receive maintenance to address the detected anomaly.

It will be appreciated that the gas sensors described herein above may be any suitable gas sensor for detecting gas composition data of a fluid flow in, to, or through a gas turbine engine, a fuel cell assembly, or both.

In particular, in certain exemplary embodiments, the gas sensor may be configured to sense gas composition data of a single component of a fluid (e.g., a percentage of nitrogen within the flow of output products from the anode). Such may allow for a more simple and cost effective detection, maintenance, reporting, and/or control system, while still providing gas composition data.

Alternatively, the gas sensor may be configured to sense gas composition data of multiple components of a single fluid (e.g., a percentage of $CO_2$ and a percentage of $H_2O$ within the flow of output products from the cathode). Such a configuration may provide for a more versatile detection, maintenance, reporting, and/or control system, providing valuable gas composition data.

Alternatively, still, the gas sensor may be configured to sense gas composition data of one or more components of multiple fluids (e.g., a percentage of $CO_2$ and/or a percentage of $H_2O$ within the flow of output products from the cathode, a percentage of nitrogen within the flow of output products from the anode, and/or a percentage of oxygen within the fluid surrounding the fuel cell). Such a configuration may provide for an even more versatile detection, maintenance, reporting, and/or control system, providing valuable gas composition data.

In such a manner, it will be appreciated that the gas sensor may be a multi-gas sensor having multiple sensing nodes, configured to sense multiple unique responses (e.g., multiple unique electrical responses, vibrational responses, etc.), or the like.

For example, in on one exemplary embodiment, the gas sensor may use Raman spectroscopy, which is an optical analysis technique that relies on the measurement of the vibrational and rotational properties of molecules. Raman spectroscopy produces a unique spectral fingerprint that may identify chemical composition and molecular structure data fluids. Raman spectroscopy may utilize a laser directed to the fluid. A spectrometer collects and measures Raman scattered photons, creating a unique spectral fingerprint. A Raman measurement is nondestructive and can be collected in seconds (e.g., less than 10 seconds, less than 5 seconds, or less than 3 second, depending on the laser power and needed detection resolution). A Raman signal is straightforward to interpret: The distribution of the spectral peaks describes the molecule's composition while the signal intensity correlates linearly with concentration. Overlapping Raman peaks can be resolved using known data analytics techniques.

In certain exemplary aspects a gas sensor (multi-gas sensor or single gas sensor) configured to sense a percentage of nitrogen may utilize Raman spectroscopy, as such a technology may be well suited to determine nitrogen concentrations at the relatively low levels disclosed herein.

In another embodiment, the gas sensor, configured as a multi-gas sensor, may be a multi-response sensor, also known as multivariable sensor, also known as multi-output sensor, also known as multi-parameter sensor. Such a sensor has one or more variable control parameters that predictably affect the multi-gas sensing capability of the sensor. Non-limiting examples of such variable control parameters include operation frequencies of the sensor, operation wavelengths of the sensor, operation temperatures of the sensor, applied source of energy onto the sensor such as optical illumination of the sensor at different wavelengths and light intensities, acoustic excitation of the sensor at different frequencies. Optionally, the multivariable gas sensor may be a sensor array.

Non-limiting examples of the multi-gas sensors are impedance sensors, optical sensors, thermal conductivity sensors, electro-mechanical sensors, field-effect transistor sensors.

Additionally, or alternatively, in other exemplary embodiments, the gas sensor may utilize any other suitable technology. For example, referring now to FIG. 23, a gas sensor in accordance with another exemplary aspect of the present disclosure is provided. The gas sensor of FIG. 23 may be incorporated into one or more of the exemplary systems and methods described above with reference to FIGS. 1 through 22.

Figure 23:
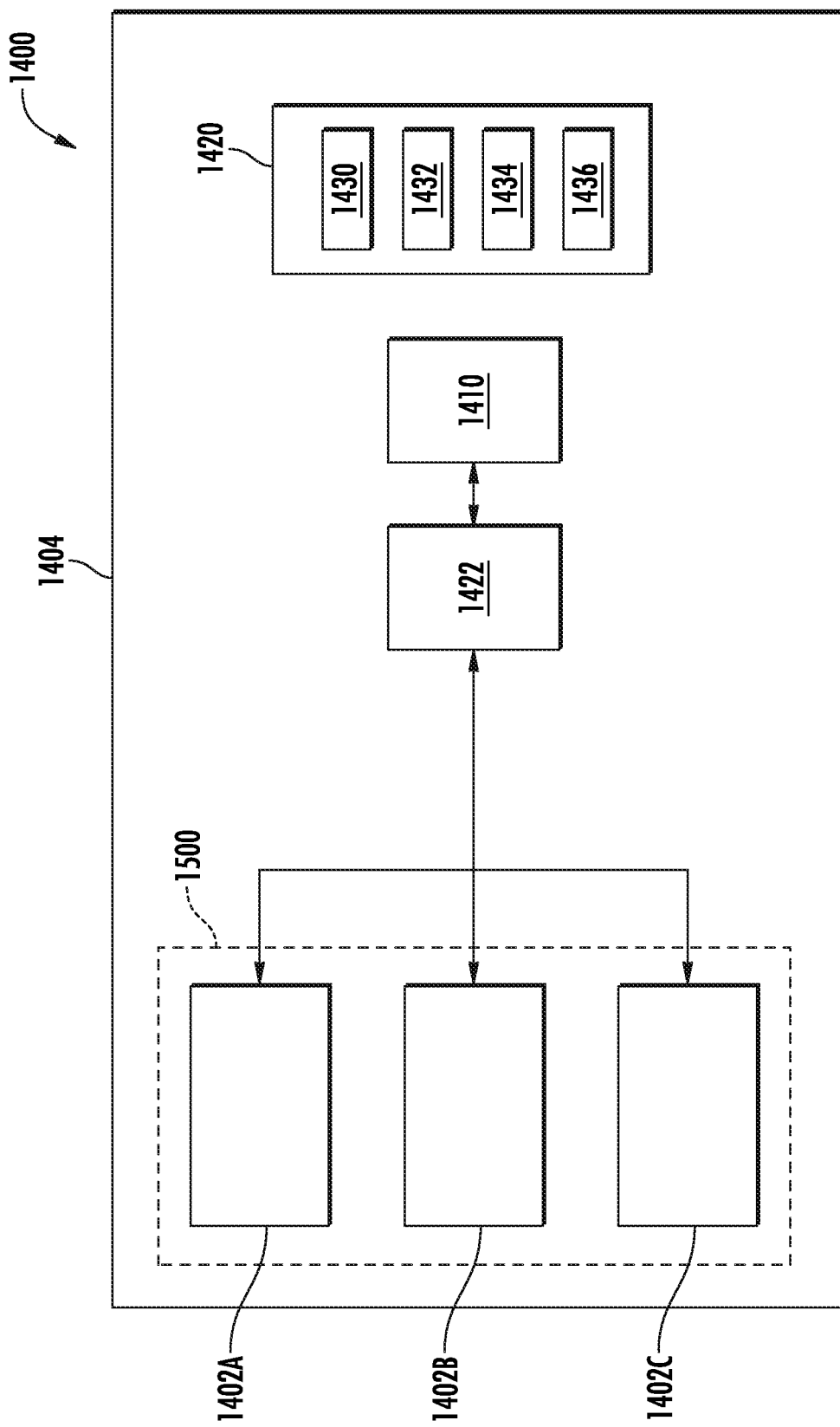
FIG. 23 illustrates one embodiment of a multi-gas sensing system in accordance with one embodiment.

In particular, FIG. 23 illustrates one embodiment of a gas sensor configured as a multi-gas sensing system 1400 (i.e., a multi-gas sensor). The multi-gas sensing system 1400 examines fluid in contact with the multi-gas sensing system 1400. The fluid may be a gas, a liquid, a gas-liquid mixture, a solid, particles or particulate matter, or the like, containing one or more analyte gases therein to determine gas composition data.

The multi-gas sensing system 1400 may represent one or more different versions of sensing systems described herein. The multi-gas sensing system 1400 includes a sensing circuit 1500, a modifier assembly 1422, and a management circuit 1410 that may control operation of the modifier assembly 1422 and the sensing circuit 1500. In one or more embodiments, the sensing circuit 1500 may be a resistor-capacitor RC electrical circuit that includes one or more resistor R and capacitor C components that may be changed by the presence of one or more analyte gases of interest. For example, the management circuit 1410 may change the resistance and/or capacitance of the sensing circuit 1500. In one or more embodiments, the circuitry of the multi-gas sensing system 1400 may be able to perform impedance measurements of the multi-gas sensing system 1400 to determine an impedance response to one or more analyte gases of interest. Impedance measurements may be performed at one or more different frequencies or at one or more different RC configurations of the sensing circuit 1500. For example, the sensing circuit 1500 of the multi-gas sensing system 1400 may measure impedance responses of the multi-gas sensing system 1400 at different frequencies, at different resistances of the RC electrical circuit, at different capacitances of the RC electrical circuit, or any combination of two or more therein.

The term impedance as used herein may be a non-limiting term for any electrical response of the sensing system to an alternating electrical current applied to the sensing system. Such response may be measured as different electrical properties. Nonlimiting examples of these commonly measured different electrical responses of the sensing system to alternating electrical current include impedance, admittance, reactance, susceptance, or the like. In the present specification, examples of the responses are given as impedances, however, other electrical responses of the sensing system to alternating electrical current may be also equally produced.

In one embodiment, the electrical response of the sensing system may be monitored at the gas-modulated front shoulder of the dielectric relaxation peak of the sensing material.

Measurements of the impedance of the multi-gas sensing system 1400 may be performed at a single frequency, at discrete frequencies, or at multiple scanned frequencies by an impedance analyzer or impedance analyzer circuit that may be a part of or coupled with the management circuit 1410 and/or a system controller 1420, and conductively coupled with the sensing circuit 1500. Optionally, the management circuit 1410 of the multi-gas sensing system 1400 may also or alternatively be called a spectrum analyzer, an analyzer, an alternating electrical current response analyzer, or the like.

In one or more embodiments, the impedance analyzer may be a part of the management circuit 1410 and may measure electrical responses of at least two sensing elements of the multi-gas sensing system, where the two sensing elements are based on different detection principles. A nonlimiting example of a first sensing element may be an electrode pair coated with a sensing material and positioned on a substrate. The impedance analyzer may measure the gas response of this first sensing element at frequencies or at a single frequency in the vicinity of the dielectric relaxation peak of the sensing material. A nonlimiting example of a second sensing element may be a mechanical resonator such as a tuning fork resonator, a thickness shear mode resonator, or a surface acoustic wave resonator, coated with a sensing material. The impedance analyzer may measure the resonant peak frequency position of this resonant second sensing element.

The multi-gas sensing system 1400 may include the system controller 1420. The system controller 1420 may include one or more devices such as, but not limited to, a power source 1430, a data analytics unit 1432, an output device 1434 (e.g., such as a safety alarm), and a communication system 1436. One or more of the components of the system controller 1420 may include one or more processors that include one or more microprocessors, field programmable gate arrays, and/or integrated circuits. In one or more embodiments, the multi-gas sensing system 1400 may be a battery-operated device and/or may be powered using energy available from a main control system or by using harvesting of energy from ambient sources (e.g., light, vibration, heat, electromagnetic energy, or the like). In one or more embodiments, the management circuit 1410 and/or the modifier assembly 1422 may be a part of the system controller 1420. For example, the one or more processors of the system controller 1420 may operate in a manner similar to that as the management circuit 1410 and/or the modifier assembly 1422.

The data analytics unit 1432 may be in the form of an integrated circuit controller positioned on the same board as the sensing elements. As one example, the multi-gas sensing system 1400 may operate with a power demand of about 30 milliamp hour per hour of substantially continuous operation or less. The data analytics unit 1432 may receive data from one or more sensing elements 1402A-C directly or via the management circuit 1410, from other sensing elements such as temperature and/or ambient humidity sensing elements positioned on the same board. The data analytics unit 1432 may receive data wirelessly from one or more sensing elements 1402A-C directly or via the management circuit 1410, or from other sensing elements positioned at different locations in or around the multi-gas sensing system 1400, or the like.

The data may be stored in short term and/or long term memory storage devices, such as archiving communication systems, which may be located within or remote from the multi-gas sensing system 1400 and/or reconstructed and displayed for an operator, such as at an operator workstation, displayed via an output device of the multi-gas sensing system 1400, or the like. The data analytics unit 1432 may include one or more processors for analyzing the data received from the management circuit 1410. For example, the one or more processors may be one or more computer processors, controllers (e.g., microcontrollers), or other logic-based devices that perform operations based on one or more sets of instructions (e.g., software). The instructions on which the one or more processors operate may be stored on a tangible and non-transitory computer readable storage medium, such as a memory device. The memory device may include a hard drive, a flash drive, RAM, ROM, EEPROM, and/or the like. Alternatively, one or more of the sets of instructions that direct operations of the one or more processors may be hard-wired into the logic of the one or more processors, such as by being hard-wired logic formed and/or stored in the hardware of the one or more processors.

Figure 24:
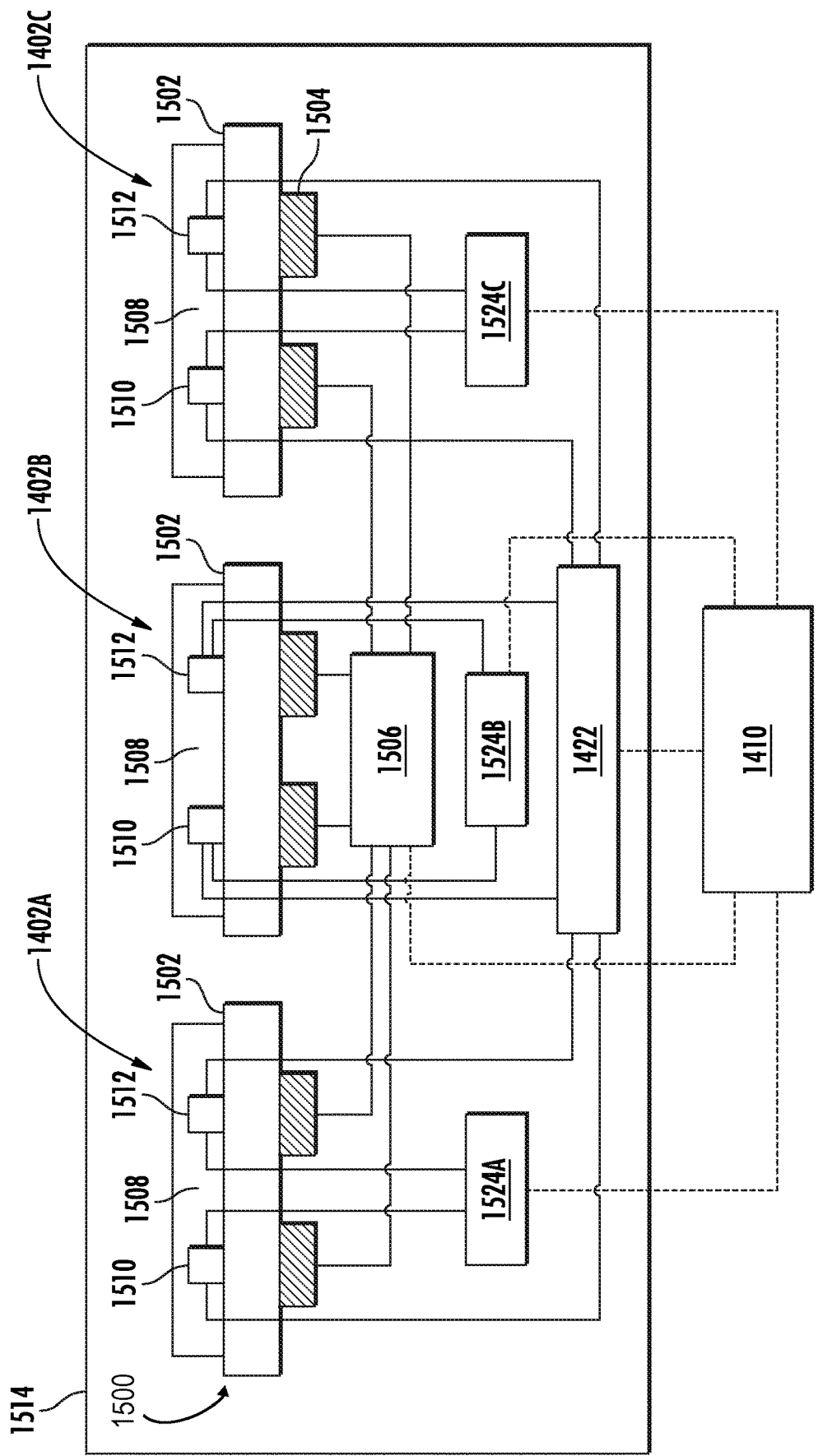
FIG. 24 illustrates a sensing circuit of the multi-gas sensing system shown in FIG. 23.

FIG. 24 illustrates one embodiment of the sensing circuit 1500 of the multi-gas sensing system 1400 of FIG. 23. The sensing circuit 1500 includes one or more sensing elements 1402A-C. Each of the sensing elements 1402A-C may be operationally in contact with a fluid that may contain one or more analyte gases therein. The sensing elements 1402A-C include a common material for their respective substrates 1502, such as a dielectric material. Notably, in other embodiments, a single substrate 1502 may be included for two or more of the sensing elements 1402A-C. Suitable materials of the substrate 1502 may include alumina, ceramics, and others. Each sensing element 1402A-C also includes a sensing film or sensing material 1508 that is coupled to the substrate 1502, and sensing electrodes 1510, 1512. Suitable examples of sensing materials or sensing films include a metal oxide material, a composite material, semiconducting materials, n-type semiconducting materials, p-type semiconducting materials, a combination of n-type and p-type semiconducting materials, nanocomposite materials, inorganic materials, any known sensing material capable operating at up to 900° C., or the like. Non-limiting examples of sensing materials operating at around 900° C. include gallium oxide and silicon carbide. Suitable electrodes may be formed using metal etching, screen-printing, ink-jet-printing, and mask-based metal deposition techniques. The thickness of fabricated electrodes on the substrates 1502 may be in the range from about 10 nanometers to about 1000 micrometers. The materials for the substrate 1502, sensing layer 1508, and sensing electrode 1510, 1512 formation methods may be selected based at least in part on the application specific parameters.

The sensing material 1508 is exposed to, in contact with, in indirect contact with, or the like, at least one analyte gas. One or several heating elements 1504, such as high resistance bodies, are coupled to a different side of the substrate 1502 relative to the sensing material 1508. The heating elements 1504 receive electric current from a heater controller 1506, which represents hardware circuitry that conducts the heater current or voltage to the heating elements 1504 to heat the substrate 1502 and to heat the sensing film or sensing material 1508 that is coupled to another side of the substrate 1502. For example, in one or more embodiments of the inventive subject matter described herein, the sensing material 1508 utilizes a metal oxide sensing film. The management circuit 1410 may manage a temperature of each of the sensing elements 1402A-C by controlling operation of the heater controller 1506 to control each of the heating elements 1504. The sensing material 1508 can include one or more materials deposited onto the substrate 1502 to perform a function of predictably and reproducibly affecting the impedance sensor response upon interaction with the environment. For example, a metal oxide, such as gallium oxide and silicon carbide or any other material may be deposited as the sensing material 1508.

In one or more embodiments, one or more filters (not shown) may be disposed over one or more of the sensing elements 1402A-C. For example, the one or more filters may be a barrier or alternative protection mechanism or device that may prohibit or reduce an amount of gaseous, liquid, and/or solid particles that may be in contact with the sensing material 1508, the sensing electrodes 1510, 1512, or the like. As one example, a single filter may be disposed over one or more of the sensing elements, or alternatively individual sensing elements may include individual filters disposed over the top of the individual sensing elements. The one or more filters may be a gas-permeable membrane filter such that the filter may enable gases of interest to pass through the filter from one side to another, and may prohibit or reduce an amount of interferent gases or solid particles that may pass through the filter from one side to another. In one or more embodiments, the gas-permeable membrane filter may include a fluoropolymer or a fluoropolymer coating. Optionally, the filter may include an alternative coating such as a flame retardant.

The sensing electrodes 1510, 1512 of each sensing element 1402A-C are coupled with and/or disposed in the sensing material 1508 and are connected with the substrate 1502 in the illustrated embodiment. The sensing electrodes 1510, 1512 are conductive bodies that are conductively coupled with one or more of the modifier assembly 1422, transducers 1524A-C, and the management circuit 1410. In one or more embodiments, the transducers 1524A-C are electrode structures that are connected to an impedance detector system, and a sensor is a transducer that is coated with a sensing material. The management circuit 1410 may include an impedance detector system or a resistance detector system. Each of the modifier assembly 1422, the transducers 1524A-C, and the management circuit 1410 may have one or more processors that include one or more microprocessors, field programmable gate arrays, and/or integrated circuits.

In the illustrated embodiment of FIG. 24, each sensing element 1402A-C is operationally coupled with transducers 1524A-C, respectively. Alternatively, the sensing circuit 1500 may include a single transducer that is conductively coupled with each sensing element 1402 that may receive the electrical responses from each sensing element 1402A-C and convert variations of the electrical responses into a physical quantity.

In one or more embodiments, the sensing electrodes 1510, 1512 may be coated with a sensing material that is responsive to one or more analyte gases of interest. The one or more processors of the management circuit 1410 may direct the sensing electrodes 1510, 1512 to apply the electrical stimuli at one frequency, such as an electrical excitation frequency or a single excitation frequency. For example, the management circuit 1410 may excite the sensing elements 1402A-C with an alternating current at at least one predetermined frequency, at a predetermined frequency range, or the like.

The one or more processors of the management circuit 1410 may receive an electrical signal from the sensing electrodes 1510, 1512 of each sensing element 1402A-C that represents the electrical impedance or impedance response of the sensing elements 1402A-C during exposure of the sensing material 1508 to the fluid sample. For example, the one or more processors of the management circuit 1410 may measure the one or more electrical responses of the sensing elements 1402A-C responsive to exciting the sensing electrodes 1510, 1512 with the alternating electrical current at the at least one frequency or the frequency range.

The management circuit 1410 may determine one or more characteristics of the sensing circuit 1500 based on the electrical responses from each of the different sensing elements 1402A-C. The characteristics of the sensing circuit 1500 may include a temperature of one or more of the sensing elements, a temperature variance between two or more sensing elements, a state of the sensing circuit 1500 based on a configuration of the sensing elements 1402, one or more ambient conditions (e.g., ambient temperature, humidity, or the like) within a predetermined area that is proximate the sensing circuit 1500, or the like. In one or more embodiments, the management circuit 1410 may manage a configuration of each of the one or more sensing elements 1402A-C, such that the management circuit 1410 may manage the resistor-capacitor configuration of at least one of the sensing elements. The management circuit 1410 may determine the state of the sensing circuit 1500 based on the resistor-capacitor configuration of each of the sensing elements of the sensing circuit. Optionally, the state of the sensing circuit 1500 may be based on another configuration of the sensing circuit.

In one or more embodiments, the management circuit 1410 may be referred to as a frequency impedance source and detector system. The management circuit 1410 examines the electrical impedance of the sensing elements 1402A-C in order to determine the presence and/or amount (e.g., concentration) of one or more analyte gases in the environment to which the sensing material 1508 of each sensing element 1402A-C is exposed, as described herein. The management circuit 1410 may provide scanning capability to measure sensor impedance responses at a single or at plural discrete frequencies. Alternatively, the system controller 1420 may provide capability to measure sensor impedance responses across a frequency range.

The sensing circuit 1500 may be operably coupled with the modifier assembly 1422 that may include a multiplexer. The multiplexer may be a single multi-frequency scanning signal analyzer that may operate with a power demand that is less than 10 milliwatts (mW), less than 5 mW, or in a more preferred embodiment, less than 1 mW. In one or more embodiments, each of the sensing elements 1402A-C may be conductively coupled with the modifier assembly 1422. The system controller 1420 and/or the management circuit 1410 may direct one or more of the sensing elements 1402A-C to change the impedance of the electrical stimuli applied to the corresponding sensing material 1508 without changing the excitation frequency. As one example, the modifier assembly 1422 may include a bank of circuits having plural circuits (not shown) to change the impedance of each of the sensing elements 1402A-C based on which circuits are electrically coupled with or electrically disconnected from the management circuit. Optionally, the modifier assembly 1422 may include a single circuit that may be a variable circuit or variable device that may change the impedance of each of the sensing elements 1402A-C. In alternative embodiments, the modifier assembly may include a multiplexer having any alternative configuration, one or more circuits, or any combination therein.

The management circuit 1410 and/or the system controller 1420 may control the modifier assembly 1422 to apply the electrical stimuli to each of the sensing elements 1402A-C at single or discrete impedances, or at predetermined ranges of varying impedance, for interrogation of the sensing material 1508 of each respective sensing element 1402A-C and at what interrogation time to apply to measure the sensor response at each frequency. For example, the multiplexer of the modifier assembly may electrically connect and/or electrically disconnect one or more of the different sensing elements 1402A-C with the management circuit 1410 and the corresponding sensing electrodes 1510, 1512 to change which sensing elements 1402A-C of the sensing circuit 1500 are electrically coupled with and electrically disconnected from the modifier assembly 1422 and the management circuit 1410. For example, the modifier assembly 1422 may change the impedance of each of the sensing elements 1402A-C without changing the electrical excitation frequency of the electrical stimuli applied to the sensing electrodes 1510, 1512.

The multiplexer of the modifier assembly 1422 may combine the plural electrical response signals received from each of the sensing elements 1402A-C into a single output that is directed to the management circuit 1410. The management circuit 1410 receives the electrical response signals responsive to exciting the sensing electrodes 1510, 1512 at the alternating current at at least one predetermined frequency and determines the one or more characteristics of the sensing circuit 1500. The management circuit 1410 may transmit, or otherwise communicate, the electrical response signals and the determined characteristics of the sensing circuit 1500 to the one or more processors of the system controller 1420. A concentration of at least one gas analyte may be determined based on the electrical responses of the sensing elements 1402A-C and the characteristics of the sensing circuit 1500. For example, the data analytics unit 1432 of the system controller 1420 may convert sensor responses into the analytically useful gas composition data, e.g., concentrations of detected gases. Additionally, the data analytics unit 1432 may determine a concentration of at least one gas analyte based on one or more temperatures of each of the sensing elements 1402A-C, the ambient conditions proximate the sensing circuit 1500 (e.g., within a predetermined proximity or area of the sensing circuit, such as within 1 meter, 5 meters, 10 meters, 100 meters, or the like), or the like.

As one example, the system controller 1420 may determine the concentration of at least one analyte gas based on electrical responses from two or more different sensing elements (e.g., sensing elements 1402A, 1402B). The first sensing element 1402A may be operated at a first substantially constant temperature and the second sensing element 1402B may be operated at a different, second substantially constant temperature. For example, the management circuit 1410 may control the heating elements 1504 such that the first sensing element 1402A may operate at a first temperature, and that the second sensing element 1402B may operate at a different temperature that may be greater than or less than the first temperature.

As another example, the system controller 1420 may determine the concentration of the one or more gas analytes based on electrical responses from two or more different sensing elements, such as sensing elements 1402A and 1402B. The management circuit 1410 may control operation of the heating elements 1504 to operate the first sensing element 1402A at periodically variable temperatures and may operate the second sensing element 1402B at different periodically variable temperatures. For example, the heating elements 1504 may change a temperature of the first sensing element 1402A (e.g., such as within a temperature range) that increases and/or decreases the temperature to predetermined values at predetermined times, for predetermined durations, or any combination therein. Additionally, the heating elements 1504 may change a temperature of the second sensing element 1402B (e.g., within a different or the same temperature range), that increases and/or decreases the temperature to different predetermined values at different predetermined times, for different predetermined durations, or any combination therein. Optionally, the first and second sensing elements 1402A, 1402B may operate a similar temperature ranges for different durations, may operate at similar durations but at different temperature ranges, may operate at similar temperatures and durations but at different times, or the like.

The sensing elements 1402A-C including the sensing material 1508 and substrate 1502, the heating elements 1504, the heater controller 1506, the modifier assembly 1422, and the transducers 1524A-C are disposed within a housing 1514. The housing 1514 may be operably coupled with the substrate or a circuit board 1404 of the multi-gas system 1400. Optionally, one or more sensing elements 1402A-C may be disposed in individual housings to separate each sensing element from other sensing element. Optionally, one or more of the modifier assembly 1422, the heater controller 1506, one or more of the transducers 1524, or the management circuit 1410 may be operably coupled with the circuit board 1404 of the multi-gas sensing system 1400 and may be disposed outside of or separate from the housing 1514. Optionally, one or more of the components of the multi-gas sensing system 1400 may be disposed or contained within housings together with or separate from any other components of the multi-gas sensing system 1400.

Figure 25:
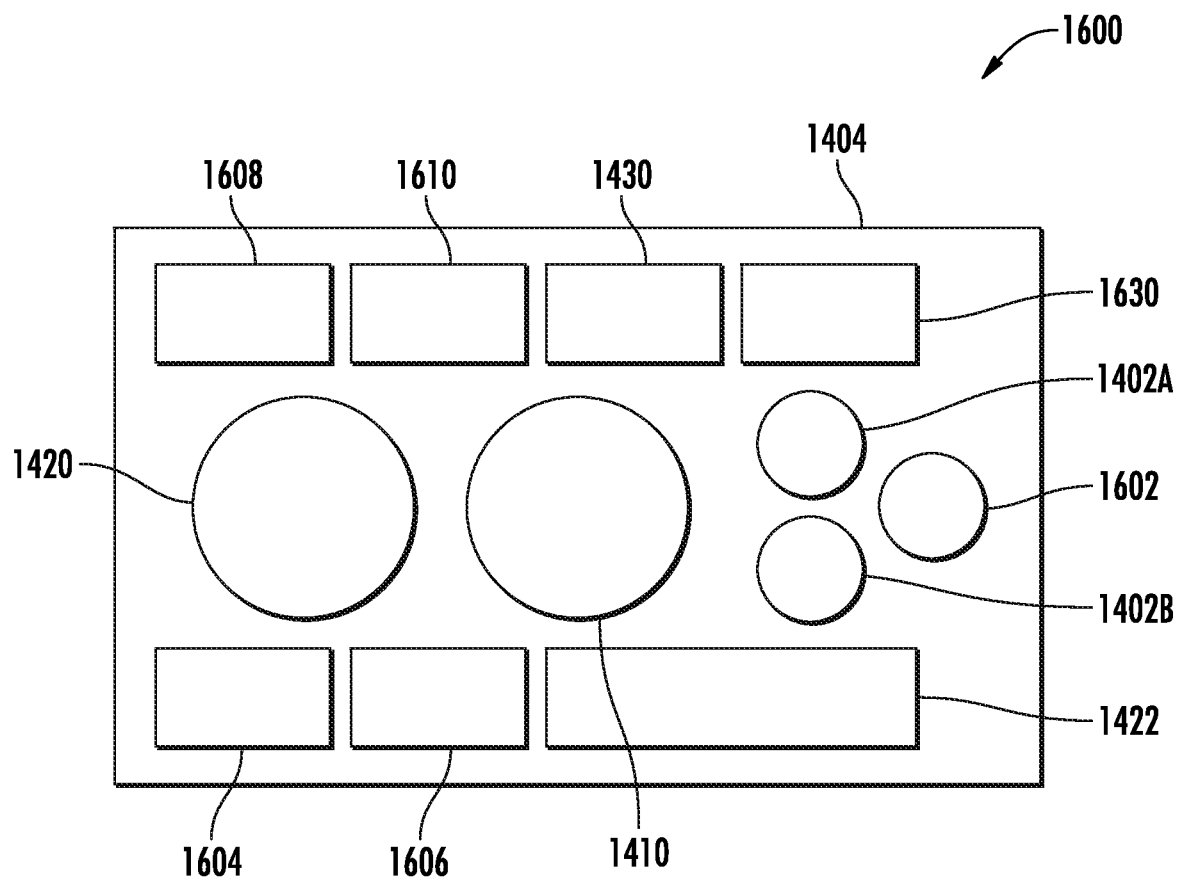
FIG. 25 illustrates a system layout of a multi-gas sensing system in accordance with one embodiment.

FIG. 25 illustrates a system layout of a multi-gas sensing system 1600 in accordance with one embodiment. The components and devices of the multi-gas sensing system 1600 are disposed on the substrate or circuit board 1404. In one or more embodiments, one or more of the components or devices of the multi-gas sensing system 1600 may be disposed on one or both sides of the circuit board 1404. The multi-gas sensing system 1600 may include one or more power devices or components such as the power source 1430 or power switch, a power regulator 1630, a nonvolatile memory or other memory or storage device 1606, a charging source 1608, such as a micro-USB or the like, or a charger or charging device 1610. In one or more embodiments, the power source 1430 may be or include a battery source, or any alternative untethered power source. The multi-gas sensing system 1600 may include processing components such as the management circuit 1410, the system controller 1420, and the modifier assembly 1422. The management circuit 1410 may include one or more processors that include one or more microprocessors, field programmable gate arrays, and/or integrated circuits that may operate or function as an impedance analyzer, a resistor detector system, or the like. The system controller 1420 may include one or more processors that may operate as a data analytics unit, a memory system (e.g., memory 1606), or the like. The modifier assembly 1422 is illustrated as separate from the system controller 1420 and the management circuit 1410, but alternatively may be included with one or both of the management circuit 1410 or the system controller 1420.

The multi-gas sensing system 1600 includes two different sensing elements 1402A, 1402B. In one or more embodiments, the sensing elements 1402A, 1402B may each be designed to sense or otherwise detect the presence of one or more of nitrogen ($N_2$), oxygen ($O_2$), carbon dioxide ($CO_2$), water ($H_2O$), methane ($CH_4$), carbon monoxide (CO), or the like. Optionally, the different sensing elements may be designed to sense or otherwise detect different gases. The multi-gas sensing system 1600 includes a sensing element 1602 that may be designed to sense or otherwise detect ambient conditions, such as ambient temperature, ambient humidity, ambient pressure, or the like. For example, the sensing elements 1402A, 1402B may communicate electrical responses to the management circuit 1410 responsive to the management circuit exciting the sensing elements 1402A, 1402B with the alternating current at the at least one predetermined frequency. The management circuit 1410 may measure the electrical responses from the sensing elements 1402A, 1402B to determine one or more characteristics of the sensing circuit. Additionally, the sensing element 1602 may detect ambient conditions of an area proximate the multi-gas sensing system 1400, and the management circuit 1410 may determine characteristics of the multi-gas sensing system 1400 based on the ambient conditions detected by the sensing element 1602. The one or more processors of the system controller 1420 may receive the electrical responses and the characteristics of the sensing circuit and determine a concentration of at least one gas analyte, such as a gas analyte of interest, based on the electrical responses and the characteristics of the sensing circuit.

In one or more embodiments, the multi-gas sensing system 1600 may include an output device 1604. As one example, the output device 1604 may be illustrated as LED lights. For example, the LED lights may illuminate based on the electrical responses of the sensing elements, based on characteristics of the of the sensing circuit, or the like. Optionally, the output device 1604 may be any alternative safety device that may illuminate, sound an alarm, vibrate, or otherwise communicate to an operator of the multi-gas sensing system 1400 if the system controller 1420 determines that a gas of interest exceeds a predetermined threshold.

Figure 26:
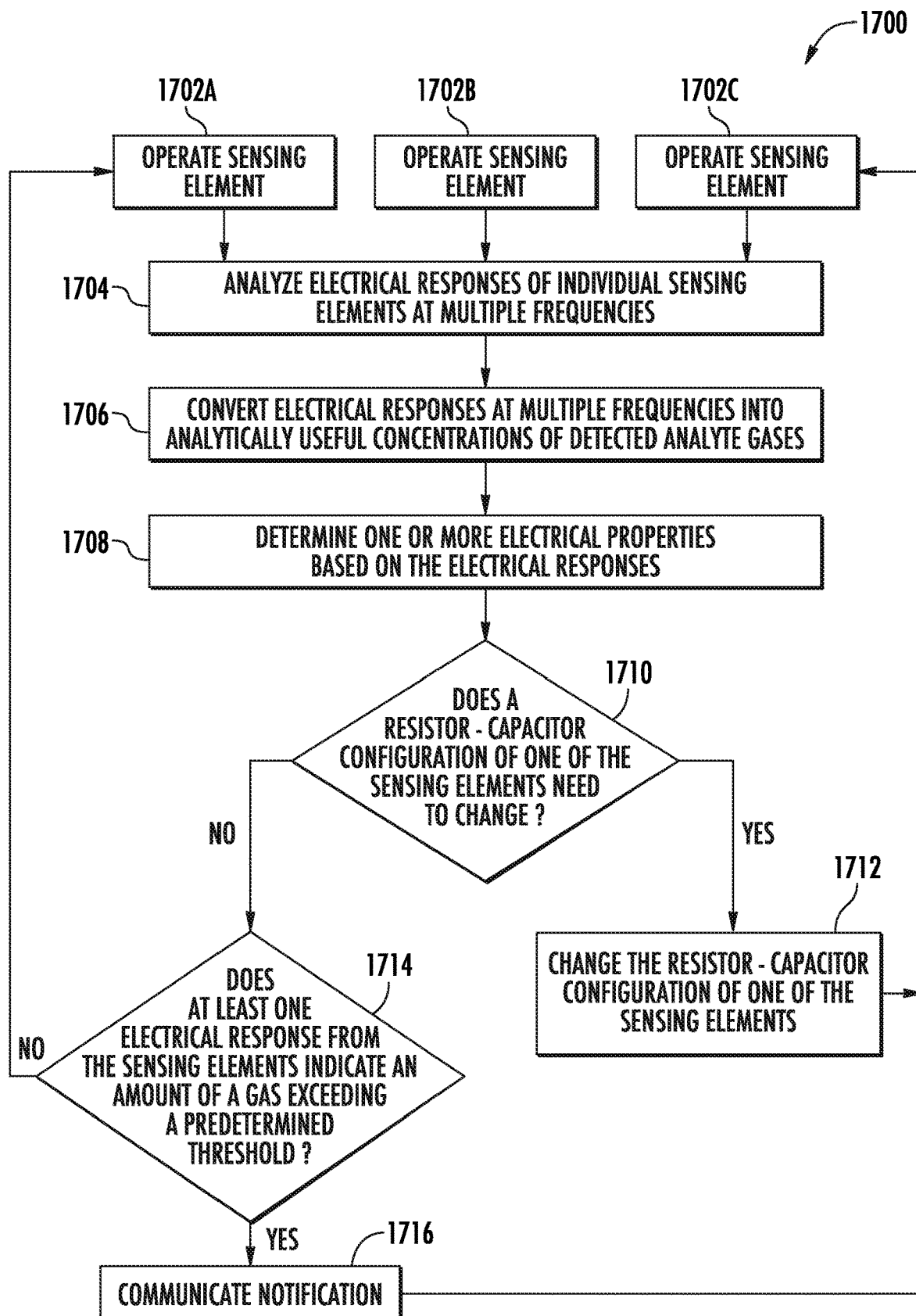
FIG. 26 illustrates a flowchart of one embodiment of a method for sensing multiple different gas analytes using the multi-gas sensing system in accordance with one embodiment.

FIG. 26 illustrates a flowchart of one embodiment of a method 1700 for sensing multiple different gas analytes using a multi-gas sensing system in accordance with one embodiment. The multi-gas sensing system may be the system illustrated in FIG. 23. At (1702A-C), each of the sensing elements 1402A-C may be operated. For example, the management circuit may excite each of the sensing elements with an alternating current at at least one predetermined frequency. The management circuit may excite sensing element 1402A at a first predetermined frequency, and may excite the sensing elements 1402B, 1402C at different, unique or common frequencies relative to each other and the sensing element 1402A. Optionally, one or more of the sensing elements 1402A-C may be excited at a predetermined frequency range. In the illustrated embodiment of FIGS. 22 and 23, the system includes three sensing elements. Alternatively, the system may include less than three or more than three sensing elements. Alternatively, the system may include only one sensing element.

In one or more embodiments, the management circuit may manage a temperature of one or more of the sensing elements by controlling a heating element. For example, the management circuit may control operation of the heating element such that one or more of the sensing elements are operated at a predetermined temperature, are operated at a predetermined temperature range, such that the different sensing elements are operated at different temperatures or at a range of different temperatures, or the like. In one embodiment, the management circuit may control the heating element to periodically change the temperature of the first sensing element 1402A and to substantially maintain a temperature of the second and third sensing elements 1402B, 1402C. For example, the management circuit may control the heating element such that the first sensing element 1402A is operated at a first constant or first variable temperature, and the second sensing element 1402B is operated at a different, second constant temperature or second variable temperature. As another example, the management circuit may control the heating element such that the first sensing element 1402A is operated at periodically variable temperatures, and the second sensing element 1402B is operated at different periodically variable temperatures. The different periodically temperatures of the second sensing element may be substantially the same temperatures, but heated at different periodic times than the first sensing element. Alternatively, the first and second sensing elements may be heated at substantially the same or common periodic times, but the first sensing element may be heated to temperatures that are different than the temperatures of the second sensing element.

The management circuit may synchronize the temperature of one or more sensing elements with the excitation of the one or more sensing elements. For example, the management circuit may synchronize controlling the heating elements to control a temperature of one or more sensing element to a predetermined at substantially the same time, or within a predetermined time window, as exciting the one or more sensing elements at the alternating current of the predetermined frequency. For example, the management circuit may control the heating elements and excite the one or more sensing elements at substantially the same time, within a time window; or the like. Optionally, the management circuit may synchronize changing a temperature of the one or more sensing elements with a duration of excitation of the sensing elements. Optionally, the management circuit may synchronize substantially maintaining a temperature range of the one or more sensing elements while variably exciting the sensing elements at the predetermined frequency or frequency range. Optionally, the management circuit may otherwise synchronize the temperature of the sensing elements with the excitation of the sensing elements in any alternative configuration or based on one or more predetermined rules.

At (1704), the one or more processors of the management circuit and/or the system controller may analyze the electrical responses from the sensing elements responsive to the excitation of the sensing electrodes of the sensing elements. The electrical responses may be represented as signal outputs from each of the one or more sensing elements. An alternating electrical current may be applied to each of the one or more sensing elements at one or more different frequencies, or at one or more different resistor-capacitor configurations of each of the sensing elements. For example, the first sensing element may have a first resistor-capacitor configuration, and a first frequency may be applied to the sensing electrodes of the first sensing element to excite the first sensing element. Alternatively, the second sensing element may have a second, different resistor-capacitor configuration, and a different, second frequency may be applied to the sensing electrodes of the second sensing element. Alternatively, one or more of the sensing elements may have common resistor-capacitor configurations, or a common frequency may be applied to excite one or more of the sensing elements.

Figure 27:
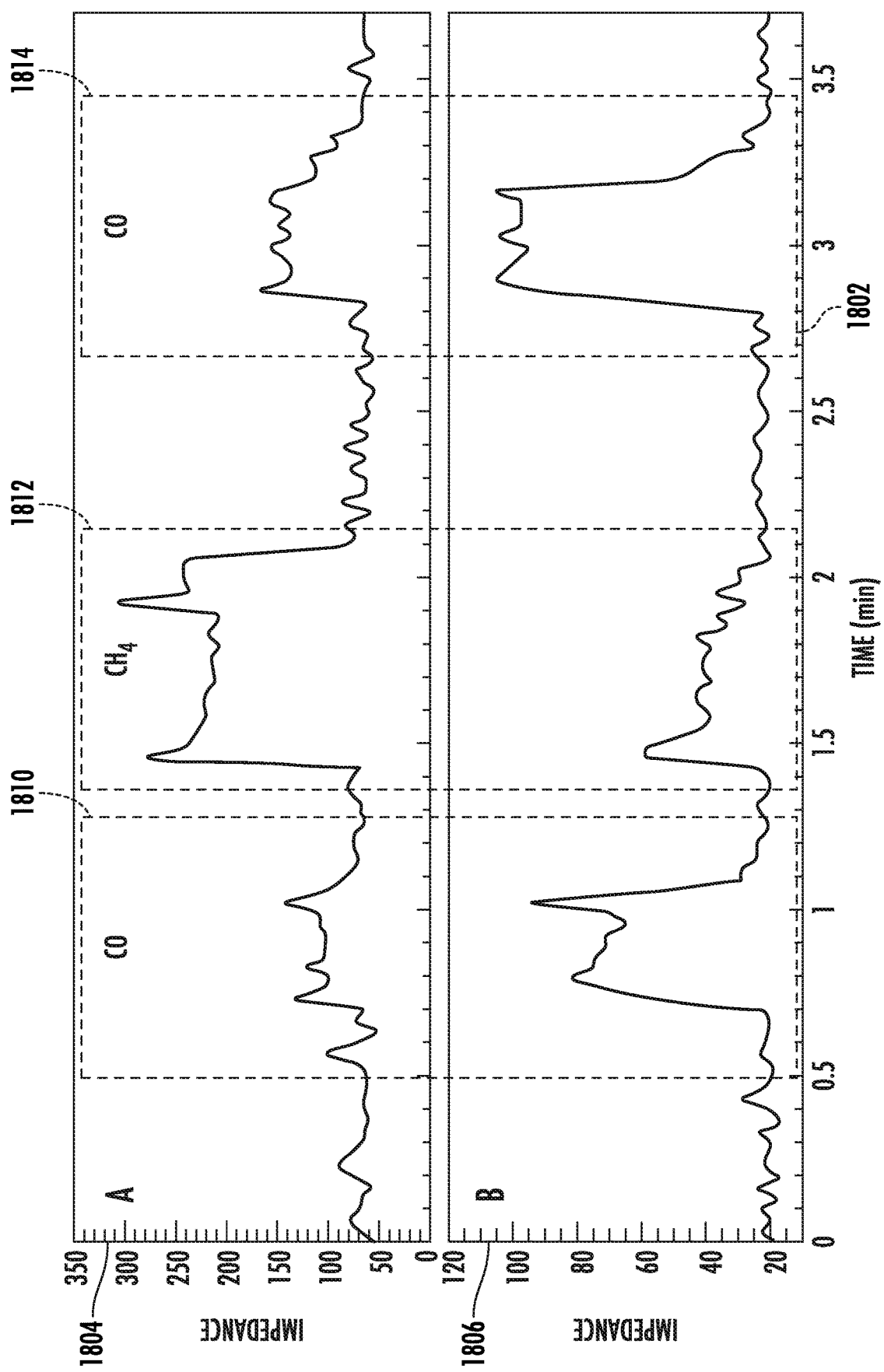
FIG. 27 illustrates graphical illustrations of electrical responses of individual sensing elements of a multi-gas sensing system in accordance with one embodiment.

FIG. 27 illustrates graphical illustrations of electrical responses of individual sensing elements of a multi-gas sensing system in accordance with one embodiment. Graph A represents the electrical responses from a first sensing element that may be designed to detect the presence of methane ($CH_4$). Graph B represents the electrical responses from a second sensing element that may be designed to detect the presence of carbon monoxide (CO). Alternatively, the electrical responses may be received from a single sensing element that may be configured to operate to detect the presence of $CH_4$, CO, and any other gas. Graphs A and B are illustrated having a common horizontal axis 1802 representative of time, and vertical axes 1804, 1806, respectively, representative of the impedance of the sensing circuit 1500.

Measurements of one or more of the real Z' or imaginary Z" parts of the impedance of the sensing circuit 1500 may be performed within a dielectric relaxation region of the sensing circuit 1500. The dielectric relaxation region of the multi-gas sensing system 1400 may be a range of frequencies within a designated threshold of the measured impedance of the sensing circuit 1500 at the occurrence of relaxation peak and/or a relaxation point frequency or an inflection point frequency range of the imaginary Z" part of the impedance. For example, the relaxation peak (also known as relaxation frequency) may be identified as the location along the imaginary part of an impedance spectra at which the impedance response changes from being concave to convex, or changes from being convex to concave. The inflection point frequency is the frequency or the frequency range at which the inflection point occurs. Alternatively, the inflection point can be determined be examining the real part of the measured impedance of the sensing material 1508 to locate where the curvature of the real part of the impedance changes from a concave shape to a convex shape, or from a convex shape to a concave shape. In one or more embodiments, the electrical response of the sensing system is monitored at the gas-modulated front shoulder of the dielectric relaxation peak of the semiconducting sensing material. For an n-type semiconducting sensing material, the front-edge shoulder may be the high-frequency region of the relaxation peak. For a p-type semiconducting sensing material, the front-edge shoulder may be the low-frequency region of the relaxation peak.

As one example, the sensing circuit may be exposed to about 11.36% volume of $CH_4$ and 1090 parts per million (ppm) of CO. As illustrated in Graphs A and B, the second sensing element (e.g., the CO sensor) detects an increase in the impedance in the presence of CO as illustrated in a first section 1810, but the first sensing element (e.g., the $CH_4$ sensor) indicates only a minimal increase in impedance in the presence of CO. Similarly, the second sensing element detects an increase in the presence of CO as illustrated in a third section 1814, but the first sensing element has only a minimal increase. Alternatively, the first sensing element detects an increase in impedance in the presence of $CH_4$ as illustrated in a second section 1812, but the second sensing element has only a minimal increase. Graphs A and B illustrate discrimination between the $CH_4$ and CO by the first and second sensing elements of the sensing circuit.

Returning to FIG. 26, at (1706), the electrical responses at multiple frequencies received from one or more sensing elements are converted into analytically useful concentrations of detected analyte gases. For example, the management circuit and/or the data analytics unit of the multi-gas sensing system 1400 may perform analysis on the electrical responses received from the sensing elements to determine one or more concentrations of the one or more sensed analyte gases. The analysis may be based on one or more of the electrical responses of the sensing elements; characteristics of the sensing circuit such as, but not limited to, temperatures of the sensing elements, states of the sensing circuit based on configurations of the sensing elements, ambient conditions proximate the sensing circuit, or the like; or any combination of two or more therein. In one or more embodiments, the analysis may be based on one or more of the sensing elements being operated at periodically variable temperatures, one or more sensing elements being operated at common or unique substantially constant temperatures, different discrete frequencies or frequency ranges used to excite the sensing elements, or the like.

Figure 28:
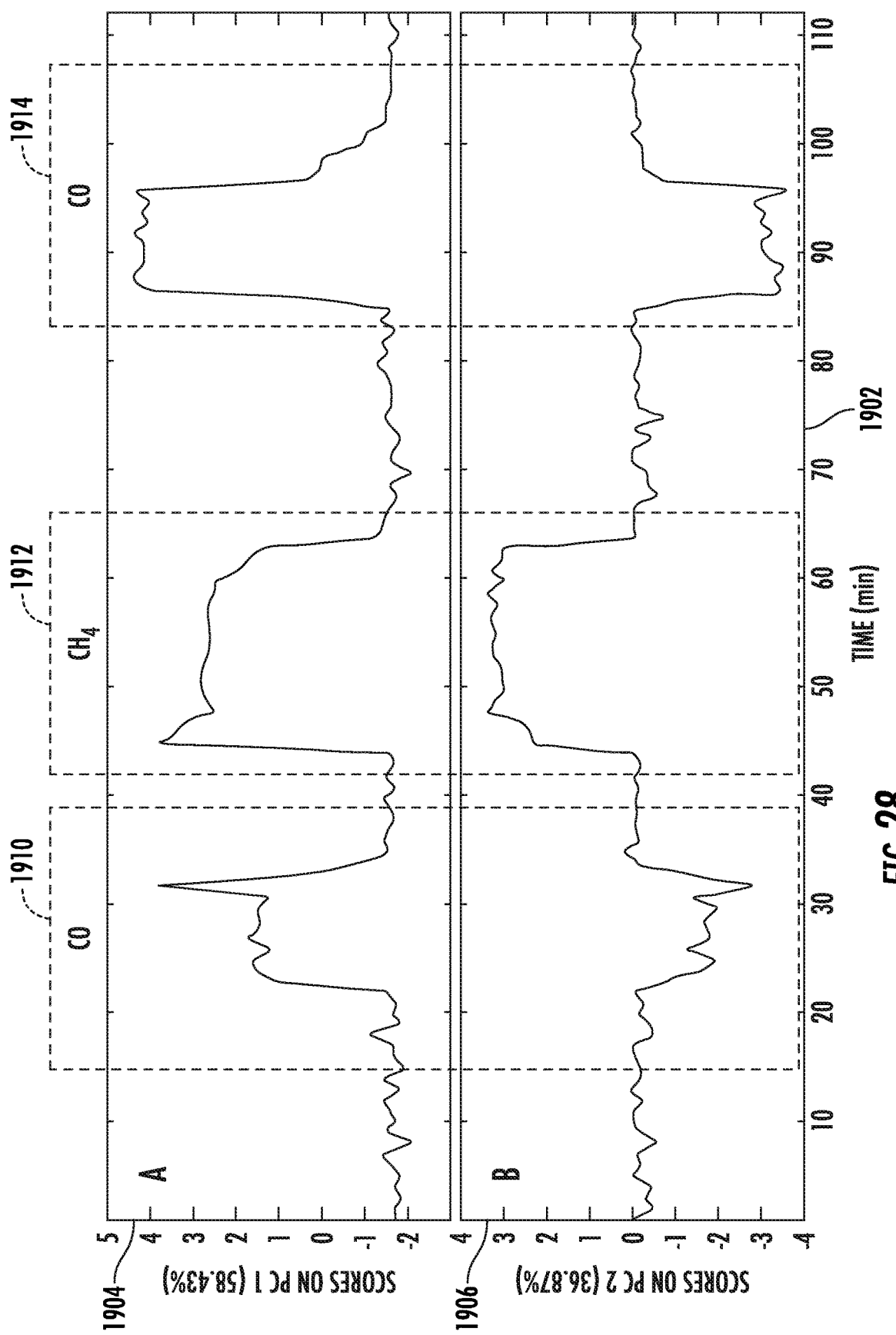
FIG. 28 illustrates graphical illustrations of analyzed electrical responses of the individual sensing elements of the multi-gas sensing system shown in FIG. 27.

For example, FIG. 28 illustrates graphical illustrations of the results of analyzed data of electrical responses of two sensing elements of the multi-gas sensing system shown in FIG. 27.

The electrical responses may be evaluated using one or more different statistical analysis tools, such as, for example, by performing Principal Component Analysis (PCA) on the electrical responses and other characteristics obtained by the system controller. Optionally, the concentration of one or more gases may be computed from a multivariate transfer function that may be built based on the electrical responses to the alternating electric current of the management system, temperatures of the sensing elements, states of the resistor-capacitor configurations of the sensing elements, information about environmental conditions around the multi-gas sensing system from the sensing circuit or other sensors, or the like. Optionally, alternative statistical analysis may be used to evaluate the data obtained by the system controller.

Graph A represents the results of analyzed data of the combined electrical responses using PCA and presented as the scores of the Principal Component #1 as a function of experimental time.

Graph B represents the results of analyzed data of the combined electrical responses using PCA and presented as the scores of the Principle Component #2 as a function of experimental time.

Graphs A and B are illustrated having a common horizontal axis 1902 representative of experimental time, and vertical axes 1904, 1906, respectively, representative of a linear scale of Principal Component #1 and Principal Component #2, respectively, of the developed PCA classification.

As illustrated in Graph A, first and third sections 1910, 1914, indicate the increased concentrations of CO, and a second section 1912 indicates the increased concentration of $CH_4$. For example, the first and third sections indicate the PCA Principal Component #1 responses to CO gas (e.g., sections 1810, 1814 of Graph B) of FIG. 27, and the second section indicates the PCA Principal Component #1 response to $CH_4$ gas (e.g., section 1812 of Graph A) of FIG. 27.

As illustrated in Graph B, first and third sections 1910, 1914 indicate the increased concentrations of CO, and a second section 1912 indicates the increased concentration of $CH_4$. For example, the first and third sections 1910, 1914 indicate the PCA Principal Component #2 responses to CO gas (e.g., sections 1810, 1814 of Graph B) of FIG. 27, and the second section 1912 indicates the PCA Principal Component #2 response to $CH_4$ gas (e.g., section 1812 of Graph A) of FIG. 27.

In one or more embodiments, the one or more processors of the system controller may provide a baseline correction of the sensing elements. The baseline correction may be done periodically, at scheduled intervals (e.g., after so many minutes, hours, days, years, or the like, of operating), or the like. The baseline correction may also be referred to as calibration of the sensing elements. The amount of correction, or the method of correcting or verifying the baseline, may be based on the electrical responses received from the sensing elements, the temperatures of the sensing elements, the state of the resistor-capacitor configurations of the sensing elements, information about the environmental conditions (e.g., ambient temperature, humidity, pressure, or the like) around or proximate to the multi-gas sensing system, based information received from other sensors or sensing devices, based on information wirelessly communicated to the multi-gas sensing system (e.g., such as from a workstation separate from the multi-gas sensing system), based on information or a protocol stored within the multi-gas sensing system, or the like.

Optionally, the one or more processors may change a selectivity, sensitivity, or linearity of the electrical responses of the multi-gas sensing system 1400 to allow the system to be more responsive to one analyte gas versus another analyte gas at different times or under different operating conditions. In one or more embodiments, the one or more processors may dynamically change the selectivity, the sensitivity, or the linearity, such that the one or more processors may change one or more of the selectivity, the sensitivity, or the linearity while the sensing system is operating. Optionally, the one or more processors may change one or more of the selectivity, the sensitivity, or the linearity of the electrical responses of the sensing system when the system is not sensing. For example, the one or more processors may determine a relaxation region of an impedance response of the sensing circuit. Both the real part of the impedance and the imaginary part of the impedance have a relaxation region. As one example, this relaxation region can be determined by examining the real part of the measured impedance of the sensing material 1508 as a function of frequency to locate where the real part of the impedance changes from high impedance value with substantially zero slope at low frequencies, to decreasing impedance values with a relatively high slope at higher frequencies, and to decreasing impedance values with a relatively low slope at even higher frequencies, and where impedance values are approaching zero at the highest frequencies.

The one or more processors may determine a position of the relaxation peak of the relaxation region of the imaginary part of the sensor impedance by identifying the inflection point frequency of the sensing circuit 1500. The inflection point frequency can be determined as the frequency of the electric current associated with the inflection point.

The one or more processors may determine frequency ranges of sensor operation that are lower and higher than the relaxation peak of the imaginary part of the sensor impedance and that are at or about (e.g., within 11%, within 3%, within 5%, or within 110% in different embodiments) the relaxation peak of the imaginary part of the sensor impedance. An electric current may be applied to the sensing material 1508 via the sensing electrodes 1510, 1512 of one or more sensing elements only at frequencies that are greater than the inflection point frequency and/or that are within the range of frequencies that are greater than the inflection point frequency. Operating the sensing circuit 1500 at these frequencies can improve the selective sensing of the sensing circuit 1500 (e.g., the sensitivity of the sensing circuit 1500) to one or more analytes of interest in the second sample relative to one or more other analytes (and relative to operating the sensing circuit 1500 at a frequency or frequencies that are at or below the inflection point frequency). The sensitivity of the sensing circuit 1500 includes a measured sensor response signal per analyte concentration unit.

As another example, the one or more processors may selectivity sense at least one analyte of interest with improved suppressed effects of interferences. Resistance and capacitance properties of the sensing circuit 1500 are measured during exposure of the sensing circuit 1500 to a first gas sample and are measured during exposure of the sensing circuit 1500 to a second gas sample. The one or more processors determine a capacitance value or a range of capacitance values of one or more passive electrical components (e.g., capacitive elements) in order to change a capacitance of one or more sensing elements of the sensing circuit 1500 to match a frequency range or a discrete frequency response of the system controller within a dielectric relaxation region of the sensing circuit 1500. Changing the capacitance of the sensing circuit 1500, that is coupled with the system controller, allows the system controller to selectively sense an analyte of interest (e.g., methane, ethane, another hydrocarbon, hydrogen, carbon monoxide, or the like) with suppressed effects of interferences.

Selective sensing of one or more analytes of interest is performed using the sensing circuit 1500 operating within a dielectric relaxation region of the sensing circuit in order to match a discrete frequency response or a frequency response range of the system controller 1420. For example, the sensing material 1508 of each sensing element of the sensing circuit 1500 can be exposed to a gas sample potentially having one or more analytes of interest therein. The system controller 1420 can communicate a control signal to the management circuit 1410 to direct the management circuit 1410 to apply alternating electric current to the sensing material 1508 via the sensing electrodes 1510, 1512 either over a designated frequency response range or at the designated discrete frequency of the system controller 1420 that is within the dielectric relaxation region of the sensing circuit 1500. Operating the sensing circuit 1500 at these frequencies can increase the selective sensing of the multi-gas sensing system 1400 (e.g., the sensitivity of sensing of the multi-gas sensing system 1400) to one or more analytes of interest in the sample relative to one or more other analytes (and relative to operating the sensing circuit 1500 at a different frequency or different frequency range of the system controller 1420). The sensitivity of the sensing circuit 1500 includes a measured sensor response signal per analyte concentration unit.

Returning to FIG. 26, a determination is made if a resistor-capacitor configuration of one of the sensing elements needs to change. If the configuration does need to change, flow of the method proceeds towards at (1712), where the management circuit changes the resistor-capacitor configuration of one or more sensing elements. Flow of the method returns to (1702A-C) where the method starts again. Alternatively, if the resistor-capacitor configuration of none of the sensing elements needs to change, flow of the method moves toward (1714).

At (1714), a determination is made if an amount of at least one gas exceeds a predetermined threshold. For example, the system controller may determine that, based on the analysis performed in steps (1704) through (1708), that there is an amount of gas present that exceeds a predetermined threshold and the concentration of the gas may be dangerous to the operator or user of the multi-gas sensing system. Optionally, the concentration of the gas may be dangerous for an operator to perform a particular task such as, but not limited to, drive or operate motorized equipment, use inflammatory equipment, remain in the environment without wearing appropriate safety equipment, or the like. In one or more embodiments, a determination may be made if any amount of a particular gas is present. For example, any trace amount, or a minimal amount of a particular gas may be dangerous for the operator to continue operating or to remain in the environment.

In one or more embodiments, the one or more processors of the system controller may determine a responsive action of an asset based on the electrical responses by the multi-gas sensing system. For example, the system controller may determine whether the concentration of at least one gas analyte exceeds a predetermined threshold at (1714).

If the amount or concentration of the gas analyte does not exceed a predetermined threshold, flow of the method returns to (1702) and the method repeats for a predetermined amount of time, while the operator is within the environment, until the operator disables the multi-gas sensing system, or the like. Alternatively, if the amount or concentration of the gas exceeds a predetermined threshold, flow of the method proceeds toward (1716). At (1716), a notification is communicated to at least the controller or other system incorporating the multi-gas sensing system.

Figure 29:
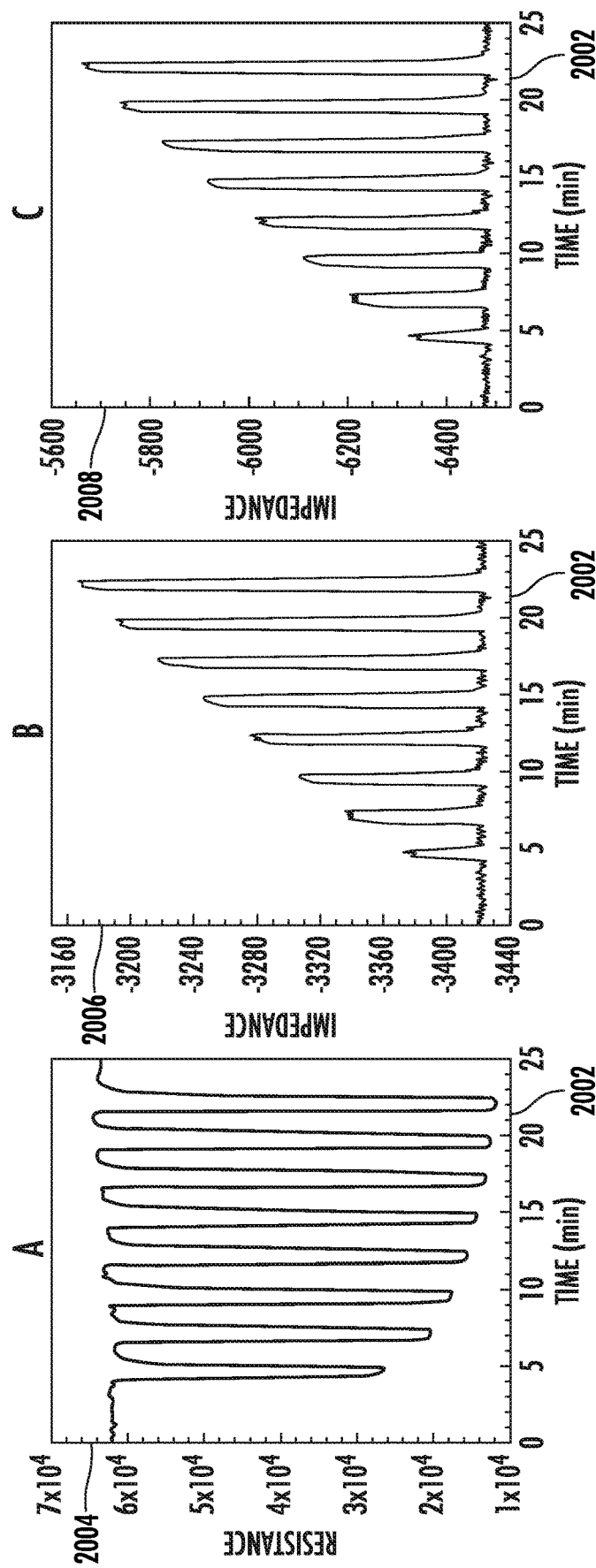
FIG. 29 illustrates graphical illustrations of responses of a metal oxide sensing element to a gas of interest in accordance with one embodiment.

FIG. 29 illustrates graphical illustrations of responses of a metal oxide sensing element to a gas of interest, such as methane, according to one experiment. In the present experiment, the sensing element is a structure with an integrated heater formed on a silicon substrate using micro electromechanical systems (MEMS) technology and a metal-oxide semiconductor material layer formed on the sensing chip as a surface-mount ceramic package. The sensing element requires a heater power consumption of only about 15 mW. In the present experiment, methane was presented to the sensing element at concentrations of 1087 parts per million (ppm), 2174 ppm, 3261 ppm, 4348 ppm, 5435 ppm, 6522 ppm, 7609 ppm, and 8696 ppm.

Graphs A, B, and C are illustrated having a common horizontal axis 2002 representative of experimental time. Graph A is illustrated having a vertical axis 2004 representative of resistance, and Graphs B and C are illustrated having vertical axes 2006, 2008, respectively, representative of impedance. Graph A of FIG. 29 depicts the electrical response of the sensing element as measured by conventional resistance. The resistance response of the sensing element to methane concentrations has a non-linear response. Additionally, the sensitivity decreases with the increase of methane gas concentration. Graphs B and C illustrate the electrical response of the sensing element as measured by the dielectric excitation methodology. Results illustrated in Graph B were achieved by using a desktop impedance analyzer. Results illustrated in Graph C were achieved using an integrated circuit impedance analyzer. The close resemblance of the linearity of the responses and the noise levels in Graphs B and C demonstrate that the quality of sensing of methane using the integrated circuit impedance analyzer was approximately the same when compared to the quality of sensing of methane using the desktop impedance analyzer.

Figure 30:
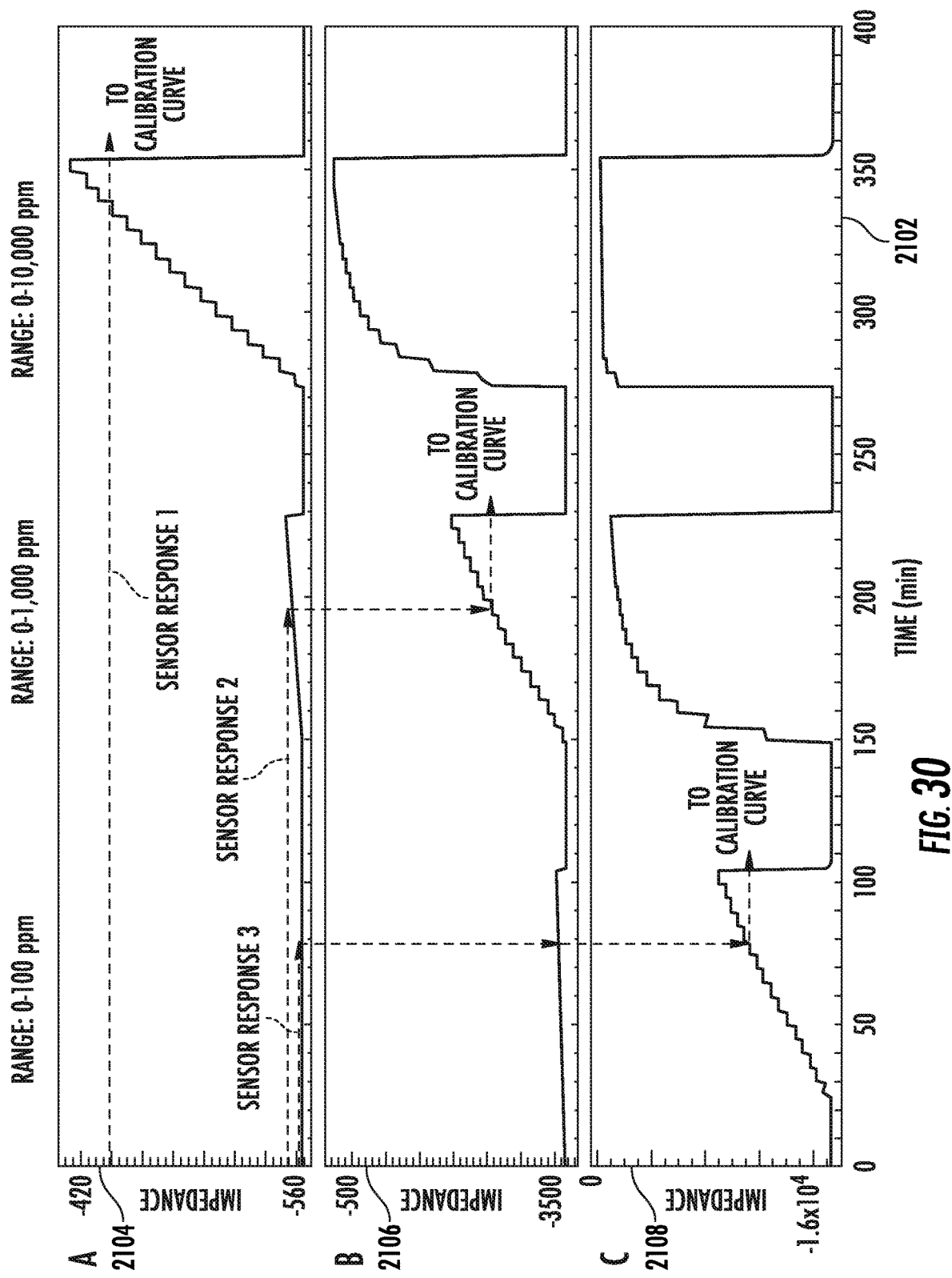
FIG. 30 illustrates graphical illustrations of quantitation of gas concentrations using dielectric excitation gas detection in accordance with one embodiment.

The developed sensor system may measure electrical responses of the sensing element responsive to alternating electrical current applied to the sensing element at one or more different frequencies and/or one or more different resistor-capacitor configurations, of the sensing element. To quantify a gas of interest over its broad range of concentrations with a linear sensor response and its desired resolution, the dielectric excitation methodology can be applied at several frequencies. FIG. 30 illustrates graphical illustrations of three measured sensor responses at three frequencies (Graphs A, B, and C) ranging from relatively high to medium and to relatively low frequency. The Graphs A, B, and C are illustrated having a common horizontal axis 2102 representative of experimental time, and vertical axes 2104, 2106, 2108 representative of impedance.

While responses can be measured at all three frequencies of the measurement system, to determine a gas concentration, the calibration curve can be started at the highest frequency. If the sensor response is above the approximately bottom 20% of the sensor responses at this frequency (e.g., sensor response #1), the linear calibration curve at this frequency can be noted and can be related to the gas concentration (Graph A). If the sensor response is below the bottom 20% of the sensor responses at this frequency (e.g., sensor responses #2 and #3), detection can be switched to a decade lower in gas concentrations by using the linear calibration curve at the lower frequency and relating the sensor response to the gas concentration (e.g., sensor response #2, show in Graph B). If the sensor response 3 is below the approximate 10% of the sensor responses at this frequency, detection can be switched further to a decade lower in gas concentrations and the corresponding calibration curve can be utilized (e.g., Graph C). Thus, these sensor responses at different frequencies can allow high-resolution determination of gas concentrations across the broad range of gas concentrations with linear response.

Figure 31:
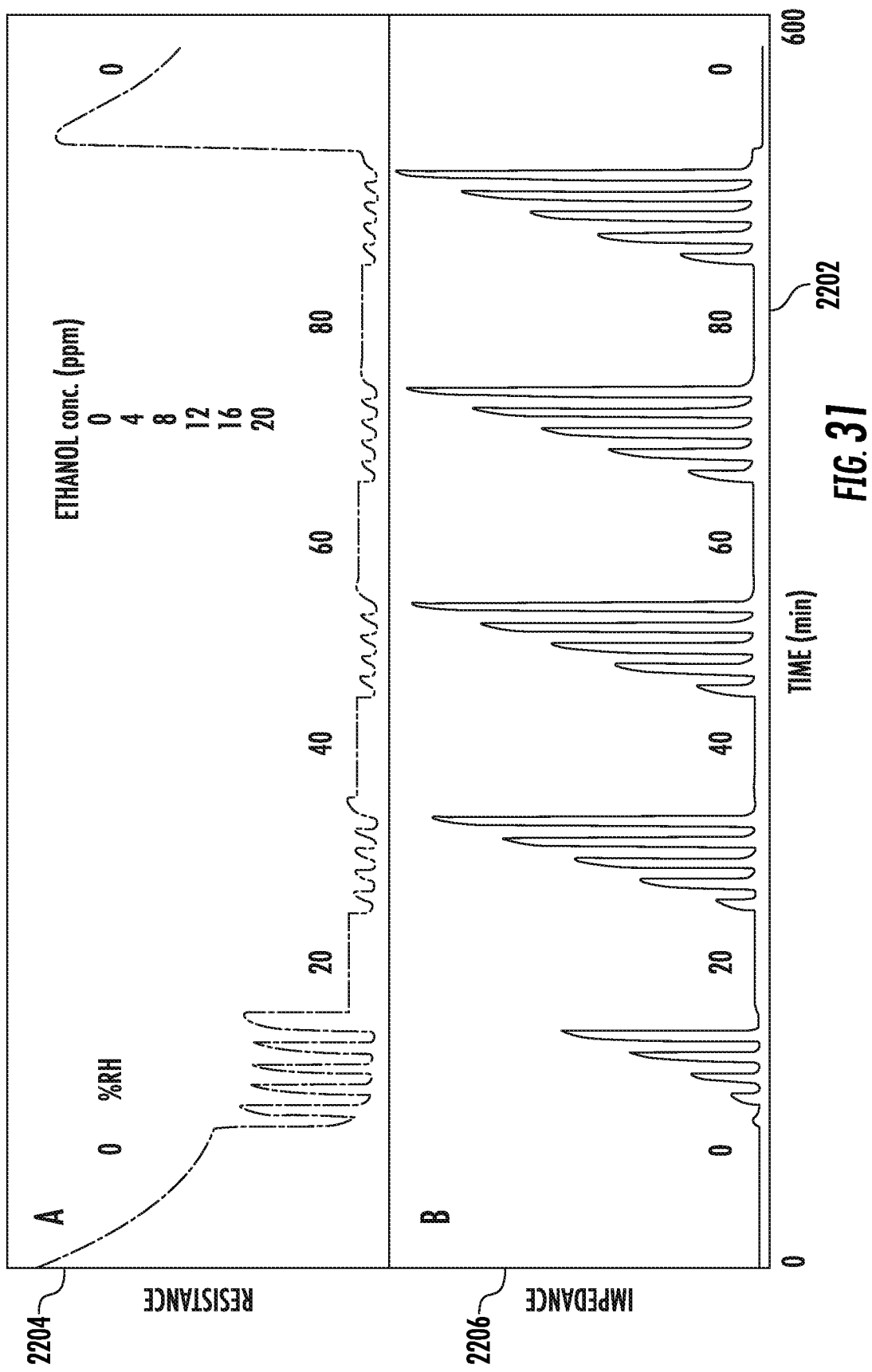
FIG. 31 illustrates effects of water vapor over a range of relative humidity on resistance and dielectric excitation responses.

Another experiment demonstrated that variable humidity of air affects the response of conventional chemiresistor sensors based on metal oxide sensing materials by changing their baseline and gas sensitivity. For example, FIG. 31 illustrates effects of water vapor over a range of 0-80% relative humidity (RH) on resistance and impedance (dielectric response) responses to ethanol (as a model vapor) at concentrations of 4, 8, 12, 16, and 20 ppm. Graphs A and B are illustrated having a common horizontal axis 2202 representative of experimental time. Graph A is illustrated having a vertical axis 2204 representative of resistance, and Graph B is illustrated having a vertical axis 2206 representative of impedance.

The resistance response had a known significant decrease in baseline and decrease in gas sensitivity with the increase of RH (Graph A). Meanwhile, the dielectric excitation and impedance measurement can provide three advancements over resistance measurements (illustrated in Graph B). First, response baseline can be less affected by humidity variations. Second, sensor sensitivity can be increased with the increase of RH. Third, response linearity can be improved in the presence of water vapor.

Figure 32:
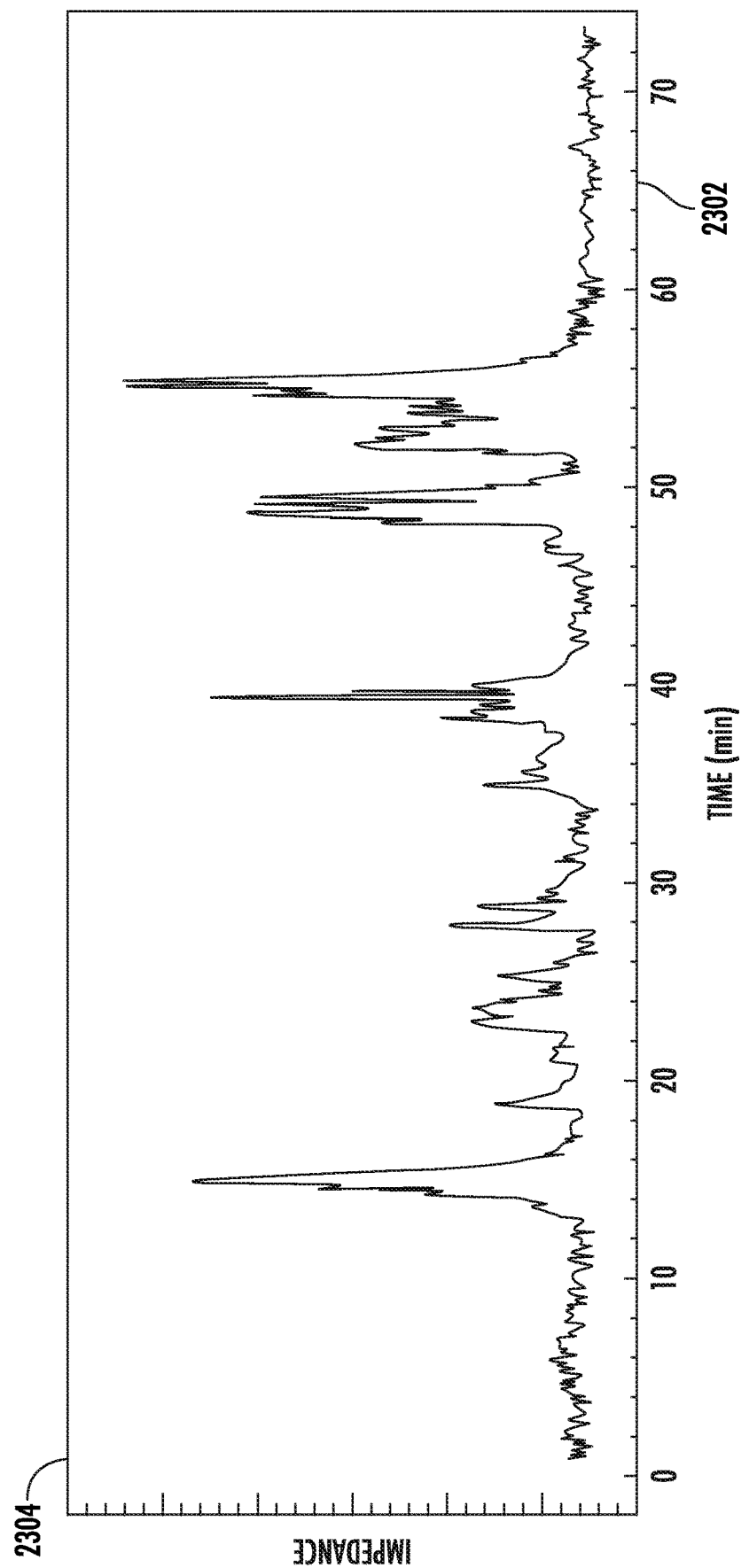
FIG. 32 illustrates graphical illustrations of operation of a multi-gas monitor under dynamic wind conditions in accordance with one embodiment.

In another experiment, measurements of the response of the multi-gas monitor to methane gas were performed outdoors under dynamic field conditions. FIG. 32 illustrates graphical results of monitoring of dynamic methane plumes outdoors using the developed multi-gas monitor. Time is on a horizontal axis 2302 and impedance is on a vertical axis 2304. Uncontrolled wind conditions can produce a response pattern of the monitor that can be affected by variable wind direction and variable wind speed. As a result, detected gas concentrations can be the result of convolution between variable wind direction and wind speed. Thus, such results can provide the knowledge about maximum concentrations of gas that reach the detector at certain times.

Figure 33:
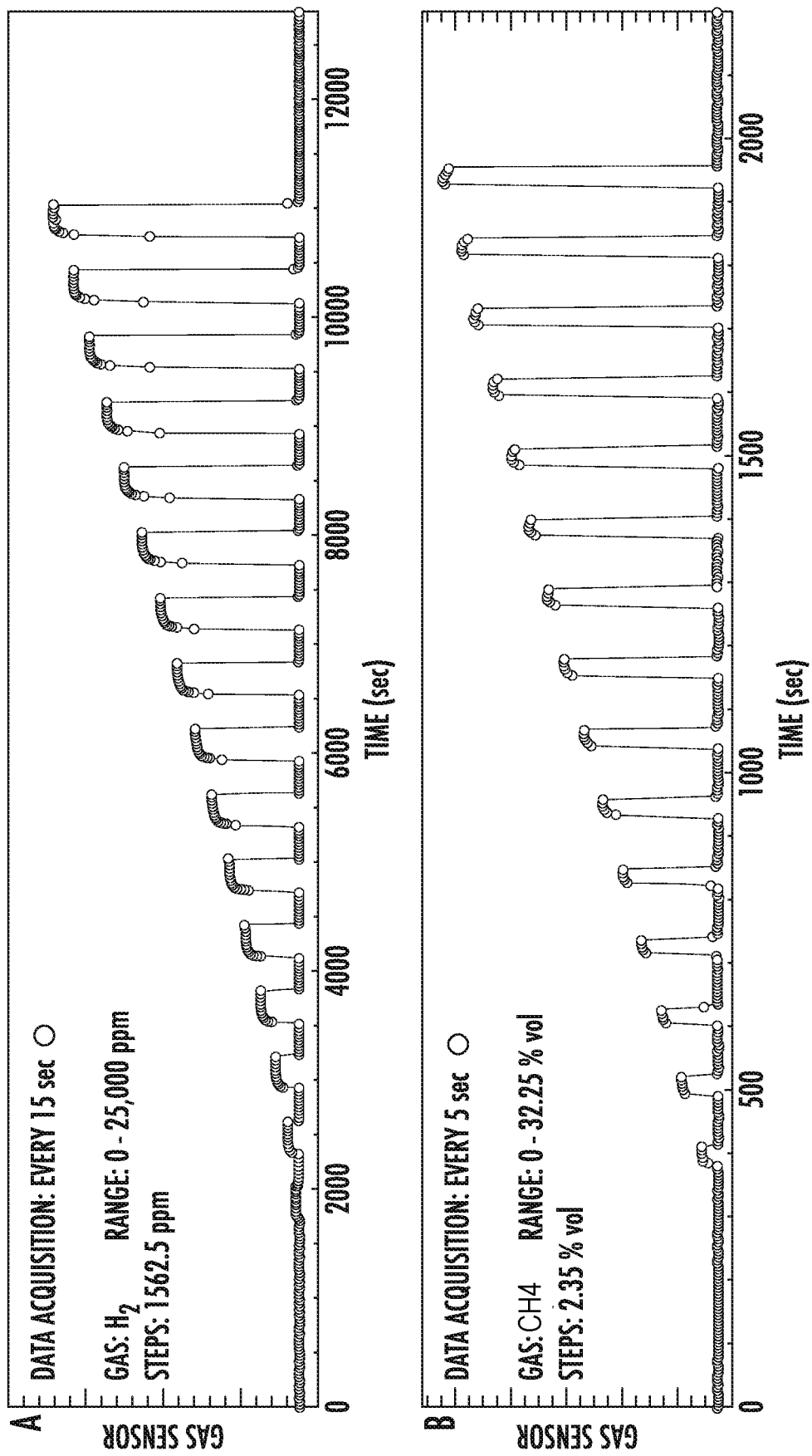
FIG. 33 is an illustration of responses of a sensing element to hydrogen and methane in accordance with one embodiment.

In another experiment, measurements of the response of the multi-gas sensor to monitor the response of $H_2$ and $CH_4$ were conducted. FIG. 33 illustrates graphical results of these measurements. In particular, FIG. 33 depicts response speeds of $H_2$ and $CH_4$ detection using a multi-gas sensor in accordance with one or more exemplary aspects of the present disclosure. In the top graph, Graph A, $H_2$ sensor data collection was every 15 seconds, and one or two data points were needed to achieve a 90% of sensor equilibrated response to $H_2$. In the bottom graph, Graph B, $CH_4$ sensor data collection was every 5 seconds, and one data point was needed to achieve a 90% of sensor equilibrated response to $CH_4$.

In the test with $H_2$, sensor data was collected every 15 seconds (Graph A) and it was observed that the multi-gas sensor needed only one or two data points to achieve 90% of its equilibrated response to the increasing $H_2$ concentrations. Response to $CH_4$, however, was even faster. Sensor data for $CH_4$ was collected every 5 second (Graph B) and it was observed that the multi-gas sensor needed only one data point to achieve 90% of its equilibrated response to the increasing $CH_4$ concentrations.

Results for detection of three gases $H_2$, $CH_4$, and CO relevant to SOFC monitoring at their relevant high concentrations are depicted in FIG. 34. In particular, referring to FIG. 34, excitation parameters were identified from the multi-gas sensors (also known as variable control parameters) to detect and quantify $H_2$, CO, and $CH_4$ gases with a single multi-gas sensor. FIG. 34 illustrates results for quantitation of $H_2$, CO, and $CH_4$ gases with a single multi-gas sensor. Three steady-state responses of the single multi-gas sensor to three gases recorded at different excitation frequencies (also known as variable control parameters) are depicted in Graphs, A, B, and C, respectively, in FIG. 34. The dotted horizontal lines highlight the different response patterns to three gases at three frequencies. In addition, a machine learning tool was applied, such as support vector machine (SVM), to cross-validate the quantitation of $H_2$, CO, and $CH_4$ gases using this multi-gas sensor, depicted in Graphs D, E, and F.

In one or more embodiments of the subject matter described herein, a multi-gas sensing system includes a sensing circuit comprising one or more sensing elements. Each of the one or more sensing elements includes a sensing material configured to detect at least one gas analyte. A management circuit is configured to excite the one or more sensing elements with an alternating current at at least one predetermined frequency. The management circuit measures one or more electrical responses of the one or more sensing elements responsive to exciting the one or more sensing elements with the alternating current at the at least one predetermined frequency. The management circuit determines one or more characteristics of the sensing circuit. One or more processors receive the one or more electrical responses of the one or more sensing elements and the one or more characteristics of the sensing circuit. The one or more processors determine a concentration of the at least one gas analyte based on the one or more electrical responses of the one or more sensing elements and the one or more characteristics of the sensing circuit.

This is written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A propulsion system comprising: a propulsor; a turbomachine operable to drive the propulsor to generate thrust during operation; a fuel cell assembly configured to add power to the propulsor, the turbomachine, or both; and a multi-gas sensor operable with the turbomachine, the fuel cell assembly, or both for sensing gas composition data of a fluid flow in or to the turbomachine, the fuel cell assembly, or both, the gas composition data comprising data indicative of at least two gases and their concentrations.

The propulsion system of any preceding clause, wherein the turbomachine comprises a combustion section having a combustor, wherein the fuel cell assembly comprises a fuel cell stack having a fuel cell, the fuel cell defining an outlet positioned to remove output products from the fuel cell and provide the output products to the combustor.

The propulsion system of any preceding clause, wherein the fluid flow is the flow of output products from the fuel cell.

The propulsion system of any preceding clause, wherein the fuel cell assembly comprises a fuel processing unit, and wherein the fluid flow is a fuel processing unit flow from the fuel processing unit.

The propulsion system of any preceding clause, wherein the fuel cell assembly further includes a fuel cell stack having a fuel cell, wherein the fuel processing unit flow is provided to the fuel cell.

The propulsion system of any preceding clause, wherein the fuel cell assembly comprises a fuel cell stack and an enclosure at least partially enclosing the fuel cell stack, wherein the fluid flow is an air within the enclosure.

The propulsion system of any preceding clause, further comprising: a fuel delivery assembly, wherein the turbomachine comprises a combustion section having a combustor, wherein the fuel delivery assembly is configured to provide a fuel flow to the combustion section, and wherein the fluid flow is the fuel flow provided to the combustor.

The propulsion system of any preceding clause, wherein the propulsion system is an aeronautical propulsion system, and wherein the multi-gas sensor is configured to sense the gas composition data of the fluid flow in or to the turbomachine, the fuel cell assembly, or both during a flight operation of the propulsion system.

The propulsion system of any preceding clause, wherein the multi-gas sensor is positioned within an environment within the turbomachine, within the fuel cell assembly, or both having a temperature of at least 400 degrees Celsius and up to 1000 degrees Celsius during a normal operating condition of the propulsion system.

The propulsion system of any preceding clause, wherein the at least two gases and their concentrations include two or more of the following: $H_2$, CO, $CO_2$, $CH_4$, $H_2O$, $N_2$, $NH_3$, non-volatile particulate matter, and volatile particulate matter.

The propulsion system of any preceding clause, wherein the multi-gas sensor weighs less than about 50 grams and has a size less than less than about 20 mm in length by less than about 20 mm in width by less than about 20 mm in thickness.

The propulsion system of any preceding clause, wherein the propulsion system comprises a fluid line, wherein the fluid flow in or to the turbomachine, the fuel cell assembly, or both is provided through the fluid line, and wherein the multi-gas sensor is positioned in line with the fluid line.

The propulsion system of any preceding clause, wherein the turbomachine comprises an outer casing, wherein the multi-gas sensor is positioned within the outer casing of the turbomachine.

The propulsion system of any preceding clause, wherein the multi-gas sensor is positioned within an environment within the turbomachine, within the fuel cell assembly, or both having a temperature of at least 200 degrees Celsius during a normal operating condition of the propulsion system.

The propulsion system of any preceding clause, wherein the propulsion system further comprises a fluid line, wherein the fluid flow in or to the turbomachine, the fuel cell assembly, or both is provided through the fluid line, and wherein the multi-gas sensor is not separated from the fluid line.

The propulsion system of any preceding clause, wherein the multi-gas sensor comprises: a sensing circuit comprising one or more sensing elements; a management circuit configured to excite the one or more sensing elements with an alternating current at a frequency, the management circuit configured to measure one or more electrical responses of the one or more sensing elements responsive to exciting the sensing element with the alternating current at the frequency, the management circuit configured to determine one or more characteristics of the sensing circuit; and one or more processors configured to receive the one or more electrical responses of the one or more sensing elements and the one or more characteristics of the sensing circuit, wherein the one or more processors are further configured to determine the gas composition data based on the one or more electrical responses of the one or more sensing elements and the one or more characteristics of the sensing circuit.

The propulsion system of any preceding clause, wherein the gas composition data is the type of the gas and the concentration of the gas.

The propulsion system of any preceding clause, wherein the gas composition data is provided in real time during operation of the propulsion system of one or more of these clauses.

The propulsion system of any preceding clause, wherein the multi-gas sensor comprises: a sensing circuit comprising one or more sensing elements; a management circuit configured to excite the one or more sensing elements with variable control parameters, the management circuit configured to measure one or more electrical responses of the one or more sensing elements responsive to exciting the sensing element with the variable control parameters, the management circuit configured to determine one or more characteristics of the sensing circuit; and one or more processors configured to receive the one or more electrical responses of the one or more sensing elements and the one or more characteristics of the sensing circuit, wherein the one or more processors are further configured to determine the gas composition data based on the one or more electrical responses of the one or more sensing elements and the one or more characteristics of the sensing circuit.

A method of operating a propulsion system, the method comprising: receiving gas composition data from a multi-gas sensor of a fluid flow in or to a turbomachine of the propulsion system, a fuel cell assembly of the propulsion system, or both, the gas composition data comprising data indicative of at least two gas compositions; and controlling operation of the fuel cell assembly, a gas turbine engine including the turbomachine, or both in response to the received gas composition data from the multi-gas sensor.

A method for operating a propulsion system, the propulsion system comprising a gas turbine engine and a fuel cell assembly, the method comprising operating the propulsion system to generate thrust for a vehicle; receiving, from a multi-gas sensor, gas composition data of one or more fluid flows in or to the gas turbine engine, the fuel cell assembly, or both while operating the propulsion system; and determining a health indicator for the gas turbine engine, the fuel cell assembly, or both in response to the received gas composition data.

The method of any preceding clause, further comprising: receiving data indicative of an operational parameter for the propulsion system; wherein determining the health indicator comprises detecting an anomaly, wherein detecting the anomaly comprises comparing the received gas composition data to the received operational parameter.

The method of any preceding clause, wherein detecting the anomaly comprises detecting an incipient anomaly, wherein receiving from the multi-gas sensor gas composition data of one or more fluid flows in or to the gas turbine engine, the fuel cell assembly, or both comprises receiving from the multi-gas sensor gas composition data of one or more fluid flows in or to the gas turbine engine, the fuel cell assembly, or both at a time resolution of one minute or less, and wherein the method further comprises: modifying an operation of the gas turbine engine, the fuel cell assembly, or both in response to the gas composition data of the one or more fluid flows to mitigate an effect of the incipient anomaly.

The method of any preceding clause, wherein determining the health indicator further comprises determining an anomaly type, determining an affected part, or both.

The method of any preceding clause, wherein the anomaly type is a carbon deposition in a fuel processing unit of the fuel cell assembly, a catalyst poisoning within the fuel processing unit, a catalyst oxidation within the fuel processing unit, a carbon deposition in a fuel cell of the fuel cell assembly, a carbon deposition within a combustor of the gas turbine engine, a fuel cell leakage, an anode oxidation, or a combination thereof.

The method of any preceding clause, wherein determining the health indicator for the gas turbine engine, the fuel cell assembly, or both comprises determining a system health parameter.

The method of any preceding clause, further comprising: providing maintenance guidance based on the system health parameter.

The method of one or more of these clauses, wherein determining the health indicator comprises detecting a component fault.

The method of any preceding clause, wherein determining the health indicator for the gas turbine engine, the fuel cell assembly, or both comprises determining a system health parameter, and wherein the method further comprises: modifying an operating parameter of the gas turbine engine, the fuel cell assembly, or both in response to the system health parameter.

The method of any preceding clause, wherein determining the health indicator comprises detecting a component fault, and wherein the method further comprises: controlling operation of the fuel cell assembly, the gas turbine engine, or both in response to detecting the component fault.

The method of any preceding clause, wherein the multi-gas sensor comprises: a sensing circuit comprising one or more sensing elements; a management circuit configured to excite the one or more sensing elements with an alternating current at a frequency, the management circuit configured to measure one or more electrical responses of the one or more sensing elements responsive to exciting the sensing element with the alternating current at the frequency, the management circuit configured to determine one or more characteristics of the sensing circuit; and one or more processors configured to receive the one or more electrical responses of the one or more sensing elements and the one or more characteristics of the sensing circuit, wherein the one or more processors are further configured to determine the data of one or more fluid flows based on the one or more electrical responses of the one or more sensing elements and the one or more characteristics of the sensing circuit.

A control system for a propulsion system having a gas turbine engine and a fuel cell assembly, the control system comprising: a multi-gas sensor; and a controller, the controller comprising one or more processors, and a memory, the memory storing instructions that when executed by the one or more processors are configured to control one or more operations of the propulsion system, the memory comprising a data collection module configured to receive data indicative of gas composition data of one or more fluid flows in or to the gas turbine engine, the fuel cell assembly, or both during operating of the propulsion system; and an inference module configured to determine a health indicator for the gas turbine engine, the fuel cell assembly, or both in response to the received gas composition data from the data collection module.

The control system of any preceding clause, wherein the memory further comprises: a reporting module configured to provide reporting information in response to the determined health indicator.

The control system of any preceding clause, wherein the memory further comprises: a maintenance service module configured to provide maintenance guidance in response to the determined health indicator.

The control system of any preceding clause, wherein the memory further comprises: a control module configured to modify an operating parameter of the fuel cell assembly, the gas turbine engine, or both in response to the determined health indicator.

A propulsion system comprising: a gas turbine engine comprising a combustion section having a combustor; and a modular fuel cell assembly comprising a first fuel cell string comprising a first processing unit and a first fuel cell stack, the first fuel cell stack comprising a first fuel cell defining an outlet configured to provide output products from the first fuel cell to the combustor; and a second fuel cell string comprising a second processing unit and a second fuel cell stack, the second fuel cell stack comprising a second fuel cell defining an outlet configured to provide output products from the second fuel cell to the combustor.

The propulsion system of any preceding clause, further comprising: a control system comprising one or more sensors configured to sense gas composition data of a first fluid flow through the first fuel cell string and of a second fluid flow through the second fuel cell string.

The propulsion system of any preceding clause, wherein the control system further comprises a controller, wherein the controller is configured to receive the gas composition data of a first fluid flow through the first fuel cell string and of a second fluid flow through the second fuel cell string; and modify an operating parameter of the first fuel cell string, of the second fuel cell string, or both in response to the received gas composition data.

The propulsion system of any preceding clause, wherein the one or more sensors comprises a first sensor positioned in line with the first fuel cell string and a second sensor positioned in line with the second fuel cell string.

The propulsion system of any preceding clause, wherein the one or more sensors comprises one or more multi-gas sensors.

The propulsion system of any preceding clause, wherein the one or more sensors comprises a multi-gas sensor configured to sample the first fluid flow through the first fuel cell string and the second fluid flow through the second fuel cell string.

The propulsion system of any preceding clause, wherein the one or more sensors are configured to sense the gas composition data of the first fluid flow through the first fuel cell string at a location downstream of the first processing unit and upstream of the first fuel cell stack and of the second fluid flow through the second fuel cell string at a location downstream of the second processing unit and upstream of the second fuel cell stack.

The propulsion system of any preceding clause, wherein the one or more sensors are configured to sense the gas composition data of the first fluid flow through the first fuel cell string at a location downstream of the first fuel cell stack and of the second fluid flow through the second fuel cell string at a location downstream of the second fuel cell stack.

The propulsion system of any preceding clause, wherein the modular fuel cell assembly further comprises a third fuel cell string.

The propulsion system of any preceding clause, wherein the first fuel cell string is independently controllable relative to the second fuel cell string.

The propulsion system of any preceding clause, wherein a first fluid flow through the first fuel cell string is independently controllable relative to a second fluid flow through the second fuel cell string.

The propulsion system of any preceding clause, wherein the first fuel cell string and the second fuel cell string are independently connected within the gas turbine engine.

A method of operating a propulsion system, the propulsion system comprising a modular fuel cell assembly and a gas turbine engine, the method comprising: providing output products from a first fuel cell of a first fuel cell string of the modular fuel cell assembly and from a second fuel cell of a second fuel cell string of the modular fuel cell assembly to a combustor of a combustion section of the gas turbine engine; receiving gas composition data of a first fluid flow through the first fuel cell string and of a second fluid flow through the second fuel cell string; and modifying an operating parameter of the first fuel cell string, of the second fuel cell string, or both in response to the received gas composition data.

The method of any preceding clause, further comprising: receiving operational data of the modular fuel cell assembly, of the gas turbine engine, of an aircraft including the modular fuel cell assembly and the gas turbine engine, or a combination thereof, and wherein modifying the operating parameter comprises modifying the operating parameter of the first fuel cell string, of the second fuel cell string, or both in response to the received gas composition data and the received operational data.

The method of any preceding clause, wherein the operational data comprises: a health indicator of the fuel cell assembly, the gas turbine engine, or both; a flight schedule of an aircraft including the fuel cell assembly and gas turbine engine; a maintenance schedule of the aircraft; or a combination thereof.

The method of any preceding clause, wherein the health indicator of the fuel cell assembly, the gas turbine engine, or both comprises accumulated health information.

The method of any preceding clause, wherein modifying the operating parameter comprises determining a component of the first fuel cell string exceeds a health threshold; and increasing a power output of the first fuel cell string in response to determining the component of the first fuel cell string exceeds the health threshold.

The method of any preceding clause, wherein modifying the operating parameter comprises detecting an anomaly within the fuel cell assembly; and reducing a power output of the first fuel cell string in response to detecting the anomaly within the fuel cell assembly.

The method of any preceding clause, wherein detecting the anomaly within the fuel cell assembly comprises detecting the anomaly within the first fuel cell string.

The method of any preceding clause, wherein receiving the gas composition data of the first fluid flow through the first fuel cell string and of the second fluid flow through the second fuel cell string comprises receiving the gas composition data from one or more gas sensors.

The method of any preceding clause, wherein the one or more gas sensors include one or more multi-gas sensors.

A method of operating a propulsion system having a gas turbine engine and a fuel cell assembly, the fuel cell assembly comprising a fuel cell, the method comprising: receiving gas composition data of output products from the fuel cell; and controlling operation of the fuel cell assembly, the gas turbine engine, or both in response to the received gas composition data of the output products from the fuel cell.

The method of any preceding clause, further comprising: operating the propulsion system during a flight operation; wherein receiving gas composition data of output products from the fuel cell comprises receiving gas composition data of output products from the fuel cell while operating the propulsion system during the flight operation.

The method of any preceding clause, wherein receiving gas composition data of output products from the fuel cell further comprises sensing composition data of output products from the fuel cell at a time resolution of ten minutes or less.

The method of any preceding clause, wherein receiving gas composition data of output products from the fuel cell further comprises sensing composition data of output products from the fuel cell at a time resolution of one minute or less.

The method of any preceding clause, wherein controlling operation of the fuel cell assembly, the gas turbine engine, or both comprises controlling operation of the fuel cell assembly.

The method of any preceding clause, wherein controlling operation of the fuel cell assembly comprises modifying an operating parameter of the fuel cell assembly in response to the received gas composition data of the output products from the fuel cell.

The method of any preceding clause, wherein the operating parameter comprises: a fuel flowrate to the fuel cell assembly, a fuel pressure, an equivalence ratio for a fuel processing unit of the fuel cell assembly, a steam carbon ratio for the fuel processing unit of the fuel cell assembly, an air pressure, an air flowrate, an anode to cathode pressure differential, an anode inlet temperature, a cathode inlet temperature, a fuel cell stack temperature, a fuel cell current, a fuel cell utilization, a fuel cell air utilization, or a combination thereof.

The method of any preceding clause, wherein controlling operation of the fuel cell assembly, the gas turbine engine, or both comprises controlling the gas turbine engine.

The method of any preceding clause, wherein controlling operation of the gas turbine engine comprises modifying an operating parameter of the gas turbine engine in response to the received gas composition data of the output products from the fuel cell.

The method of any preceding clause, wherein the operating parameter of the gas turbine engine comprises: a combustor fuel flowrate, a combustor fuel air ratio, a fuel flowrate ratio between combustor fuel flow and fuel cell fuel flow, a variable bleed valve, a variable guide vane, a low pressure shaft speed, a high pressure shaft speed, a variable fan nozzle, an engine-driven generator output, or a combination thereof.

The method of any preceding clause, wherein receiving the gas composition data comprises receiving the gas composition data from a gas sensor, and wherein controlling operation of the fuel cell assembly, the gas turbine engine, or both in response to the received composition data comprises: using a model-based control to control operation of the fuel cell assembly, the gas turbine engine, or both, and wherein using the model-based control comprises determining estimated gas composition data using a model; and determining actual gas composition data based on the determined estimated gas composition data and the received gas composition data using a fusion filter.

The method of any preceding clause, further comprising calibrating the model in response to the received gas composition data.

The method of any preceding clause, further comprising detecting a fault with the gas sensor based on the determined estimated gas composition data.

The method of any preceding clause, wherein the gas composition data of output products comprises a percentage of hydrogen within the output products.

A propulsion system comprising: a gas turbine engine comprising a combustion section having a combustor; a fuel cell assembly comprising a fuel cell stack having a fuel cell defining an outlet configured to provide output products from the fuel cell to the combustor; and a control system comprising a gas sensor positioned to determine gas composition data of the output products at a location downstream of the fuel cell and upstream of the combustor, the control system configured to control operation of the fuel cell assembly, the gas turbine engine, or both in response to the determined gas composition data of the output products from the fuel cell.

The propulsion system of any preceding clause, wherein the control system is further configured to determine the gas composition data of output products from the fuel cell while operating the propulsion system during a flight operation.

The propulsion system of any preceding clause, wherein the control system is configured to determine the gas composition data of output products from the fuel cell at a time resolution of one minute or less.

The propulsion system of any preceding clause, wherein the control system is configured to control operation of the fuel cell assembly by modifying an operating parameter of the fuel cell assembly, and wherein the operating parameter comprises: a fuel flowrate to the fuel cell assembly, a fuel pressure, an equivalence ratio for a fuel processing unit of the fuel cell assembly, a steam carbon ratio for the fuel processing unit of the fuel cell assembly, an air pressure, an air flowrate, an anode to cathode pressure differential, an anode inlet temperature, a cathode inlet temperature, a fuel cell stack temperature, a fuel cell current, a fuel cell utilization, a fuel cell air utilization, or a combination thereof.

The propulsion system of any preceding clause, wherein the control system is configured to control operation of the gas turbine engine by modifying an operating parameter of the gas turbine engine, and wherein the operating parameter comprises: a combustor fuel flowrate, a combustor fuel air ratio, a fuel flowrate ratio between combustor fuel flow and fuel cell fuel flow, a variable bleed valve, a variable guide vane, a low pressure shaft speed, a high pressure shaft speed, a variable fan nozzle, an engine-driven generator output, or a combination thereof.

The propulsion system of any preceding clause, wherein the gas composition data comprises a percentage of hydrogen within the output products.

The method of any preceding clause, wherein receiving gas composition data of output products from the fuel cell further comprises sensing composition data of output products from the fuel cell at a time resolution of one second or less.

The method of any preceding clause, wherein receiving gas composition data of output products from the fuel cell further comprises sensing composition data of output products from the fuel cell with a multi-gas sensor that is operated with variable control parameters.

The propulsion system of any preceding clause, wherein the one or more multi-gas sensors are positioned within an environment having a temperature of at least 600 degrees Celsius and up to 1000 degrees Celsius during a normal operating condition of the propulsion system.

The propulsion system of any preceding clause, wherein the one or more multi-gas sensors are configured to sense gas composition data of at least two types of gases and their concentrations.

The propulsion system of any preceding clause, wherein the one or more sensors comprises one or more multi-gas sensors configured to sense the gas composition data in real time and operated with variable control parameters.

We claim:

1. A method of operating a propulsion system having a gas turbine engine and a fuel cell assembly, the fuel cell assembly comprising a fuel cell, the method comprising:
receiving gas composition data of output products from the fuel cell; and
controlling operation of the fuel cell assembly, the gas turbine engine, or both in response to the received gas composition data of the output products from the fuel cell;
wherein receiving the gas composition data comprises receiving the gas composition data from a gas sensor, and wherein controlling operation of the fuel cell assembly, the gas turbine engine, or both in response to the received gas composition data comprises:
using a model-based control to control operation of the fuel cell assembly, the gas turbine engine, or both, and wherein using the model-based control comprises:
determining estimated gas composition data using a model; and
determining actual gas composition data based on the determined estimated gas composition data and the received gas composition data using a fusion filter.

2. The method of claim 1, further comprising:
operating the propulsion system during a flight operation, wherein receiving gas composition data of output products from the fuel cell comprises receiving gas composition data of output products from the fuel cell while operating the propulsion system during the flight operation.

3. The method of claim 2, wherein receiving gas composition data of output products from the fuel cell further comprises sensing composition data of output products from the fuel cell at a time resolution of ten minutes or less.

4. The method of claim 2, wherein receiving gas composition data of output products from the fuel cell further comprises sensing composition data of output products from the fuel cell at a time resolution of one minute or less.

5. The method of claim 2, wherein receiving gas composition data of output products from the fuel cell further comprises sensing composition data of output products from the fuel cell at a time resolution of one second or less.

6. The method of claim 1, wherein receiving gas composition data of output products from the fuel cell further comprises sensing composition data of output products from the fuel cell with a multi-gas sensor that is operated with variable control parameters.

7. The method of claim 1, wherein controlling operation of the fuel cell assembly, the gas turbine engine, or both comprises controlling operation of the fuel cell assembly.

8. The method of claim 7, wherein controlling operation of the fuel cell assembly comprises modifying an operating parameter of the fuel cell assembly in response to the received gas composition data of the output products from the fuel cell.

9. The method of claim 8, wherein the operating parameter comprises: a fuel flowrate to the fuel cell assembly, a fuel pressure, an equivalence ratio for a fuel processing unit of the fuel cell assembly, a steam carbon ratio for the fuel processing unit of the fuel cell assembly, an air pressure, an air flowrate, an anode to cathode pressure differential, an anode inlet temperature, a cathode inlet temperature, a fuel cell stack temperature, a fuel cell current, a fuel cell utilization, a fuel cell air utilization, or a combination thereof.

10. The method of claim 1, wherein controlling operation of the fuel cell assembly, the gas turbine engine, or both comprises controlling the gas turbine engine.

11. The method of claim 10, wherein controlling operation of the gas turbine engine comprises modifying an operating parameter of the gas turbine engine in response to the received gas composition data of the output products from the fuel cell.

12. The method of claim 11, wherein the operating parameter of the gas turbine engine comprises: a combustor fuel flowrate, a combustor fuel air ratio, a fuel flowrate ratio between combustor fuel flow and fuel cell fuel flow, a variable bleed valve, a variable guide vane, a low pressure shaft speed, a high pressure shaft speed, a variable fan nozzle, an engine-driven generator output, or a combination thereof.

13. The method of claim 1, further comprising:
calibrating the model in response to the received gas composition data.

14. The method of claim 13, further comprising:
detecting a fault with the gas sensor based on the determined estimated gas composition data.

15. The method of claim 1, wherein the gas composition data of output products comprises a percentage of hydrogen within the output products.

16. A propulsion system comprising:
a gas turbine engine comprising a combustion section having a combustor;
a fuel cell assembly comprising a fuel cell stack having a fuel cell defining an outlet configured to provide output products from the fuel cell to the combustor; and
a control system comprising a gas sensor positioned to determine gas composition data of the output products at a location downstream of the fuel cell and upstream of the combustor, the control system configured to control operation of the fuel cell assembly, the gas turbine engine, or both in response to the determined gas composition data of the output products from the fuel cell, wherein controlling operation of the fuel cell assembly, the gas turbine engine, or both in response to the determined gas composition data comprises:
using a model-based control to control operation of the fuel cell assembly, the gas turbine engine, or both, and wherein using the model-based control comprises:
determining estimated gas composition data using a model; and
determining actual gas composition data based on the determined estimated gas composition data and the received gas composition data using a fusion filter.

17. The propulsion system of claim 16, wherein the control system is further configured to determine the gas composition data of output products from the fuel cell while operating the propulsion system during a flight operation.

18. The propulsion system of claim 17, wherein the control system is configured to determine the gas composition data of output products from the fuel cell at a time resolution of one minute or less.

19. The propulsion system of claim 16, wherein the control system is configured to control operation of the fuel cell assembly by modifying an operating parameter of the fuel cell assembly, and wherein the operating parameter comprises: a fuel flowrate to the fuel cell assembly, a fuel pressure, an equivalence ratio for a fuel processing unit of the fuel cell assembly, a steam carbon ratio for the fuel processing unit of the fuel cell assembly, an air pressure, an air flowrate, an anode to cathode pressure differential, an anode inlet temperature, a cathode inlet temperature, a fuel cell stack temperature, a fuel cell current, a fuel cell utilization, a fuel cell air utilization, or a combination thereof.

* * * * *